United States Patent
Shiraiwa et al.

(10) Patent No.: US 10,413,826 B2
(45) Date of Patent: Sep. 17, 2019

(54) INFORMATION PROCESSING APPARATUS, INFORMATION PROCESSING SYSTEM, INFORMATION PROCESSING METHOD, AND STORAGE MEDIUM HAVING STORED THEREIN INFORMATION PROCESSING PROGRAM

(71) Applicant: NINTENDO CO., LTD., Kyoto (JP)

(72) Inventors: Yusuke Shiraiwa, Kyoto (JP); Keisuke Iba, Kyoto (JP); Mifune Hayata, Kyoto (JP); Hideaki Nishihara, Kyoto (JP); Chiharu Takabayashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 71 days.

(21) Appl. No.: 15/425,157

(22) Filed: Feb. 6, 2017

(65) Prior Publication Data
US 2017/0239568 A1 Aug. 24, 2017

(30) Foreign Application Priority Data

Feb. 22, 2016 (JP) .................................. 2016-030717
Feb. 22, 2016 (JP) .................................. 2016-030718

(51) Int. Cl.
*A63F 13/52* (2014.01)
*A63F 13/2145* (2014.01)
(Continued)

(52) U.S. Cl.
CPC .......... *A63F 13/52* (2014.09); *A63F 13/2145* (2014.09); *A63F 13/235* (2014.09);
(Continued)

(58) Field of Classification Search
None
See application file for complete search history.

(56) References Cited

U.S. PATENT DOCUMENTS 6,781,635 B1    8/2004  Takeda
7,098,868 B2 *  8/2006  Love ..................... G06F 3/1423
                                                    345/1.1

(Continued)

FOREIGN PATENT DOCUMENTS

JP    2001-352373    12/2001
JP    2003-010545    1/2003

(Continued)

OTHER PUBLICATIONS

Extended European Search Report dated Jul. 7, 2017 issued in corresponding European Application No. 17154178.2 (9 pgs.).

(Continued)

*Primary Examiner* — James S. McClellan
*Assistant Examiner* — Peter J Iannuzzi
(74) *Attorney, Agent, or Firm* — Nixon & Vanderhye, P.C.

(57) ABSTRACT

An information processing apparatus displays an image on a display, directly communicates wirelessly with another information processing apparatus, and also receives a plurality of operation input data from a plurality of operation devices. Then, the information processing apparatus performs game processing for a communication game based on the plurality of operation input data and received information, and based on the game processing, generates, by screen splitting, game images including images on which operations on the plurality of respective operation devices are reflected, and causes the game images to be displayed on the display.

32 Claims, 24 Drawing Sheets

(51) Int. Cl.

| | |
|---|---|
| *A63F 13/235* | (2014.01) |
| *A63F 13/24* | (2014.01) |
| *A63F 13/26* | (2014.01) |
| *A63F 13/327* | (2014.01) |
| *A63F 13/92* | (2014.01) |
| *A63F 13/843* | (2014.01) |
| *A63F 13/285* | (2014.01) |
| *A63F 13/803* | (2014.01) |
| *A63F 13/34* | (2014.01) |

(52) U.S. Cl.
CPC ............. *A63F 13/24* (2014.09); *A63F 13/26* (2014.09); *A63F 13/285* (2014.09); *A63F 13/327* (2014.09); *A63F 13/34* (2014.09); *A63F 13/803* (2014.09); *A63F 13/843* (2014.09); *A63F 13/92* (2014.09); *A63F 2300/1075* (2013.01); *A63F 2300/204* (2013.01); *A63F 2300/301* (2013.01); *A63F 2300/308* (2013.01); *A63F 2300/403* (2013.01); *A63F 2300/405* (2013.01); *G06F 2203/04803* (2013.01)

(56) References Cited

U.S. PATENT DOCUMENTS

| | | | |
|---|---|---|---|
| 7,559,834 B1* | 7/2009 | York | A63F 13/10 463/2 |
| 7,789,741 B1* | 9/2010 | Fields | A63F 13/10 463/2 |
| 8,012,025 B2* | 9/2011 | Hillis | A63F 13/02 244/234 |
| 8,393,966 B2 | 3/2013 | Yamada et al. | |
| 2004/0219980 A1 | 11/2004 | Bassett et al. | |
| 2005/0170889 A1 | 8/2005 | Lum et al. | |
| 2006/0044216 A1* | 3/2006 | Love | A63F 13/00 345/1.3 |
| 2008/0090657 A1* | 4/2008 | Miller | A63F 13/08 463/31 |
| 2008/0214273 A1* | 9/2008 | Snoddy | G07F 17/32 463/19 |
| 2008/0318687 A1* | 12/2008 | Backer | A63F 13/12 463/42 |
| 2011/0111859 A1* | 5/2011 | Fiedler | A63F 13/10 463/42 |
| 2011/0143840 A1 | 6/2011 | Sotoike et al. | |
| 2011/0275437 A1 | 11/2011 | Minchella Jennings et al. | |
| 2012/0244934 A1* | 9/2012 | Burckart | A63F 13/52 463/30 |
| 2013/0324045 A1 | 12/2013 | Shimohata et al. | |
| 2014/0126754 A1 | 5/2014 | Mizuta | |
| 2014/0195912 A1* | 7/2014 | Odorovic | G06F 3/0484 715/719 |
| 2014/0349748 A1* | 11/2014 | Haberman | A63F 13/355 463/31 |
| 2015/0251090 A1* | 9/2015 | Nakayama | A63F 13/31 463/42 |
| 2017/0232348 A1 | 8/2017 | Williams et al. | |

FOREIGN PATENT DOCUMENTS

| | | |
|---|---|---|
| JP | 2007-87425 | 4/2007 |
| JP | 2008-199520 | 8/2008 |
| JP | 2011-124909 | 6/2011 |
| JP | 2013-251817 | 12/2013 |
| JP | 2014-090910 | 5/2014 |
| JP | 2015-223319 | 12/2015 |

OTHER PUBLICATIONS

Grant Wallace and Kai Li, "Virtually Shared Displays and User Input Devices", Department of Computer Science, Princeton University, Princeton, NJ, 2007 USENIX Annual Technical Conference 2007 (6 pgs.).
Shiraiwa, et al., U.S. Appl. No. 15/425,202, filed Feb. 6, 2017 (106 pages).
Office Action dated Feb. 8, 2018 issued in U.S. Appl. No. 15/787,738 (29 pgs.).
Notice of Allowance dated Sep. 4, 2018 in U.S. Appl. No. 15/787,738.
English-language machine translation of JP2003-010545.
Notice of Allowance dated Sep. 25, 2018 in U.S. Appl. No. 15/787,738.
Notification of Reasons for Refusal dated Dec. 3, 2018 in Japanese Patent Application No. 2016-030718 and English-language translation of same.
English-language machine translation of JP2007-87425.
English-language machine translation of JP2008-199520.
English-language machine translation of JP2015-223319.
Office Action dated Apr. 5, 2019 in U.S. Appl. No. 15/425,202 and Form PTO-892.

* cited by examiner

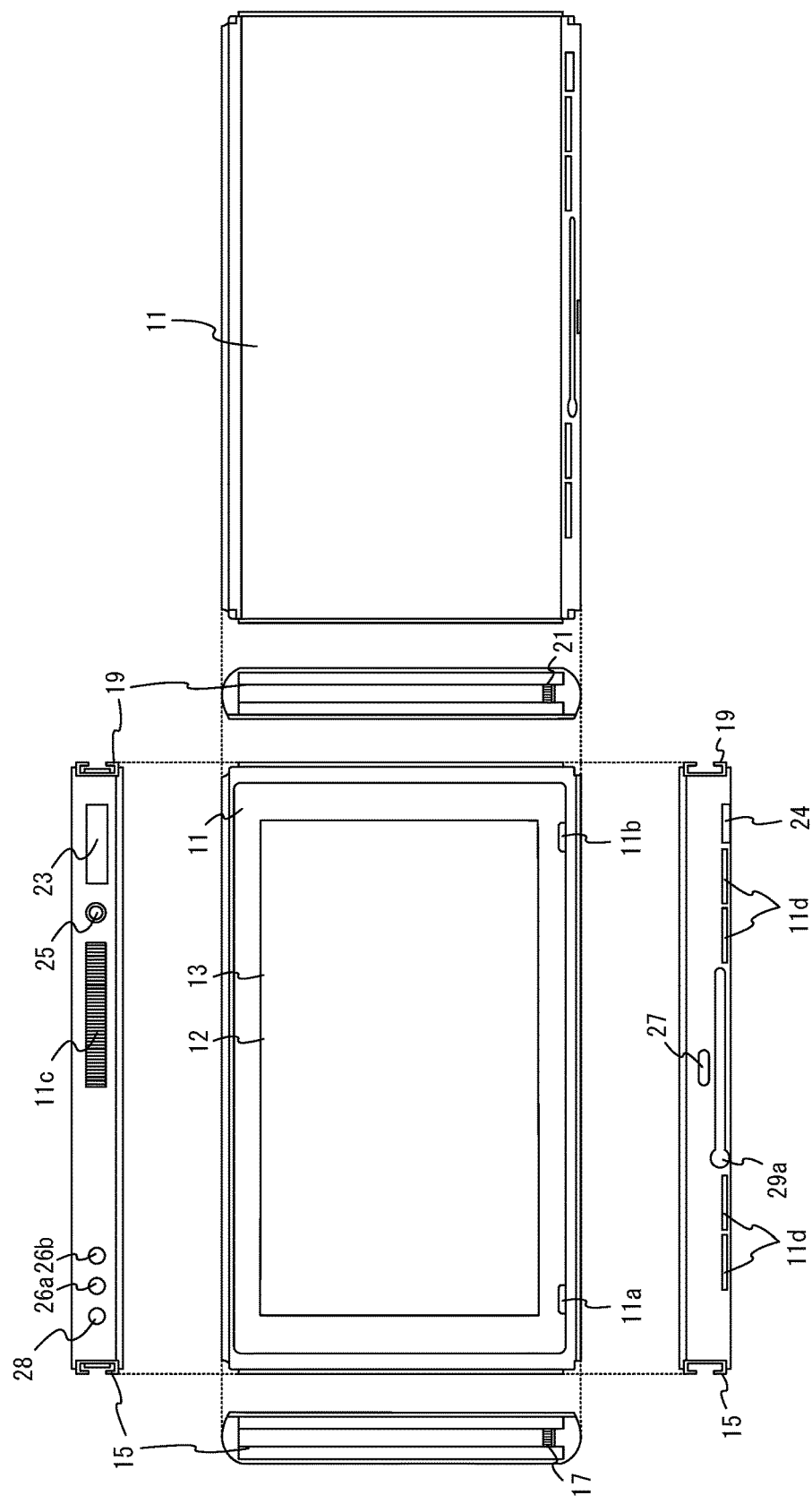
F I G. 3

INFORMATION PROCESSING APPARATUS, INFORMATION PROCESSING SYSTEM, INFORMATION PROCESSING METHOD, AND STORAGE MEDIUM HAVING STORED THEREIN INFORMATION PROCESSING PROGRAM

CROSS REFERENCE TO RELATED APPLICATION

The disclosures of Japanese Patent Application No. 2016-30717 and Japanese Patent Application No. 2016-30718, filed on Feb. 22, 2016, are incorporated herein by reference.

FIELD

The technology shown here relates to an information processing apparatus, an information processing system, an information processing method, and a storage medium having stored therein an information processing program that can be operated by a plurality of users.

BACKGROUND AND SUMMARY

Conventionally, there is a network system where a plurality of communication terminals placed in a closed local area locally communicate with each other, and a communication game based on data transmitted and received to and from the communication terminals is performed.

The above network system, however, requires as many communication terminals as the number of players participating in the communication game, and each participating player needs to prepare a communication terminal main body.

Therefore, it is an object of an exemplary embodiment to provide an information processing apparatus, an information processing system, an information processing method, and a storage medium having stored therein an information processing program that allow a larger number of users to participate in a communication game with a small number of apparatuses.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing apparatus according to the exemplary embodiment, an information processing apparatus includes: a display configured to display an image; a communicator configured to directly communicate wirelessly with another information processing apparatus; and a computer processor configured to: receive a plurality of operation input data from a plurality of operation devices; perform game processing for a communication game based on the plurality of operation input data and information received via the communicator; and based on the game processing, generate, by screen splitting, game images including images on which operations on the plurality of respective operation devices are reflected, and cause the game images to be displayed on the display.

It should be noted that the above operation devices may be able to be operated by a single user, or may include one or more controllers or units. In this case, a plurality of operation devices are used, whereby a plurality of users can perform operations.

Based on the above, even with a communication game in which direct communication is performed using a portable information processing apparatus, it is possible to achieve a communication game in which a larger number of users can participate with a small number of apparatuses.

Further, the communicator may further transmit, to the other information processing apparatus, number-of-operation-devices-operating-each-apparatus information indicating the number of the operation devices operating the information processing apparatus.

Based on the above, it is possible to notify another information processing apparatus of the number of operation devices used for an operation.

Further, the communicator may receive, from the other information processing apparatus, number-of-operation-devices-operating-each-apparatus information indicating the number of the operation devices operating the other information processing apparatus. The computer processor may be further configured to, based on number-of-operation-devices-operating-own-information-processing-apparatus information indicating the number of the operation devices operating the information processing apparatus and the received number-of-operation-devices-operating-each-apparatus information, calculate number-of-all-operation-devices information indicating the number of all operation devices used for the communication game and store the number-of-all-operation-devices information in a memory.

Based on the above, it is possible to calculate the number of all operation devices used in the other information processing apparatus and the information processing apparatus directly communicating with each other.

Further, the number-of-all-operation-devices information may be further transmitted to the other information processing apparatus via the communicator.

Based on the above, it is possible to manage the number of all operation devices also in the other information processing apparatus with which the information processing apparatus directly communicates.

Further, the communicator further may receive from the other information processing apparatus a participation request to participate in the communication game, together with the number-of-operation-devices-operating-each-apparatus information of the other information processing apparatus. In response to the received participation request, in a case where a number obtained by adding the number of operation devices indicated by the number-of-operation-devices-operating-each-apparatus information received together with the participation request to the number of all operation devices indicated by the number-of-all-operation-devices information at a current moment exceeds a predetermined upper limit, the participation request may be rejected, and a notification indicating that the other information processing apparatus is not permitted to participate in the communication game may be transmitted via the communicator to the other information processing apparatus with which the participation request is made.

Based on the above, it is possible to place a limitation on the number of all operation devices that can be used.

Further, the communicator may receive, from the other information processing apparatus, number-of-all-operation-devices information obtained by totaling the numbers of the operation devices operating information processing apparatuses participating in the communication game.

Based on the above, it is possible to manage the number of all operation devices in each information processing apparatus participating in the communication game.

Further, the computer processor may be further configured to determine whether or not a participation request to participate in the communication game can be made, and in a case where a participation request can be made, then based on the plurality of operation input data, transmit to, at least one of other information processing apparatuses participating in the communication game, a participation request to participate in the communication game. In this case, in a case where a number obtained by adding the number of the plurality of operation devices from which the plurality of operation input data are received to the number of all operation devices indicated by the number-of-all-operation-devices information exceeds a predetermined upper limit, the participation request may not be transmitted to the other information processing apparatus.

Based on the above, based on a limitation on the number of all operation devices that can be used, the information processing apparatus with which a participation request is made can determine whether or not to participate in the communication game.

Further, the communicator may receive, from the other information processing apparatus, number-of-operation-devices-operating-each-apparatus information indicating the number of the operation devices operating the other information processing apparatus. The computer processor may be further configured to total the number of operation devices indicated by the number-of-operation-devices-operating-each-apparatus information received from an apparatus participating in the communication game, calculate number-of-operation-devices state information indicating the number of operation devices at a current moment to be used for the communication game, and store the number-of-operation-devices state information in a memory.

Based on the above, it is possible to calculate the number of all operation devices used in another information processing apparatus with which the information processing apparatus directly communicates.

Further, the computer processor may be further configured to generate an image including information indicating presence of another information processing apparatus with which the communicator can perform the direct communication, and display the image on the display. At least one start standby image for the communication game including at least an image that allows recognition of a number indicated by the number-of-all-operation-devices information may be generated. The computer processor may be further configured to, in a case where any of the plurality of operation input data indicate an operation indicating participation in the communication game represented by the start standby image, transmit, to at least one of other information processing apparatuses participating in the communication game, a participation request to participate in the communication game.

Based on the above, the number of all operation devices used in another information processing apparatus and the information processing apparatus is displayed. Thus, a user can easily determine whether or not the user can participate in the communication game.

Further, the information received via the communicator may be operation data indicating an operation on a predetermined operation device or position data of a position, in a virtual space, of an object that appears in the communication game.

Based on the above, operation data indicating an operation on an operation device or position data of an object appearing in the communication game are transmitted and received, whereby it is possible to easily achieve a communication game between a plurality of information processing apparatuses.

Further, each of the plurality of operation devices may be wirelessly connected to the information processing apparatus through wireless communication. The plurality of operation input data may be received using the wireless connection.

Based on the above, the information processing apparatus and a plurality of operation devices are wirelessly connected together, whereby even in a case where the plurality of operation devices are operated by a plurality of users, it is possible to easily operate the plurality of operation devices.

Further, the computer processor may be further configured to, based on operation input data selected by a user of the information processing apparatus from a plurality of use forms, determine the number of the operation devices operating the information processing apparatus.

Based on the above, by the operation of selecting one from among a plurality of use forms, it is possible to easily specify the number of operation devices to be used for an operation.

Further, the information processing apparatus may be able to display an image by switching between the display provided in a main body of the information processing apparatus and an external display provided outside the main body of the information processing apparatus. In a case where an image is displayed on the external display, the game images generated by screen splitting may be displayed on at least the external display.

Based on the above, it is possible to display a game image on an external display apparatus outside the information processing apparatus and also display a game image even on an external display apparatus by splitting a relatively large display screen.

Further, each of the game images may be an image including a virtual object that can be operated using each of the operation devices, or an image viewed from a virtual camera that can be operated using each of the operation devices.

Based on the above, it is possible to use each of game images displayed in a splitting manner, as an image for each user operating an operation device to control a virtual object.

Further, in an exemplary configuration of an information processing system according to the exemplary embodiment, an information processing system includes a plurality of information processing apparatuses and a predetermined number of operation devices, one or more of which are connected to each of the information processing apparatuses for game processing and each output operation data to the connected information processing apparatus. The number of the operation devices is a number exceeding the number of the plurality of information processing apparatuses. Each of the plurality of information processing apparatuses includes: a display configured to display an image; a communicator configured to wirelessly communicate with any of the other information processing apparatuses; and a computer processor configured to: perform the game processing; and generate a game image based on the game processing and cause the game image to be displayed on the display, each of the information processing apparatuses wirelessly communicates with any of the other information processing apparatuses via the communicator, based on operation data acquired from the connected operation devices and data acquired via the communicator, game processing for a communication game is performed, any of the information processing apparatuses to which two or more of the operation devices are connected generates, by screen splitting, game images including images on which operations on the two or more respective operation devices are reflected, and causes the game images to be displayed on the display of the information processing apparatus, and any of the information processing apparatuses to which one of the operation devices is connected generates, without splitting a screen, a game image including an image on which an operation on the one of the operation devices is reflected, and causes the game image to be displayed on the display of the information processing apparatus.

Based on the above, even in a communication game in which portable information processing apparatuses wirelessly communicate with each other, it is possible to achieve a communication game in which a larger number of users can participate with a small number of apparatuses.

Further, the communicator may transmit, to the other information processing apparatus, number-of-operation-devices-operating-each-apparatus information indicating the number of the operation devices connected to the information processing apparatus.

Based on the above, it is possible to notify another information processing apparatus of the number of operation devices used for an operation.

Further, the communicator of one of the plurality of information processing apparatuses may receive, from any of the other information processing apparatuses, number-of-operation-devices-operating-each-apparatus information indicating the number of the operation devices connected to the other information processing apparatus. The computer processor of one of the information processing apparatuses may be further configured to, based on number-of-operation-devices-operating-own-information-processing-apparatus information indicating the number of the operation devices connected to the information processing apparatus and the received number-of-operation-devices-operating-each-apparatus information, calculate number-of-all-operation-devices information indicating the number of all operation devices used for the communication game and store the number-of-all-operation-devices information in a memory.

Based on the above, one of a plurality of information processing apparatuses can calculate the number of all operation devices used in another one of the other information processing apparatuses with which the one of the plurality of information processing apparatuses directly communicates and in the one of the plurality of information processing apparatuses directly communicates.

Further, the number-of-all-operation-devices information may be further transmitted to the other information processing apparatus via the communicator.

Based on the above, it is possible to manage the number of all operation devices also in another information processing apparatus with which the information processing apparatus directly communicates.

Further, the communicator of one of the information processing apparatuses may further receive from any of the other information processing apparatuses a participation request to participate in the communication game, together with the number-of-operation-devices-operating-each-apparatus information of the other information processing apparatus. In response to the received participation request, in a case where a number obtained by adding the number of operation devices indicated by the number-of-operation-devices-operating-each-apparatus information received together with the participation request to the number of all operation devices indicated by the number-of-all-operation-devices information at a current moment exceeds a predetermined upper limit, the participation request may be rejected, and a notification indicating that the other information processing apparatus is not permitted to participate in the communication game may be transmitted via the communicator to the other information processing apparatus with which the participation request is made.

Based on the above, one of the plurality of information processing apparatuses can place a limitation on the number of all operation devices that can be used.

Further, the communicator may receive, from the other information processing apparatus, number-of-all-operation-devices information obtained by totaling the numbers of the operation devices connected to information processing apparatuses participating in the communication game.

Based on the above, it is possible to manage the number of all operation devices in each information processing apparatus participating in the communication game.

Further, the computer processor of at least one of the plurality of information processing apparatuses may be further configured to determine whether or not a participation request to participate in the communication game can be made, and in a case where a participation request can be made, then based on the plurality of operation input data, transmit, to at least one of the other information processing apparatuses participating in the communication game, a participation request to participate in the communication game. In a case where a number obtained by adding the number of the operation devices connected to the information processing apparatus to the number of all operation devices indicated by the number-of-all-operation-devices information exceeds a predetermined upper limit, the participation request may not be transmitted to the other information processing apparatus.

Based on the above, based on a limitation on the number of all operation devices that can be used, the information processing apparatus with which a participation request is made can determine whether or not to participate in the communication game.

Further, the communicator of at least one of the plurality of information processing apparatuses may receive, from any of the other information processing apparatuses, number-of-operation-devices-operating-each-apparatus information indicating the number of the operation devices connected to the other information processing apparatus. The computer processor of at least one of the information processing apparatuses may be further configured to total the number of operation devices indicated by the number-of-operation-devices-operating-each-apparatus information received by an apparatus participating in the communication game, calculate number-of-operation-devices state information indicating the number of operation devices at a current moment used in the communication game, and store the number-of-operation-devices state information in the memory.

Based on the above, it is possible to calculate the number of all operation devices used in another information processing apparatus with which the information processing apparatus directly communicates.

Further, the computer processor of each of the plurality of information processing apparatuses may be further configured to generate an image including information indicating presence of another information processing apparatus with which the communicator can perform the wireless communication, and display the image on the display. At least one start standby image for the communication game including at least an image that allows recognition of a number indicated by the number-of-all-operation-devices information may be generated. The computer processor of each of the plurality of information processing apparatuses may be further configured to, in a case where any of the plurality of operation data acquired from the connected operation devices indicate an operation indicating participation in the communication game represented by the start standby image, transmit, to at least one of the other information processing apparatuses participating in the communication game, a participation request to participate in the communication game.

Based on the above, the number of all operation devices used in another information processing apparatus and the information processing apparatus is displayed. Thus, a user can easily determine whether or not the user can participate in the communication game.

Further, the communicator of one of the information processing apparatuses further may receive from any of the other information processing apparatuses a participation request to participate in the communication game, together with the number-of-operation-devices-operating-each-apparatus information of the other information processing apparatus. In response to the received participation request, in at least one of a case where a number obtained by adding the number of operation devices indicated by the number-of-operation-devices-operating-each-apparatus information received together with the participation request to the number of all operation devices indicated by the number-of-all-operation-devices information at a current moment exceeds a first upper limit, and a case where a number obtained by adding the other information processing apparatus with which the participation request is made to the number of information processing apparatuses with which participation requests are made to participate in the communication game at the current moment exceeds a second upper limit, the participation request may be rejected, and a notification indicating that the other information processing apparatus is not permitted to participate in the communication game may be transmitted via the communicator to the other information processing apparatus with which the participation request is made.

Based on the above, it is possible to place a participation restriction based on the number of information processing apparatuses participating in a communication game or the number of operation devices to be used.

In an exemplary configuration of an information processing method according to the exemplary embodiment, an information processing method is executed by a processor or cooperation of a plurality of processors, the processor or the plurality of processors included in an information processing system including a plurality of information processing apparatuses each including a display configured to display an image, and a predetermined number of operation devices. One or more of the operation devices are connected to each of the information processing apparatuses for game processing and each output operation data to the connected information processing apparatus. The number of the operation devices is a number exceeding the number of the plurality of information processing apparatuses. Each of the plurality of information processing apparatuses: wirelessly communicates with any of the other information processing apparatuses; and based on operation data acquired from the connected operation devices and data acquired through the wireless communication, perform game processing for a communication game. Any of the information processing apparatuses to which two or more of the operation devices are connected generates, by screen splitting, game images including images on which operations on the two or more respective operation devices are reflected, and causes the game images to be displayed on the display of the information processing apparatus. Any of the information processing apparatuses to which one of the operation devices is connected generates, without splitting a screen, a game image including an image on which an operation on the one of the operation devices is reflected, and causes the game image to be displayed on the display of the information processing apparatus.

Based on the above, even in a communication game in which portable information processing apparatuses wirelessly communicate with each other, it is possible to achieve a communication game in which a larger number of users can participate with a small number of apparatuses.

Further, the information processing apparatus may further transmit, to the other information processing apparatus, number-of-operation-devices-operating-each-apparatus information indicating the number of the operation devices connected to the information processing apparatus.

Based on the above, it is possible to notify another information processing apparatus of the number of operation devices used for an operation.

Further, one of the plurality of information processing apparatuses may receive, from any of the other information processing apparatuses, number-of-operation-devices-operating-each-apparatus information indicating the number of the operation devices connected to the other information processing apparatus. The computer processor of one of the information processing apparatuses may be further configured to, based on number-of-operation-devices-operating-own-information-processing-apparatus information indicating the number of the operation devices connected to the information processing apparatus and the received number-of-operation-devices-operating-each-apparatus information, calculate number-of-all-operation-devices information indicating the number of all operation devices used for the communication game.

Based on the above, one of a plurality of information processing apparatuses can calculate the number of all operation devices used in another one of the other information processing apparatuses with which the one of the plurality of information processing apparatuses directly communicates and in the one of the plurality of information processing apparatuses.

Further, in an exemplary configuration of a non-transitory computer-readable storage medium having stored therein an information processing program according to the exemplary embodiment, in a non-transitory computer-readable storage medium having stored therein an information processing program, the information processing program is executed by a computer included in an information processing apparatus including a display configured to display an image and capable of directly communicating wirelessly with another information processing apparatus and causes the computer to execute: receiving a plurality of operation input data from a plurality of operation devices; performing game processing for a communication game based on the plurality of operation input data and information received through the direct communication; based on the game processing, generating, by screen splitting, game images including images on which operations on the plurality of respective operation devices are reflected, and causing the game images to be displayed on the display; and transmitting to the other information processing apparatus, number-of-operation-devices-operating-each-apparatus information indicating the number of the operation devices from which the plurality of the operation input data are received.

Based on the above, even in a communication game in which direct communication is performed using portable information processing apparatuses, it is possible to achieve a communication game in which a larger number of users can participate with a small number of apparatuses. Thus, it is possible to notify another information processing apparatus of the number of operation devices used for an operation.

Further, the information received through the direct communication may include at least number-of-all-operation-devices information obtained by totaling the numbers of the operation devices operating information processing apparatuses participating in the communication game.

Based on the above, it is possible to manage the number of all operation devices in each information processing apparatus participating in the communication game.

Further, in another exemplary configuration of a non-transitory computer-readable storage medium having stored therein an information processing program according to the exemplary embodiment, in a non-transitory computer-readable storage medium having stored therein an information processing program, the information processing program is executed by a computer included in an information processing apparatus including a display configured to display an image and capable of directly communicating wirelessly with another information processing apparatus and causes the computer to execute: receiving a plurality of operation input data from a plurality of operation devices; performing game processing for a communication game based on the plurality of operation input data and information received through the direct communication; based on the game processing, generating, by screen splitting, game images including images on which operations on the plurality of operation devices are reflected, and causing the game images to be displayed on the display; acquiring, from the other information processing apparatus, number-of-operation-devices-operating-each-apparatus information indicating the number of the operation devices operating the other information processing apparatus; and based on number-of-operation-devices-operating-own-information-processing-apparatus information indicating the number of the operation devices from which the plurality of operation input data are received and the received number-of-operation-devices-operating-each-apparatus information, calculating number-of-all-operation-devices information indicating the number of all operation devices used for the communication game and storing the number-of-all-operation-devices information in a memory.

Based on the above, even in a communication game in which direct communication is performed using portable information processing apparatuses, it is possible to achieve a communication game in which a larger number of users can participate with a small number of apparatuses. Thus, it is possible to calculate the number of all operation devices used in another information processing apparatus with which the information processing apparatus directly communicates and in the information processing apparatus.

Further, the number-of-all-operation-devices information may be further transmitted to the other information processing apparatus in the storing of the number-of-all-operation-devices information in the memory.

Based on the above, it is possible to manage the number of all operation devices also in the other information processing apparatus with which the information processing apparatus directly communicates.

According to the exemplary embodiment, even in a communication game in which direct communication is performed using portable information processing apparatuses, it is possible to achieve a communication game in which a larger number of users can participate with a small number of apparatuses.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 is six orthogonal views showing a non-limiting example of the main body apparatus 2;

DETAILED DESCRIPTION OF NON-LIMITING EXAMPLE EMBODIMENTS

Figure 1:
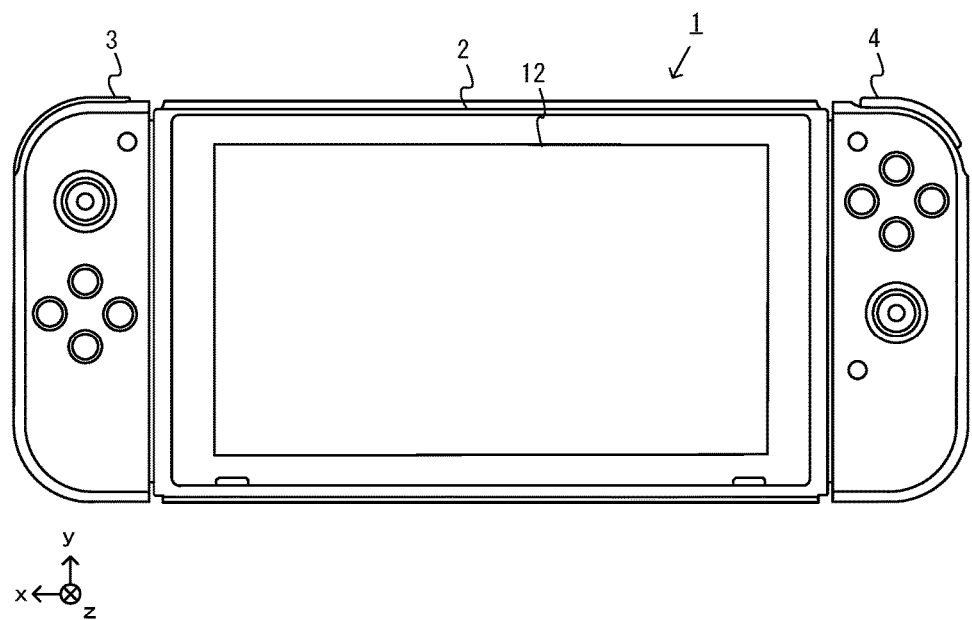
FIG. 1 is a diagram showing a non-limiting example of the state where a left controller 3 and a right controller 4 are attached to a main body apparatus 2 in an example of an information processing system 1 according to an exemplary embodiment.

A description is given below of an information processing apparatus, an information processing system, an information processing method, and an information processing program according to an exemplary embodiment. In the exemplary embodiment, an information processing system 1 includes a main body apparatus (information processing apparatus) 2, a left controller 3, and a right controller 4. Further, in another form, the information processing system may further include a cradle 5 (see FIGS. 5 and 7 and the like) in addition to the above configuration. In the information processing system 1 according to the exemplary embodiment, the left controller 3 and the right controller 4 are attachable to and detachable from the main body apparatus 2. The information processing system 1 can be used as an integrated apparatus obtained by attaching each of the left controller 3 and the right controller 4 to the main body apparatus 2. Further, the main body apparatus 2, the left controller 3, and the right controller 4 can also be used as separate bodies (see FIG. 2). Further, the information processing system 1 can be used in the form in which an image is displayed on the main body apparatus 2, and in the form in which an image is displayed on another display apparatus such as a television. In the first form, the information processing system 1 can be used as a mobile apparatus (e.g., a mobile game apparatus). Further, in the second form, the information processing system 1 can be used as a stationary apparatus (e.g., a stationary game apparatus).

FIG. 1 is a diagram showing the state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. Each of the left controller 3 and the right controller 4 is attached to and integrated with the main body apparatus 2. The main body apparatus 2 is an apparatus for performing various processes in the information processing system 1. The main body apparatus 2 includes a display 12. Each of the left controller 3 and the right controller 4 is an apparatus including operation sections with which a user provides inputs.

Figure 2:
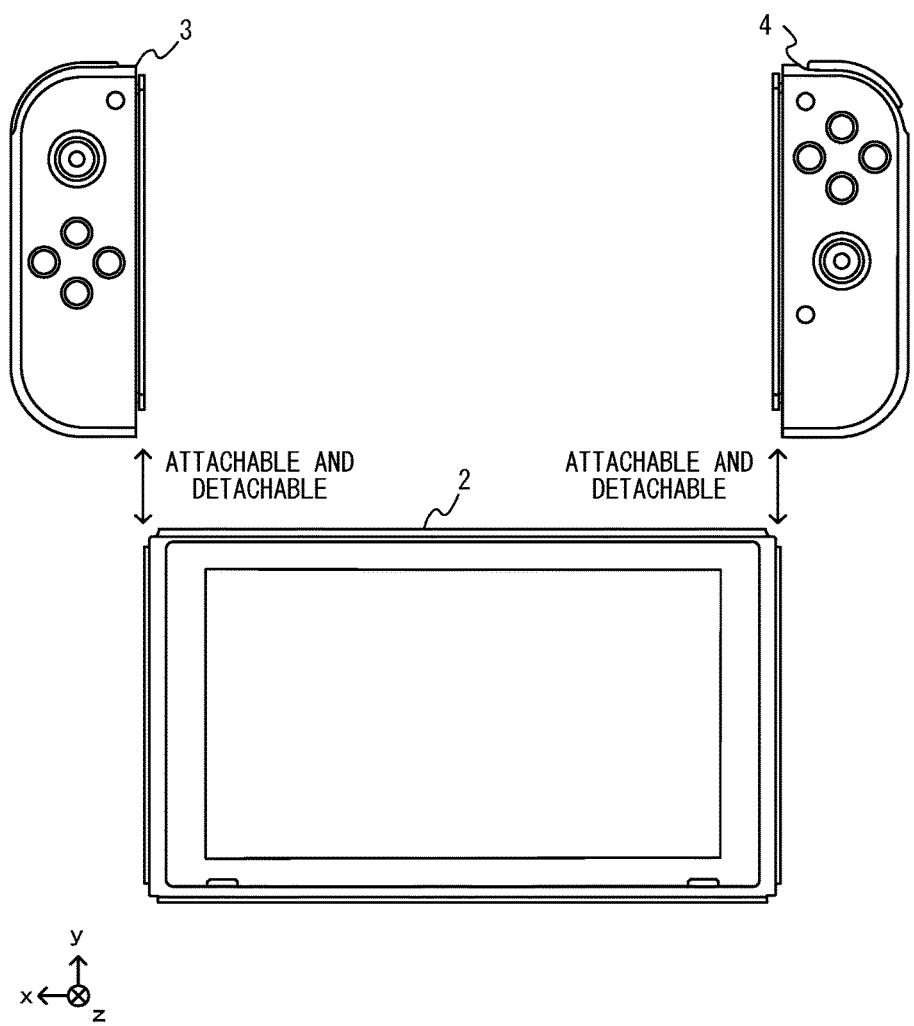
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. The left controller 3 can be attached to a left side surface (a side surface further in a positive x-axis direction shown in FIG. 1) of the main body apparatus 2 and is attachable to and detachable from the main body apparatus 2 by sliding the left controller 3 along the left side surface of the main body apparatus 2 in a y-axis direction shown in FIG. 1. Further, the right controller 4 can be attached to a right side surface (a side surface further in a negative x-axis direction shown in FIG. 1) of the main body apparatus 2 and is attachable to and detachable from the main body apparatus 2 by sliding the right controller 4 along the right side surface of the main body apparatus 2 in the y-axis direction shown in FIG. 1. It should be noted that hereinafter, the left controller 3 and the right controller 4 will occasionally be referred to collectively as "controllers". It should be noted that in the exemplary embodiment, an "operation device" operated by a single user may be a single controller (e.g., one of the left controller 3 and the right controller 4) or a plurality of controllers (e.g., both the left controller 3 and the right controller 4, or these controllers and another controller), and the "operation device" can be configured by one or more controllers. A description is given below of examples of the specific configurations of the main body apparatus 2, the left controller 3, and the right controller 4.

FIG. 3 is six orthogonal views showing an example of the main body apparatus 2. As shown in FIG. 3, the main body apparatus 2 includes a generally plate-shaped housing 11. In the exemplary embodiment, a main surface of the housing 11 (in other words, a surface on a front side, i.e., a surface on which the display 12 is provided) has a roughly rectangular shape. In the exemplary embodiment, the housing 11 is shaped to be horizontally long. That is, in the exemplary embodiment, the longitudinal direction of the main surface of the housing 11 (i.e., an x-axis direction shown in FIG. 1) is referred to as a "horizontal direction" (also a "left-right direction"), the short direction of the main surface (i.e., the y-axis direction shown in FIG. 1) is referred to as a "vertical direction" (also an "up-down direction"), and a direction perpendicular to the main surface (i.e., a z-axis direction shown in FIG. 1) is referred to as a depth direction (also a "front-back direction"). The main body apparatus 2 can be used in the orientation in which the main body apparatus 2 is horizontally long. Further, the main body apparatus 2 can also be used in the orientation in which the main body apparatus 2 is vertically long. In this case, the housing 11 may be considered as being shaped to be vertically long.

It should be noted that the housing 11 may have any shape and size. As an example, the housing 11 may have a portable size. Further, the main body apparatus 2 alone or an integrated apparatus obtained by attaching the left controller 3 and the right controller 4 to the main body apparatus 2 may function as a mobile apparatus. Alternatively, the main body apparatus 2 or the integrated apparatus may function as a handheld apparatus. Yet alternatively, the main body apparatus 2 or the integrated apparatus may function as a portable apparatus.

As shown in FIG. 3, the main body apparatus 2 includes the display 12, which is provided on the main surface of the housing 11. The display 12 displays an image (a still image or a moving image) acquired or generated by the main body apparatus 2. In the exemplary embodiment, the display 12 is a liquid crystal display apparatus (LCD). The display 12, however, may be a display apparatus of any type.

Further, the main body apparatus 2 includes a touch panel 13 on the screen of the display 12. In the exemplary embodiment, the touch panel 13 is of a type that allows a multi-touch input (e.g., an electrostatic capacitance type). The touch panel 13, however, may be of any type. For example, the touch panel 13 may be of a type that allows a single-touch input (e.g., a resistive type).

The main body apparatus 2 includes loudspeakers (i.e., loudspeakers 88 shown in FIG. 8) within the housing 11. As shown in FIG. 3, loudspeaker holes 11a and 11b are formed on the main surface of the housing 11. Then, sounds output from the loudspeakers 88 are output through the loudspeaker holes 11a and 11b.

As shown in FIG. 3, the main body apparatus 2 includes a left rail member 15 on the left side surface of the housing 11. The left rail member 15 is a member for detachably attaching the left controller 3 to the main body apparatus 2. The left rail member 15 is provided so as to extend along the up-down direction on the left side surface of the housing 11. The left rail member 15 is shaped so as to be engaged with a slider (i.e., a slider 40 shown in FIG. 4) of the left controller 3, and a slide mechanism is formed of the left rail member 15 and the slider 40. With this slide mechanism, it is possible to slidably and detachably attach the left controller 3 to the main body apparatus 2.

Further, the main body apparatus 2 includes a left terminal 17. The left terminal 17 is a terminal for the main body apparatus 2 to wirelessly communicate with the left controller 3. The left terminal 17 is provided at the position where, in a case where the left controller 3 is attached to the main body apparatus 2, the left terminal 17 comes into contact with a terminal (a terminal 42 shown in FIG. 4) of the left controller 3. The specific position of the left terminal 17 is optional. In the exemplary embodiment, as shown in FIG. 3, the left terminal 17 is provided on a bottom surface of the left rail member 15. Further, in the exemplary embodiment, the left terminal 17 is provided near a lower end portion on the bottom surface of the left rail member 15.

As shown in FIG. 3, on the right side surface of the housing 11, components similar to the components provided on the left side surface are provided. That is, the main body apparatus 2 includes a right rail member 19 on the right side surface of the housing 11. The right rail member 19 is provided so as to extend along the up-down direction on the right side surface of the housing 11. The right rail member 19 is shaped so as to be engaged with a slider (i.e., a slider 62 shown in FIG. 5) of the right controller 4, and a slide mechanism is formed of the right rail member 19 and the slider 62. With this slide mechanism, it is possible to slidably and detachably attach the right controller 4 to the main body apparatus 2.

Further, the main body apparatus 2 includes a right terminal 21. The right terminal 21 is a terminal for the main body apparatus 2 to wirelessly communicate with the right controller 4. The right terminal 21 is provided at the position where, in a case where the right controller 4 is attached to the main body apparatus 2, the right terminal 21 comes into contact with a terminal (a terminal 64 shown in FIG. 5) of the right controller 4. The specific position of the right terminal 21 is optional. In the exemplary embodiment, as shown in FIG. 3, the right terminal 21 is provided on a bottom surface of the right rail member 19. Further, in the exemplary embodiment, the right terminal 21 is provided near a lower end portion on the bottom surface of the right rail member 19.

As shown in FIG. 3, the main body apparatus 2 includes a first slot 23. The first slot 23 is provided on an upper side surface of the housing 11. The first slot 23 is so shaped that a first type storage medium is attachable to the first slot 23. The first type storage medium is, for example, a dedicated storage medium (e.g., a dedicated memory card) for the information processing system 1 and an information processing apparatus of the same type as that of the information processing system 1. The first type storage medium is used to, for example, store data (e.g., saved data of an application or the like) used by the main body apparatus 2, and/or a program (e.g., a program for an application or the like) executed by the main body apparatus 2. Further, the main body apparatus 2 includes a power button 28. As shown in FIG. 3, the power button 28 is provided on the upper side surface of the housing 11. The power button 28 is a button for switching between an on-state and an off-state of the power supply of the main body apparatus 2.

The main body apparatus 2 includes a sound input/output terminal (specifically, earphone jack) 25. That is, in the main body apparatus 2, a microphone or earphones can be attached to the sound input/output terminal 25. As shown in FIG. 3, the sound input/output terminal 25 is provided on the upper side surface of the housing 11.

The main body apparatus 2 includes sound volume buttons 26a and 26b. As shown in FIG. 3, the sound volume buttons 26a and 26b are provided on the upper side surface of the housing 11. The sound volume buttons 26a and 26b are buttons for giving an instruction to adjust the volume of a sound output from the main body apparatus 2. That is, the sound volume button 26a is a button for giving an instruction to turn down the sound volume, and the sound volume button 26b is a button for giving an instruction to turn up the sound volume.

Further, in the housing 11, an exhaust hole 11c is formed. As shown in FIG. 3, the exhaust hole 11c is formed on the upper side surface of the housing 11. The exhaust hole 11c is formed to exhaust (in other words, release) heat generated within the housing 11 to outside the housing 11. That is, the exhaust hole 11c can also be said to be a heat exhaust hole.

The main body apparatus 2 includes a lower terminal 27. The lower terminal 27 is a terminal for the main body apparatus 2 to communicate with the cradle 5, which will be described later. As shown in FIG. 3, the lower terminal 27 is provided on a lower side surface of the housing 11. In a case where the main body apparatus 2 is attached to the cradle 5, the lower terminal 27 is connected to a terminal (a main body terminal 73 shown in FIG. 7) of the cradle 5. In the exemplary embodiment, the lower terminal 27 is a USB connector (more specifically, a female connector).

Further, the main body apparatus 2 includes a second slot 24. In the exemplary embodiment, the second slot 24 is provided on the lower side surface of the housing 11. Alternatively, in another exemplary embodiment, the second slot 24 may be provided on the same surface as the first slot 23. The second slot 24 is so shaped that a second type storage medium different from the first type storage medium is attachable to the second slot 24. The second type storage medium may be, for example, a general-purpose storage medium. For example, the second type storage medium may be an SD card. Similarly to the first type storage medium, the second type storage medium is used to, for example, store data (e.g., saved data of an application or the like) used by the main body apparatus 2, and/or a program (e.g., a program for an application or the like) executed by the main body apparatus 2.

Further, in the housing 11, an inlet hole 11*d* is formed. As shown in FIG. 3, the inlet hole 11*d* is formed on the lower side surface of the housing 11. The inlet hole 11*d* is formed to take (in other words, introduce) air outside the housing 11 into the housing 11. In the exemplary embodiment, the inlet hole 11*d* is formed on the surface opposite to the surface on which the exhaust hole 11*c* is formed. Thus, it is possible to efficiently release heat within the housing 11.

The shapes, the numbers, and the installation positions of the above components (specifically, the buttons, the slots, the terminals, and the like) provided in the housing 11 are optional. For example, in another exemplary embodiment, some of the power button 28 and the slots 23 and 24 may be provided on another side surface or a back surface of the housing 11. Alternatively, in another exemplary embodiment, the main body apparatus 2 may be configured not to include some of the above components.

Figure 4:
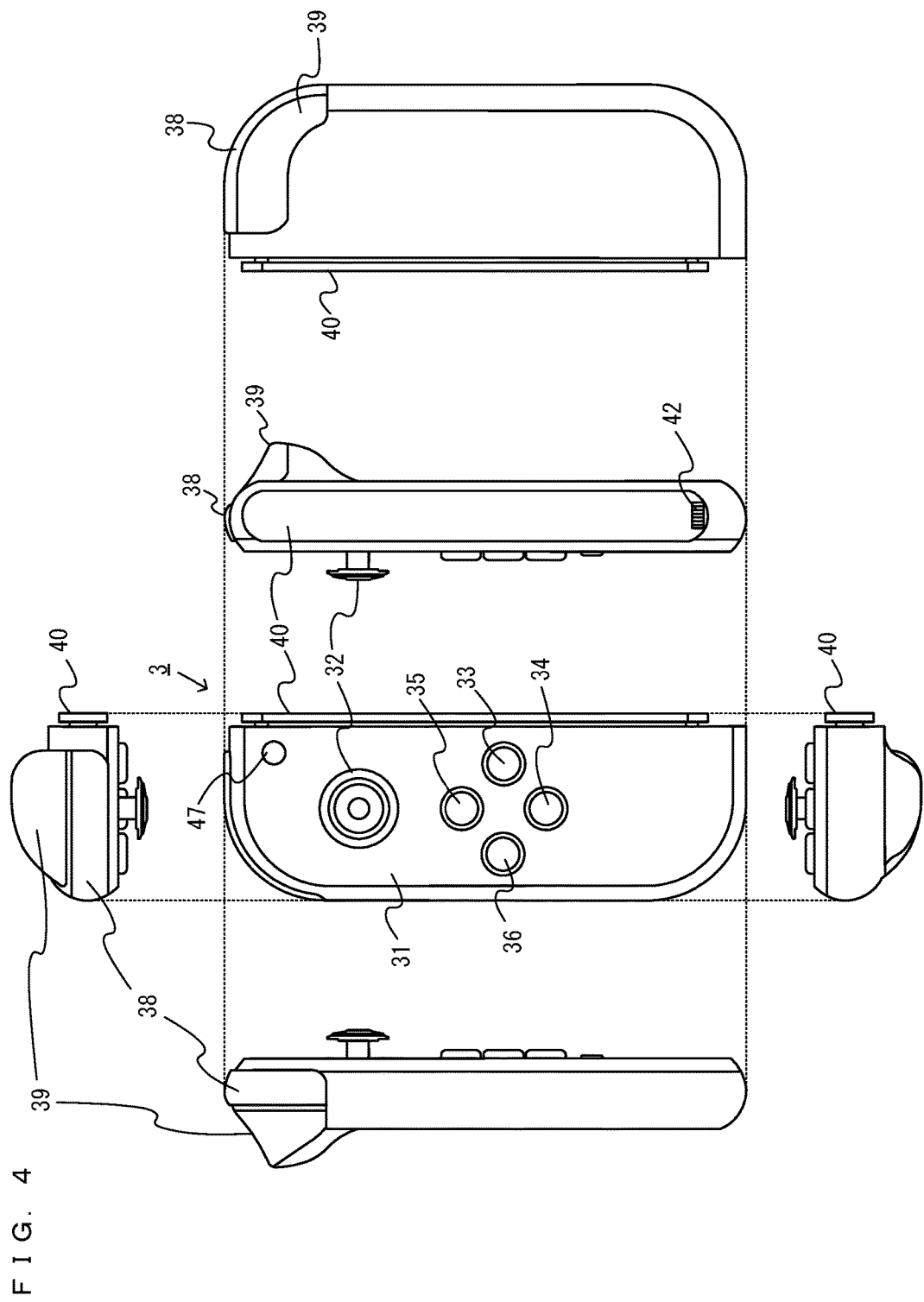
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 is generally plate-shaped. Further, a main surface of the housing 31 (in other words, a surface on a front side, i.e., a surface further in a negative z-axis direction shown in FIG. 1) has a roughly rectangular shape. Further, in the exemplary embodiment, the housing 31 is shaped to be vertically long, i.e., shaped to be long in the up-down direction (i.e., the y-axis direction shown in FIG. 1). In the state where the left controller 3 is detached from the main body apparatus 2, the left controller 3 can also be held in the orientation in which the left controller 3 is vertically long. The housing 31 has such a shape and size that, in a case where the housing 31 is held in the orientation in which the housing 31 is vertically long, the housing 31 can be held with one hand, particularly the left hand. Further, the left controller 3 can also be held in the orientation in which the left controller 3 is horizontally long. In a case where the left controller 3 is held in the orientation in which the left controller 3 is horizontally long, the left controller 3 may be held with both hands. It should be noted that the housing 31 has any shape. In another exemplary embodiment, the housing 31 may not be generally plate-shaped. Further, the housing 31 may not have a rectangular shape, and may have, for example, a semicircular shape or the like. Further, the housing 31 may not be shaped to be vertically long.

The length in the up-down direction of the housing 31 is almost the same as the length in the up-down direction of the housing 11 of the main body apparatus 2. Further, the thickness (i.e., the length in the front-back direction, in other words, the length in the z-axis direction shown in FIG. 1) of the housing 31 is almost the same as the thickness of the housing 11 of the main body apparatus 2. Thus, in a case where the left controller 3 is attached to the main body apparatus 2 (see FIG. 1), the user can hold the main body apparatus 2 and the left controller 3 with the feeling that the user holds an integrated apparatus.

Further, as shown in FIG. 4, the main surface of the housing 31 is so shaped that left corner portions are more rounded than right corner portions in the main surface. That is, a connection portion between an upper side surface and a left side surface of the housing 31 and a connection portion between a lower side surface and the left side surface of the housing 31 are rounder (in other words, have greater roundness in chamfering) than a connection portion between the upper side surface and a right side surface of the housing 31 and a connection portion between the lower side surface and the right side surface of the housing 31. Thus, in a case where the left controller 3 is attached to the main body apparatus 2 (see FIG. 1), the information processing system 1 as the integrated apparatus has a rounded shape on its left side. This shape makes it easy for the user to hold the information processing system 1.

The left controller 3 includes an analog stick 32. As shown in FIG. 4, the analog stick 32 is provided on the main surface of the housing 31. The analog stick 32 is an example of a direction input section with which a direction can be input. The analog stick 32 includes a stick member that can be tilted in all directions parallel to the main surface of the housing 31 (i.e., 360° directions including up, down, left, right, and oblique directions). The user tilts the stick member and thereby can input a direction corresponding to the direction of the tilt (and input a magnitude corresponding to the angle of the tilt). It should be noted that the direction input section may be a directional pad, a slide stick, or the like. Further, in the exemplary embodiment, it is possible to provide an input by pressing the stick member (in a direction perpendicular to the housing 31). That is, the analog stick 32 is an input section with which a direction and a magnitude corresponding to the direction of tilt and the amount of tilt of the stick member can be input, and an input can be provided by pressing the stick member.

The left controller 3 includes four operation buttons 33 to 36 (specifically, a right direction button 33, a down direction button 34, an up direction button 35, and a left direction button 36). As shown in FIG. 4, the four operation buttons 33 to 36 are provided below the analog stick 32 on the main surface of the housing 31. It should be noted that in the exemplary embodiment, four operation buttons are provided on the main surface of the left controller 3. The number of operation buttons, however, is optional. The operation buttons 33 to 36 are used to give instructions corresponding to various programs (e.g., an OS program and an application program) executed by the main body apparatus 2. It should be noted that in the exemplary embodiment, since the operation buttons 33 to 36 can be used to input directions, the operation buttons 33 to 36 are termed the right direction button 33, the down direction button 34, the up direction button 35, and the left direction button 36. Alternatively, the operation buttons 33 to 36 may be used to give instructions other than inputting directions.

Further, the left controller 3 includes a "−" (minus) button 47. As shown in FIG. 4, the "−" button 47 is provided on the main surface of the housing 31, and more specifically, is provided in an upper right area on the main surface. The "−" button 47 is used to give instructions corresponding to various programs (e.g., an OS program and an application program) executed by the main body apparatus 2. The "−" button 47 is, for example, used as a select button in a game application (e.g., a button used to switch a selection item).

In a case where the left controller 3 is attached to the main body apparatus 2, operation sections (specifically, the analog stick 32 and the buttons 33 to 36 and 47) provided on the main surface of the left controller 3 are operated with, for example, the thumb of the left hand of the user holding the information processing system 1 as the integrated apparatus.

Further, in a case where the left controller 3 is used while being held in a horizontal orientation with both hands in the state where the left controller 3 is detached from the main body apparatus 2, the above operation sections are operated with, for example, the thumbs of the left and right hands of the user holding the left controller 3. Specifically, in this case, the analog stick 32 is operated with the thumb of the left hand of the user, and the operation buttons 33 to 36 are operated with the thumb of the right hand of the user.

The left controller 3 includes a first L-button 38. Further, the left controller 3 includes a ZL-button 39. Similarly to the operation buttons 33 to 36, these operation buttons 38 and 39 are used to give instructions corresponding to various programs executed by the main body apparatus 2. As shown in FIG. 4, the first L-button 38 is provided in an upper left portion on the side surface of the housing 31. Further, the ZL-button 39 is provided in an upper left portion from the side surface to a back surface of the housing 31 (to be exact, an upper left portion when the housing 31 is viewed from its front side). That is, the ZL-button 39 is provided on the back side of the first L-button 38 (further in a positive z-axis direction shown in FIG. 1). In the exemplary embodiment, since an upper left portion of the housing 31 has a rounded shape, the first L-button 38 and the ZL-button 39 have rounded shapes corresponding to the roundness of the upper left portion of the housing 31. In a case where the left controller 3 is attached to the main body apparatus 2, the first L-button 38 and the ZL-button 39 are placed in an upper left portion of the information processing system 1 as the integrated apparatus.

The left controller 3 includes the slider 40 described above. As shown in FIG. 4, the slider 40 is provided so as to extend in the up-down direction on the right side surface of the housing 31. The slider 40 is shaped so as to be engaged with the left rail member 15 of the main body apparatus 2 (more specifically, grooves in the left rail member 15). Thus, the slider 40 engaged with the left rail member 15 is fixed so as not to be detached in a direction perpendicular to the slide direction (in other words, the direction in which the left rail member 15 extends).

Further, the left controller 3 includes the terminal 42 for the left controller 3 to wirelessly communicate with the main body apparatus 2. The terminal 42 is provided at the position where, in a case where the left controller 3 is attached to the main body apparatus 2, the terminal 42 comes into contact with the left terminal 17 of the main body apparatus 2 (FIG. 3). The specific position of the terminal 42 is optional. In the exemplary embodiment, as shown in FIG. 4, the terminal 42 is provided on an attachment surface of the slider 40. Further, in the exemplary embodiment, the terminal 42 is provided near a lower end portion on the attachment surface of the slider 40.

Figure 5:
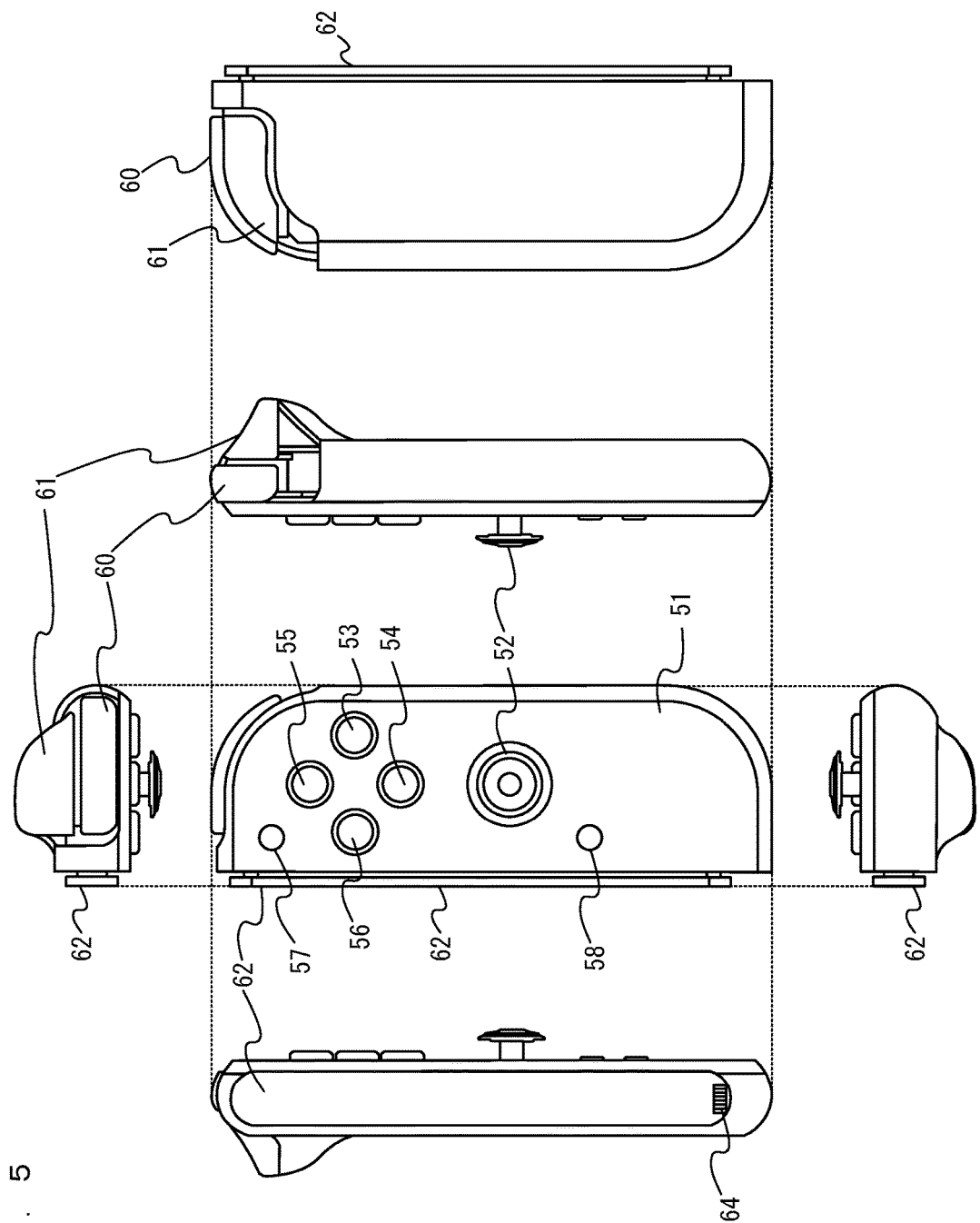
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 is generally plate-shaped. Further, a main surface of the housing 51 (in other words, a surface on a front side, i.e., a surface further in the negative z-axis direction shown in FIG. 1) has a roughly rectangular shape. Further, in the exemplary embodiment, the housing 51 is shaped to be vertically long, i.e., shaped to be long in the up-down direction. In the state where the right controller 4 is detached from the main body apparatus 2, the right controller 4 can also be held in the orientation in which the right controller 4 is vertically long. The housing 51 has such a shape and size that, in a case where the housing 51 is held in the orientation in which the housing 51 is vertically long, the housing 51 can be held with one hand, particularly the right hand. Further, the right controller 4 can also be held in the orientation in which the right controller 4 is horizontally long. In a case where the right controller 4 is held in the orientation in which the right controller 4 is horizontally long, the right controller 4 may be held with both hands.

Similarly to the housing 31 of the left controller 3, the length in the up-down direction of the housing 51 of the right controller 4 is almost the same as the length in the up-down direction of the housing 11 of the main body apparatus 2, and the thickness of the housing 51 is almost the same as the thickness of the housing 11 of the main body apparatus 2. Thus, in a case where the right controller 4 is attached to the main body apparatus 2 (see FIG. 1), the user can hold the main body apparatus 2 and the right controller 4 with the feeling that the user holds an integrated apparatus.

Further, as shown in FIG. 5, the main surface of the housing 51 is so shaped that right corner portions are more rounded than left corner portions in the main surface. That is, a connection portion between an upper side surface and a right side surface of the housing 51 and a connection portion between a lower side surface and the right side surface of the housing 51 are rounder (in other words, have greater roundness in chamfering) than a connection portion between the upper side surface and a left side surface of the housing 51 and a connection portion between the lower side surface and the left side surface of the housing 51. Thus, in a case where the right controller 4 is attached to the main body apparatus 2 (see FIG. 1), the information processing system 1 as the integrated apparatus has a rounded shape on its right side. This shape makes it easy for the user to hold the information processing system 1.

Similarly to the left controller 3, the right controller 4 includes an analog stick 52 as a direction input section. In the exemplary embodiment, the analog stick 52 has the same configuration as that of the analog stick 32 of the left controller 3. Further, similarly to the left controller 3, the right controller 4 includes four operation buttons 53 to 56 (specifically, an A-button 53, a B-button 54, an X-button 55, and a Y-button 56). In the exemplary embodiment, the four operation buttons 53 to 56 have the same mechanisms as those of the four operation buttons 33 to 36 of the left controller 3. As shown in FIG. 5, the analog stick 52 and the operation buttons 53 to 56 are provided on the main surface of the housing 51. It should be noted that in the exemplary embodiment, four operation buttons are provided on the main surface of the right controller 4. The number of operation buttons, however, is optional.

Here, in the exemplary embodiment, the positional relationship between the two types of operation sections (the analog stick and the operation buttons) of the right controller 4 is opposite to the positional relationship between these two types of operation sections of the left controller 3. That is, in the right controller 4, the analog stick 52 is placed below the operation buttons 53 to 56, whereas in the left controller 3, the analog stick 32 is placed above the operation buttons 33 to 36. With such placement, in a case where the left controller 3 and the right controller 4 are used by being detached from the main body apparatus 2, it is possible to use the left controller 3 and the right controller 4 with similar operation feelings.

Further, the right controller 4 includes a "+" (plus) button 57. As shown in FIG. 5, the "+" button 57 is provided on the main surface of the housing 51, and more specifically, is provided in an upper left area on the main surface. Similarly to the other operation buttons 53 to 56, the "+" button 57 is used to give instructions corresponding to various programs (e.g., an OS program and an application program) executed by the main body apparatus 2. The "+" button 57 is, for example, used as a start button in a game application (e.g., a button used to give an instruction to start a game).

The right controller 4 includes a home button 58. As shown in FIG. 5, the home button 58 is provided on the main surface of the housing 51, and more specifically, is provided in a lower left area on the main surface. The home button 58 is a button for displaying a predetermined menu screen on the display 12 of the main body apparatus 2. The menu screen is, for example, a screen on which an application specified by the user from among one or more applications that can be executed by the main body apparatus 2 can be started. The menu screen may be displayed, for example, when the main body apparatus 2 is started. In the exemplary embodiment, if the home button 58 is pressed in the state where an application is executed by the main body apparatus 2 (i.e., in the state where an image of the application is displayed on the display 12), a predetermined operation screen may be displayed on the display 12 (at this time, the menu screen may be displayed instead of the operation screen). It should be noted that the operation screen is, for example, a screen on which an instruction to end the application and display the menu screen on the display 12, an instruction to resume the application, and the like can be given.

In a case where the right controller 4 is attached to the main body apparatus 2, operation sections (specifically, the analog stick 52 and the buttons 53 to 58) provided on the main surface of the right controller 4 are operated with, for example, the thumb of the right hand of the user holding the information processing system 1. Further, in a case where the right controller 4 is used while being held in a horizontal orientation with both hands in the state where the right controller 4 is detached from the main body apparatus 2, the above operation sections are operated with, for example, the thumbs of the left and right hands of the user holding the right controller 4. Specifically, In this case, the analog stick 52 is operated with the thumb of the left hand of the user, and the operation buttons 53 to 56 are operated with the thumb of the right hand of the user.

The right controller 4 includes a first R-button 60. Further, the right controller 4 includes a ZR-button 61. As shown in FIG. 5, the first R-button 60 is provided in an upper right portion on the side surface of the housing 51. Further, the ZR-button 61 is provided in an upper right portion from the side surface to a back surface of the housing 51 (to be exact, an upper right portion when the housing 51 is viewed from its front side). That is, the ZR-button 61 is provided on the back side of the first R-button 60 (further in the positive z-axis direction shown in FIG. 1). In the exemplary embodiment, since an upper right portion of the housing 51 has a rounded shape, the first R-button 60 and the ZR-button 61 have rounded shapes corresponding to the roundness of the upper right portion of the housing 51. In a case where the right controller 4 is attached to the main body apparatus 2, the first R-button 60 and the ZR-button 61 are placed in an upper right portion of the information processing system 1.

The right controller 4 includes a slider mechanism similar to that of the left controller 3. That is, the right controller 4 includes the slider 62 described above. As shown in FIG. 5, the slider 62 is provided so as to extend in the up-down direction on the left side surface of the housing 51. The slider 62 is shaped so as to be engaged with the right rail member 19 of the main body apparatus 2 (more specifically, grooves in the right rail member 19). Thus, the slider 62 engaged with the right rail member 19 is fixed so as not to be detached in a direction perpendicular to the slide direction (in other words, the direction in which the right rail member 19 extends).

Further, the right controller 4 includes the terminal 64 for the right controller 4 to wirelessly communicate with the main body apparatus 2. The terminal 64 is provided at the position where, in a case where the right controller 4 is attached to the main body apparatus 2, the terminal 64 comes into contact with the right terminal 21 of the main body apparatus 2 (FIG. 3). The specific position of the terminal 64 is optional. In the exemplary embodiment, as shown in FIG. 5, the terminal 64 is provided on an attachment surface of the slider 62. In the exemplary embodiment, the terminal 64 is provided near a lower end portion on the attachment surface of the slider 62.

It should be noted that the shapes, the numbers, and the installation positions of the above components (specifically, the sliders, the sticks, the buttons, and the like) provided in the housings 31 and 51 of the left controller 3 and the right controller 4 are optional. For example, in another exemplary embodiment, the left controller 3 and the right controller 4 may each include a direction input section of a type different from that of an analog stick. Further, the slider 40 or 62 may be placed at a position corresponding to the position of the rail member 15 or 19 provided on the main body apparatus 2, and for example, may be placed on the main surface or the back surface of the housing 31 or 51. Further, in another exemplary embodiment, the left controller 3 and the right controller 4 may be configured not to include some of the above components.

Figure 6:
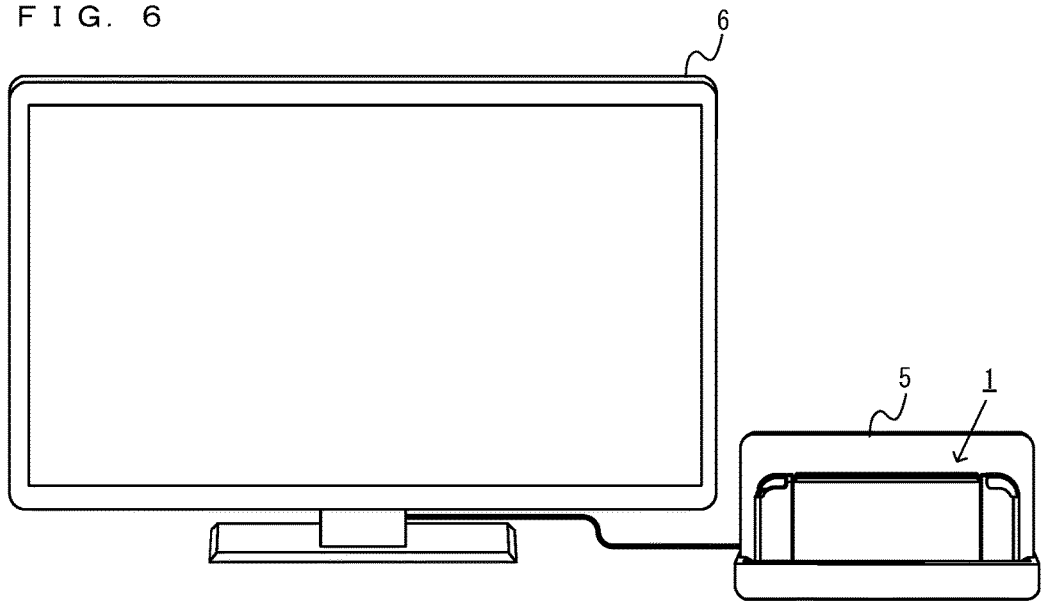
FIG. 6 is a diagram showing the overall configuration of another non-limiting example of the information processing system according to the exemplary embodiment.

FIG. 6 is a diagram showing the overall configuration of another example of the information processing system according to the exemplary embodiment. As shown in FIG. 6, as an example, the integrated apparatus obtained by attaching the left controller 3 and the right controller 4 to the main body apparatus 2 can be mounted on the cradle 5. Further, as yet another example, only the main body apparatus 2 can also be mounted on the cradle 5 in the state where the left controller 3 and the right controller 4 are detached from the main body apparatus 2. Further, the cradle 5 can communicate (through wired communication or wireless communication) with a stationary monitor 6 (e.g., a stationary television), which is an example of an external display apparatus separate from the display 12. Although the details will be described later, in a case where the above integrated apparatus or the main body apparatus 2 alone is mounted on the cradle 5, the information processing system can display on the stationary monitor 6 an image acquired or generated by the main body apparatus 2. Further, in the exemplary embodiment, the cradle 5 has the function of charging the above integrated apparatus or the main body apparatus 2 alone mounted thereon. Further, the cradle 5 has the function of a hub apparatus (specifically, a USB hub).

Figure 7:
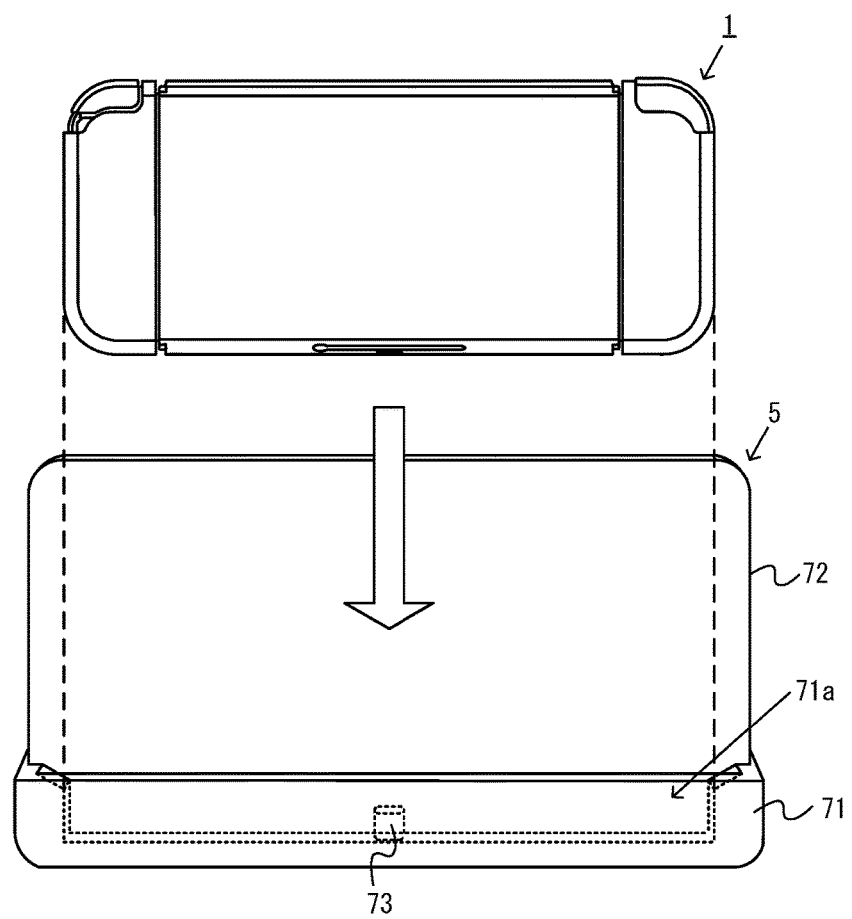
FIG. 7 is a diagram showing a non-limiting example of the external configuration of a cradle 5.

FIG. 7 is a diagram showing an example of the external configuration of the cradle 5. The cradle 5 includes a housing on which the main body apparatus 2 can be detachably mounted (or attached). In the exemplary embodiment, as shown in FIG. 7, the housing includes a first supporting portion 71, in which a groove 71*a* is formed, and a generally planar second supporting portion 72.

As shown in FIG. 7, the groove 71*a* formed in the first supporting portion 71 has a shape corresponding to the shape of a lower portion of the above integrated apparatus. Specifically, the groove 71*a* is so shaped that the lower portion of the above integrated apparatus can be inserted into the groove 71*a*, and more specifically, is so shaped as to approximately coincide with the lower portion of the main body apparatus 2. Thus, the lower portion of the above integrated apparatus is inserted into the groove 71a, whereby it is possible to mount the above integrated apparatus on the cradle 5. Further, the second supporting portion 72 supports a front surface of the above integrated apparatus (i.e., the surface on which the display 12 is provided) of which the lower portion is inserted into the groove 71a. With the second supporting portion 72, the cradle 5 can support the above integrated apparatus more stably. It should be noted that the shape of the housing shown in FIG. 7 is merely illustrative. Alternatively, in another exemplary embodiment, the housing of the cradle 5 may have any shape that allows the main body apparatus 2 to be mounted on the housing.

As shown in FIG. 7, further, the cradle 5 includes a main body terminal 73 for the cradle 5 to communicate with the above integrated apparatus. As shown in FIG. 7, the main body terminal 73 is provided on a bottom surface of the groove 71a, which is formed in the first supporting portion 71. More specifically, the main body terminal 73 is provided at the position where, in a case where the above integrated apparatus is attached to the cradle 5, the lower terminal 27 of the main body apparatus 2 comes into contact with the main body terminal 73. In the exemplary embodiment, the main body terminal 73 is a USB connector (more specifically, a male connector). It should be noted that in the exemplary embodiment, the above integrated apparatus can be attached to the cradle 5 even if the above integrated apparatus is placed face up or face down. Thus, the lower terminal 27 of the main body apparatus 2 and the main body terminal 73 of the cradle 5 have symmetrical shapes in the depth direction (i.e., the z-axis direction shown in FIG. 1). The lower terminal 27 and the main body terminal 73 can communicate with each other even if these terminals are connected in either of the two types of orientations in the depth direction.

Figure 10:
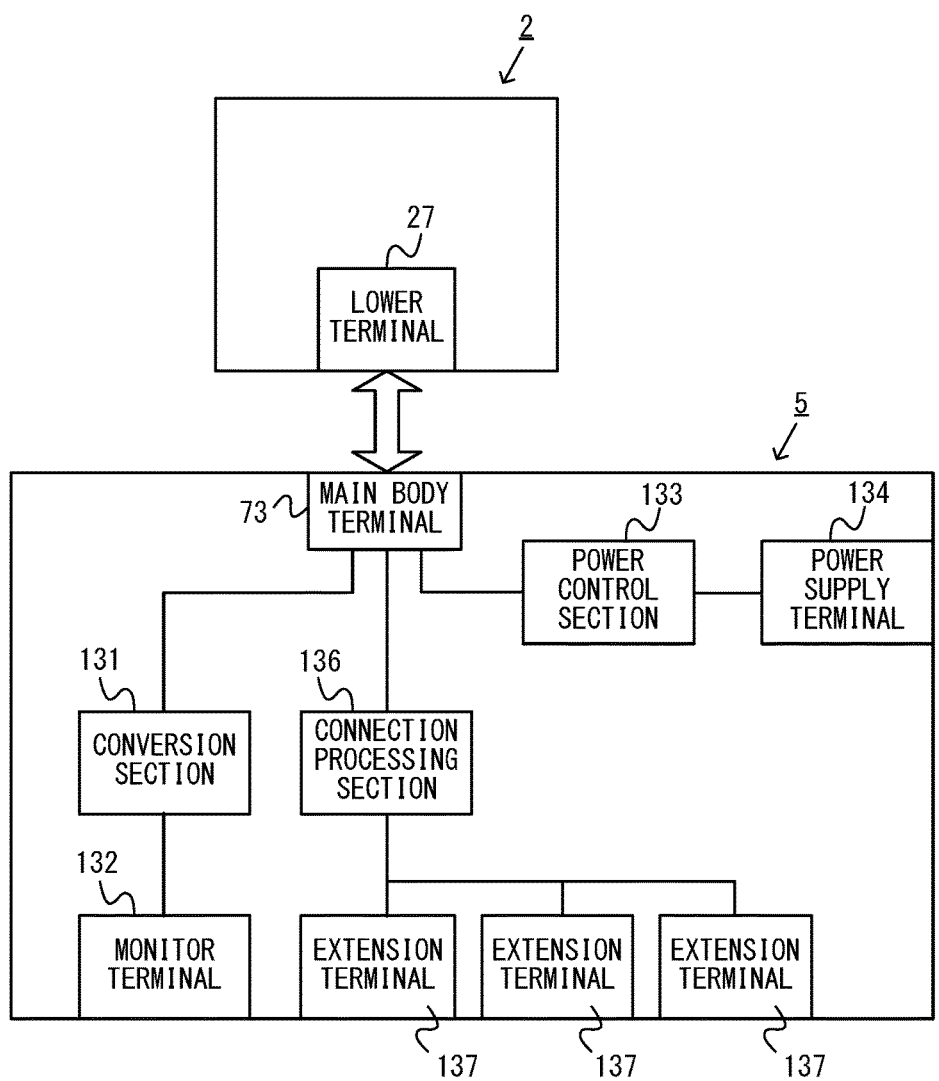
FIG. 10 is a block diagram showing a non-limiting example of the internal configuration of the cradle 5.

Although not shown in FIG. 7, the cradle 5 includes a terminal (includes a plurality of terminals, specifically, a monitor terminal 132, a power supply terminal 134, and extension terminals 137, which are shown in FIG. 10 in the exemplary embodiment) on a back surface of the housing. The details of these terminals will be described later.

The shapes, the numbers, and the installation positions of the above components (specifically, the housing, the terminals, the buttons, and the like) provided in the cradle 5 are optional. For example, in another exemplary embodiment, the housing may have another shape with which the integrated apparatus obtained by attaching the left controller 3 and the right controller 4 to the main body apparatus 2, or the main body apparatus 2 alone can be supported. Further, some of the terminals provided in the housing may be provided on a front surface of the housing. Alternatively, in another exemplary embodiment, the cradle 5 may be configured not to include some of the above components.

Figure 8:
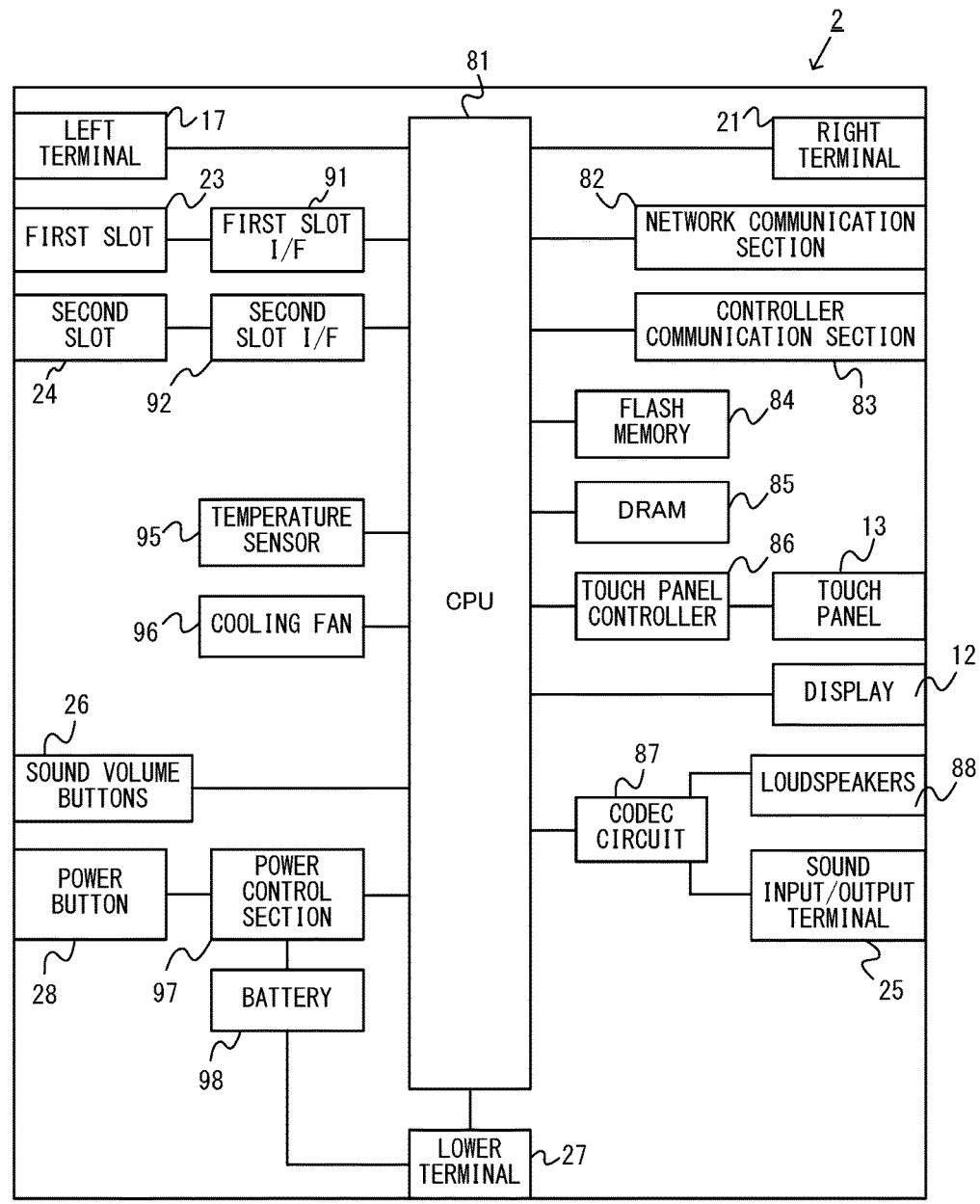
FIG. 8 is a block diagram showing a non-limiting example of the internal configuration of the main body apparatus 2.

FIG. 8 is a block diagram showing an example of the internal configuration of the main body apparatus 2. The main body apparatus 2 includes components 81 to 98 shown in FIG. 8 in addition to the components shown in FIG. 3. Some of the components 81 to 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. The CPU 81 executes an information processing program stored in a storage section (specifically, an internal storage medium such as a flash memory 84, an external storage medium attached to each of the slots 23 and 24, or the like), thereby performing various types of information processing.

The main body apparatus 2 includes the flash memory 84 and a DRAM (Dynamic Random Access Memory) 85 as examples of an internal storage medium built into the main body apparatus 2. The flash memory 84 and the DRAM 85 are connected to the CPU 81. The flash memory 84 is a memory mainly used to store various pieces of data (or programs) to be saved in the main body apparatus 2. The DRAM 85 is a memory used to temporarily store various pieces of data used for information processing.

The main body apparatus 2 includes a first slot interface (hereinafter abbreviated as "I/F") 91. Further, the main body apparatus 2 includes a second slot I/F 92. The first slot I/F 91 and the second slot I/F 92 are connected to the CPU 81. The first slot I/F 91 is connected to the first slot 23, and in accordance with an instruction from the CPU 81, reads and writes data from and to the first type storage medium (e.g., an SD card) attached to the first slot 23. The second slot I/F 92 is connected to the second slot 24, and in accordance with an instruction from the CPU 81, reads and writes data from and to the second type storage medium (e.g., a dedicated memory card) attached to the second slot 24.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN using a method compliant with the Wi-Fi standard and communicates with an external apparatus. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and the right controller 4.

The CPU 81 is connected to the left terminal 17, the right terminal 21, and the lower terminal 27. When wirelessly communicating with the left controller 3, the CPU 81 transmits data to the left controller 3 via the left terminal 17 and also receives operation data from the left controller 3 via the left terminal 17. Further, when wirelessly communicating with the right controller 4, the CPU 81 transmits data to the right controller 4 via the right terminal 21 and also receives operation data from the right controller 4 via the right terminal 21. Further, when communicating with the cradle 5, the CPU 81 transmits data to the cradle 5 via the lower terminal 27. As described above, in the exemplary embodiment, the main body apparatus 2 can perform both wired communication and wireless communication with each of the left controller 3 and the right controller 4. Further, in a case where the integrated apparatus obtained by attaching the left controller 3 and the right controller 4 to the main body apparatus 2 is attached to the cradle 5, the main body apparatus 2 can output data (e.g., image data or sound data) to the stationary monitor 6 via the cradle 5.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using the plurality of left controllers 3 and the plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays on the display 12 a generated image (e.g., an image generated by executing the above information processing) and/or an externally acquired image.

The main body apparatus 2 includes a codec circuit 87 and the loudspeakers (specifically, a left loudspeaker and a right loudspeaker) 88. The codec circuit 87 is connected to the loudspeakers 88 and the sound input/output terminal 25 and also connected to the CPU 81. The codec circuit 87 is a circuit for controlling the input and output of sound data to and from the loudspeakers 88 and the sound input/output terminal 25. That is, if receiving sound data from the CPU 81, the codec circuit 87 outputs sound signals obtained by performing D/A conversion on the sound data to the loudspeakers 88 or the sound input/output terminal 25. Consequently, sounds are output from the loudspeakers 88 or a sound output section (e.g., earphones) connected to the sound input/output terminal 25. Further, if receiving a sound signal from the sound input/output terminal 25, the codec circuit 87 performs A/D conversion on the sound signal and outputs sound data in a predetermined format to the CPU 81. Further, the sound volume buttons 26 are connected to the CPU 81. Based on an input to the sound volume buttons 26, the CPU 81 controls the volume of sounds output from the loudspeakers 88 or the sound output section.

The main body apparatus 2 includes a power control section 97 and a battery 98. The power control section 97 is connected to the battery 98 and the CPU 81. Further, although not shown in FIG. 8, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components. Further, the power control section 97 is connected to the power button 28. Based on an input to the power button 28, the power control section 97 controls the supply of power to the above components. That is, in a case where the operation of turning off power supply is performed on the power button 28, the power control section 97 stops the supply of power to all or some of the above components. In a case where the operation of turning on power supply is performed on the power button 28, the power control section 97 starts the supply of power to all or some of the above components. Further, the power control section 97 outputs, to the CPU 81, information indicating an input to the power button 28 (specifically, information indicating whether or not the power button 28 is pressed).

Further, the battery 98 is connected to the lower terminal 27. In a case where an external charging apparatus (e.g., the cradle 5) is connected to the lower terminal 27, and power is supplied to the main body apparatus 2 via the lower terminal 27, the battery 98 is charged with the supplied power.

Further, the main body apparatus 2 includes a cooling fan 96 for releasing heat inside the main body apparatus 2. The cooling fan 96 operates to introduce air outside the housing 11 through the inlet hole 11d and also release air inside the housing 11 through the exhaust hole 11c, thereby releasing heat inside the housing 11. The cooling fan 96 is connected to the CPU 81, and the operation of the cooling fan 96 is controlled by the CPU 81. Further, the main body apparatus 2 includes a temperature sensor 95, which detects the temperature inside the main body apparatus 2. The temperature sensor 95 is connected to the CPU 81, and the detection result by the temperature sensor 95 is output to the CPU 81. Based on the detection result by the temperature sensor 95, the CPU 81 controls the operation of the cooling fan 96.

Figure 9:
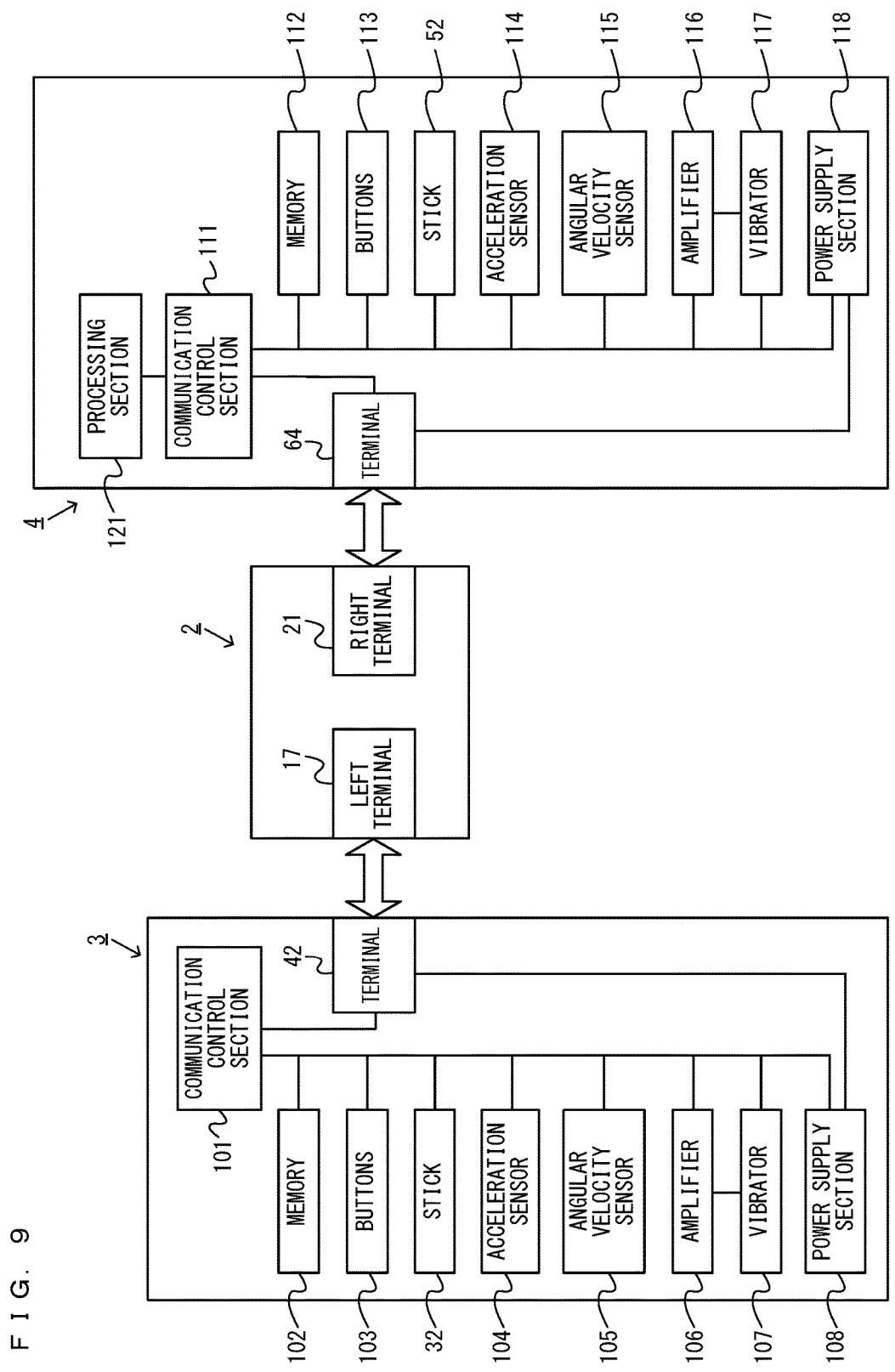
FIG. 9 is a block diagram showing a non-limiting example of the internal configuration of the information processing system 1.

FIG. 9 is a block diagram showing an example of the internal configuration of the information processing system 1. It should be noted that the details of the internal configuration of the main body apparatus 2 in the information processing system 1 are shown in FIG. 8 and therefore are omitted in FIG. 9.

The left controller 3 includes a communication control section 101, which communicates with the main body apparatus 2. As shown in FIG. 9, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, in a case where the left controller 3 is attached to the main body apparatus 2, the communication control section 101 communicates with the main body apparatus 2 via the terminal 42. Further, in a case where the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various types of processing.

The left controller 3 includes buttons 103 (specifically, the buttons 33 to 39, 43, and 44). Further, the left controller 3 includes the analog stick ("stick" in FIG. 9) 32. Each of the buttons 103 and the analog stick 32 outputs information regarding an operation performed on itself to the communication control section 101 repeatedly at appropriate timing.

The left controller 3 includes an acceleration sensor 104. In the exemplary embodiment, the acceleration sensor 104 detects the magnitudes of linear accelerations along predetermined three axial (e.g., the xyz axes shown in FIG. 1) directions. It should be noted that the acceleration sensor 104 may detect an acceleration along one axial direction or accelerations along two axial directions. Further, the left controller 3 includes an angular velocity sensor 105. In the exemplary embodiment, the angular velocity sensor 105 detects an angular velocity about predetermined three axes (e.g., the xyz axes shown in FIG. 1). It should be noted that the angular velocity sensor 105 may detect an angular velocity about one axis or an angular velocity about two axes. Each of the acceleration sensor 104 and the angular velocity sensor 105 is connected to the communication control section 101. Then, the detection results by the acceleration sensor 104 and the angular velocity sensor 105 are output to the communication control section 101 repeatedly at appropriate timing.

The communication control section 101 acquires information regarding an input (specifically, information regarding an operation or the detection result by the sensor) from each of input sections (specifically, the buttons 103, the analog stick 32, and the sensors 104 and 105). The communication control section 101 transmits, to the main body apparatus 2, operation data including the acquired information (or information obtained by performing predetermined processing on the acquired information). It should be noted that the operation data is transmitted repeatedly, once every predetermined time. It should be noted that the interval at which information regarding an input is transmitted to the main body apparatus 2 may or may not be the same between the input sections.

The above operation data is transmitted to the main body apparatus 2, whereby the main body apparatus 2 can obtain inputs provided to the left controller 3. That is, the main body apparatus 2 can distinguish operations on the buttons 103 and the analog stick 32 based on the operation data. Further, the main body apparatus 2 can calculate information regarding the motion and/or the orientation of the left controller 3 based on the operation data (specifically, the detection results by the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the command. Here, the left controller 3 includes an amplifier 106. If receiving the above command, the communication control section 101 outputs a control signal corresponding to the command to the amplifier 106. The amplifier 106 amplifies the control signal from the communication control section 101, generates a driving signal for driving the vibrator 107, and outputs the driving signal to the vibrator 107. Consequently, the vibrator 107 operates.

The left controller 3 includes a power supply section 108. In the exemplary embodiment, the power supply section 108 includes a battery and a power control circuit. Although not shown in FIG. 9, the power control circuit is connected to the battery and also connected to components of the left controller 3 (specifically, components that receive power supplied from the battery). The power control circuit controls the supply of power from the battery to the above components. Further, the battery is connected to the terminal 42. In the exemplary embodiment, in a case where the left controller 3 is attached to the main body apparatus 2, the battery is charged via the terminal 42 with power supplied from the main body apparatus 2 under a predetermined condition.

As shown in FIG. 9, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections (specifically, buttons 113, the analog stick 52, an acceleration sensor 114, and an angular velocity sensor 115) similar to the input sections of the left controller 3. These input sections have functions similar to those of the input sections of the left controller 3 and operate similarly to the input sections of the left controller 3.

Further, the right controller 4 includes a vibrator 117 and an amplifier 116. The vibrator 117 and the amplifier 116 operate similarly to the vibrator 107 and the amplifier 106, respectively, of the left controller 3. That is, in accordance with a command from the main body apparatus 2, the communication control section 111 causes the vibrator 117 to operate, using the amplifier 116.

The right controller 4 includes a power supply section 118. The power supply section 118 has a function similar to that of the power supply section 108 of the left controller 3 and operates similarly to the power supply section 108. That is, the power supply section 118 controls the supply of power to components that receive power supplied from a battery. In a case where the right controller 4 is attached to the main body apparatus 2, the battery is charged via the terminal 64 with power supplied from the main body apparatus 2 under a predetermined condition.

The right controller 4 includes a processing section 121. The processing section 121 is connected to the communication control section 111 and also connected to an NFC communication section 122. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operation (specifically, reading, writing, or the like) of the NFC communication section 122 performed on a communication partner (e.g., an NFC tag). Further, the processing section 121 receives, from the main body apparatus 2, information to be transmitted to the communication partner via the communication control section 111 and passes the information to the NFC communication section 122. Further, the processing section 121 acquires, via the NFC communication section 122, information received from the communication partner and transmits the information to the main body apparatus 2 via the communication control section 111. Further, in accordance with a command from the main body apparatus 2, the processing section 121 performs the process of managing an infrared image capturing section 123. For example, the processing section 121 causes the infrared image capturing section 123 to perform an image capturing operation. Further, the processing section 121 acquires information based on an image capturing result (information of a captured image, information calculated from this information, or the like) and transmits the information to the main body apparatus 2 via the communication control section 111.

FIG. 10 is a block diagram showing an example of the internal configuration of the cradle 5. It should be noted that the details of the internal configuration of the main body apparatus 2 are shown in FIG. 8 and therefore are omitted in FIG. 10.

As shown in FIG. 10, the cradle 5 includes a conversion section 131 and a monitor terminal 132. The conversion section 131 is connected to a main body terminal 73 and the monitor terminal 132. The conversion section 131 converts the formats of signals of an image (or video) and a sound received from the main body apparatus 2 into formats in which the image and the sound are output to the stationary monitor 6. Here, in the exemplary embodiment, the main body apparatus 2 outputs signals of an image and a sound as display port signals (i.e., signals compliant with the DisplayPort standard) to the cradle 5. Further, in the exemplary embodiment, as the communication between the cradle 5 and the stationary monitor 6, communication based on the HDMI (registered trademark) standard is used. That is, the monitor terminal 132 is an HDMI terminal, and the cradle 5 and the stationary monitor 6 are connected together by an HDMI cable. Then, the conversion section 131 converts the display port signals (specifically, the signals representing the video and the sound) received from the main body apparatus 2 via the main body terminal 73 into HDMI signals. The converted HDMI signals are output to the stationary monitor 6 via the monitor terminal 132.

The cradle 5 includes a power control section 133 and a power supply terminal 134. The power supply terminal 134 is a terminal for connecting a charging apparatus (e.g., an AC adapter or the like) (not shown). In the exemplary embodiment, an AC adapter is connected to the power supply terminal 134, and mains electricity is supplied to the cradle 5. In a case where the main body apparatus 2 is attached to the cradle 5, the power control section 133 supplies power from the power supply terminal 134 to the main body apparatus 2 via the main body terminal 73. Consequently, the battery 98 of the main body apparatus 2 is charged.

Further, the cradle 5 includes a connection processing section 136 and extension terminals 137. Each of the extension terminals 137 is a terminal for connecting to another apparatus. In the exemplary embodiment, the cradle 5 includes a plurality of (more specifically, three) USB terminals as the extension terminals 137. The connection processing section 136 is connected to the main body terminal 73 and the extension terminals 137. The connection processing section 136 has a function as a USB hub and for example, manages the communication between an apparatus connected to each of the extension terminals 137 and the main body apparatus 2 connected to the main body terminal 73 (i.e., transmits a signal from a certain apparatus to another apparatus by appropriately distributing the signal). As described above, in the exemplary embodiment, the information processing system 1 can communicate with another apparatus via the cradle 5. It should be noted that the connection processing section 136 may be able to change the communication speed, or supply power to an apparatus connected to the extension terminal 137.

As describe above, in the information processing system 1 according to the exemplary embodiment, the left controller 3 and the right controller 4 are attachable to and detachable from the main body apparatus 2. Further, the integrated apparatus obtained by attaching the left controller 3 and the right controller 4 to the main body apparatus 2 or the main body apparatus 2 alone is attached to the cradle 5 and thereby can output an image (and a sound) to the stationary monitor 6. Thus, the information processing system 1 can be used in various use forms as described below. A description is given below of the operation of the information processing system in main use forms in the state where the left controller 3 and the right controller 4 are detached from the main body apparatus 2.

As described above, in the exemplary embodiment, the information processing system 1 can be used in the state where the left controller 3 and the right controller 4 are detached from the main body apparatus 2 (referred to as a "separate state"). As a form in a case where an operation is performed on the same application (e.g., a game application) using the information processing system 1 in the separate state, at least the following two forms are possible. The two forms include a form in which a single user uses at least one of the left controller 3 and the right controller 4, and a form in which two users use respective controllers.

Figure 11:
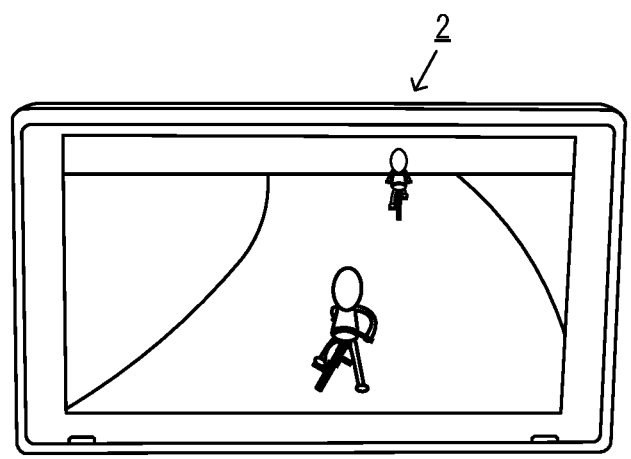
FIG. 11 is a diagram showing a non-limiting example of the state where a single user uses the information processing system 1 by holding one of the left controller 3 and the right controller 4 in a separate state.
Figure 11:
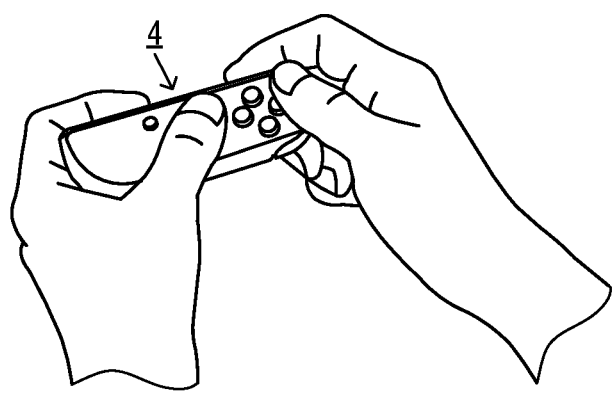

FIG. 11 is a diagram showing an example of the state where a single user uses the information processing system 1 by holding one (the right controller 4 in FIG. 11) of the left controller 3 and the right controller 4 in the separate state. As shown in FIG. 11, in the separate state, the user can view an image displayed on the display 12 of the main body apparatus 2 while operating one of the left controller 3 and the right controller 4 by holding it with both hands or one hand.

It should be noted that an operation on each controller used in an application may be any operation. For example, the user can perform operations on the operation sections (the operation buttons and the analog stick) included in the controller. Further, in the exemplary embodiment, based on the detection results by the acceleration sensor and/or the angular velocity sensor included in the controller, it is possible to calculate information regarding the motion and/or the orientation of the controller. Thus, the information processing system 1 can receive as an input the operation of moving the controller itself. The user can perform not only operations on the operation sections included in the controller, but also the operation of moving the controller itself. That is, in the exemplary embodiment, despite being a mobile device, the information processing system 1 can provide the user with the operation of moving a controller (without moving a display). Further, despite being a mobile device, the information processing system 1 can provide an information processing apparatus that can be operated by the user at a place away from the display 12.

Figure 12:
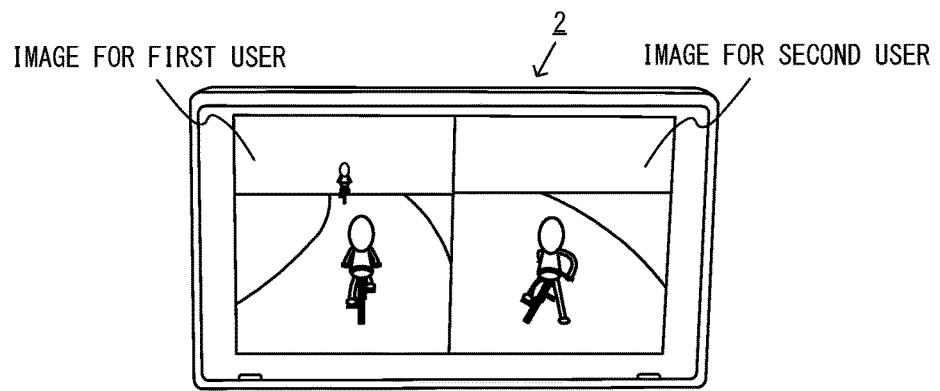
FIG. 12 is a diagram showing a non-limiting example of the state where two users use a single information processing system 1 by each holding a single controller in the separate state.
Figure 12:
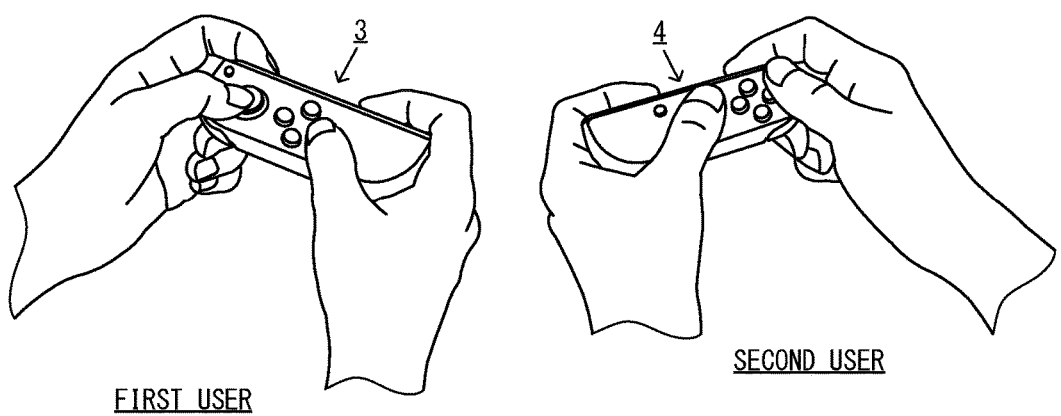

FIG. 12 is a diagram showing an example of the state where two users use the information processing system 1 by each holding a single controller in the separate state. As shown in FIG. 12, in the separate state, two users can perform operations. Specifically, one (referred to as a "first user") of the users can perform an operation using the left controller 3, and at the same time, the other user (referred to as a "second user") can perform an operation using the right controller 4. For example, based on an operation on the left controller 3, the information processing system 1 controls the action of a first object (e.g., a player character) in a virtual space, and based on an operation on the right controller 4, the information processing system 1 performs information processing for controlling the action of a second object in the same virtual space. It should be noted that also in the form shown in FIG. 12, similarly to the form shown in FIG. 11, each of the first user and the second user can perform operations on the operation sections included in the controller and/or the operation of moving the controller itself.

Further, in the exemplary embodiment, the positional relationship between the analog stick 52 and the operation buttons 53 to 56 in the right controller 4 is opposite to the positional relationship between these two types of operation sections in the left controller 3 in a case where the right controller 4 is placed to be vertically long as in FIG. 2. Thus, as shown in FIG. 12, in a case where the two users hold the left controller 3 and the right controller 4 in horizontally long orientations, the positional relationship between the two types of operation sections is the same between the two controllers. That is, in the exemplary embodiment, the user can use the two types of operation sections in the left controller 3 and the right controller 4 detached from the main body apparatus 2 in similar operation feelings. This can improve the operability of the controllers.

Further, in the separate state, the four operation buttons 33 to 36 of the left controller 3 may be used as the same functions as those of the four operation buttons 53 to 56 of the right controller 4 (in other words, may be used to give the same instructions). As an example, the right direction button 33 may be used as the same function as that of the Y-button 56. The down direction button 34 may be used as the same function as that of the X-button 55. The up direction button 35 may be used as the same function as that of the B-button 54. The left direction button 36 may be used as the same function as that of the A-button 53. As described above, in the exemplary embodiment, the functions of the operation buttons 33 to 36 may be changed between the attachment state and the separate state. For what instruction each operation button is used may be freely determined depending on a program executed by the main body apparatus 2.

In FIG. 12, the information processing system 1 splits the display area of the display 12 into two display areas. Then, the information processing system 1 displays an image for the first user operating the left controller 3 (e.g., an image including the first object) in one of the split display areas and displays an image for the second user operating the right controller 4 (e.g., an image including the second object) in the other split display area. As described above, in the exemplary embodiment, in a case where a plurality of operators perform operations (e.g., multiplayer play) using a single information processing system 1, the display area of the display 12 is split in accordance with the number of the operators, and at least images for the respective operators are displayed. It should be noted that in a case where the images for the plurality of operators are displayed, the display area itself of the display 12 does not need to be physically separated. Further, it is not necessary to generate pieces of image data for the plurality of respective operators, either. A single image (e.g., a single game image) including images on which operations using a plurality of operation devices (the left controller 3 and the right controller 4 in this case) are reflected may be generated by screen splitting, and the single image may be displayed in the display area of the display 12. At this time, the process of generating a single piece of image data including a plurality of scenes by screen splitting, and displaying the single piece of image data in a single display section may be performed.

In the separate state, the communication between the main body apparatus 2 and the left controller 3 and the right controller 4 is performed through wireless communication. That is, when wireless communication is established (pairing is performed) between the main body apparatus 2 and the left controller 3 and/or the right controller 4, the main body apparatus 2 receives operation data from the left controller 3 and/or the right controller 4, and based on the received operation data (specifically, using the operation data as an input), performs information processing. It should be noted that in the exemplary embodiment, in the case of wireless communication, the main body apparatus 2 distinguishes a plurality of controllers that are communication partners. That is, when wireless communication is established between the main body apparatus 2 and a plurality of controllers, the main body apparatus 2 identifies which of the controllers received operation data is transmitted from. The method for distinguishing the controllers will be described later.

As described above, in the use form shown in FIG. 12, the display 12 of the main body apparatus 2, which is a mobile apparatus, can be used by being split into display areas used by a plurality of respective users. Here, in a case where a display screen of a stationary display apparatus is split into display areas, and the display areas are used by a plurality of users, the place where images obtained by splitting the display area of the display apparatus are displayed is limited to the installation location of the display apparatus because it is difficult to carry around the display apparatus. It is, however, easy to carry around the main body apparatus 2. Thus, at a place desired by users, the main body apparatus 2 can display images obtained by splitting the display area.

Figure 13:
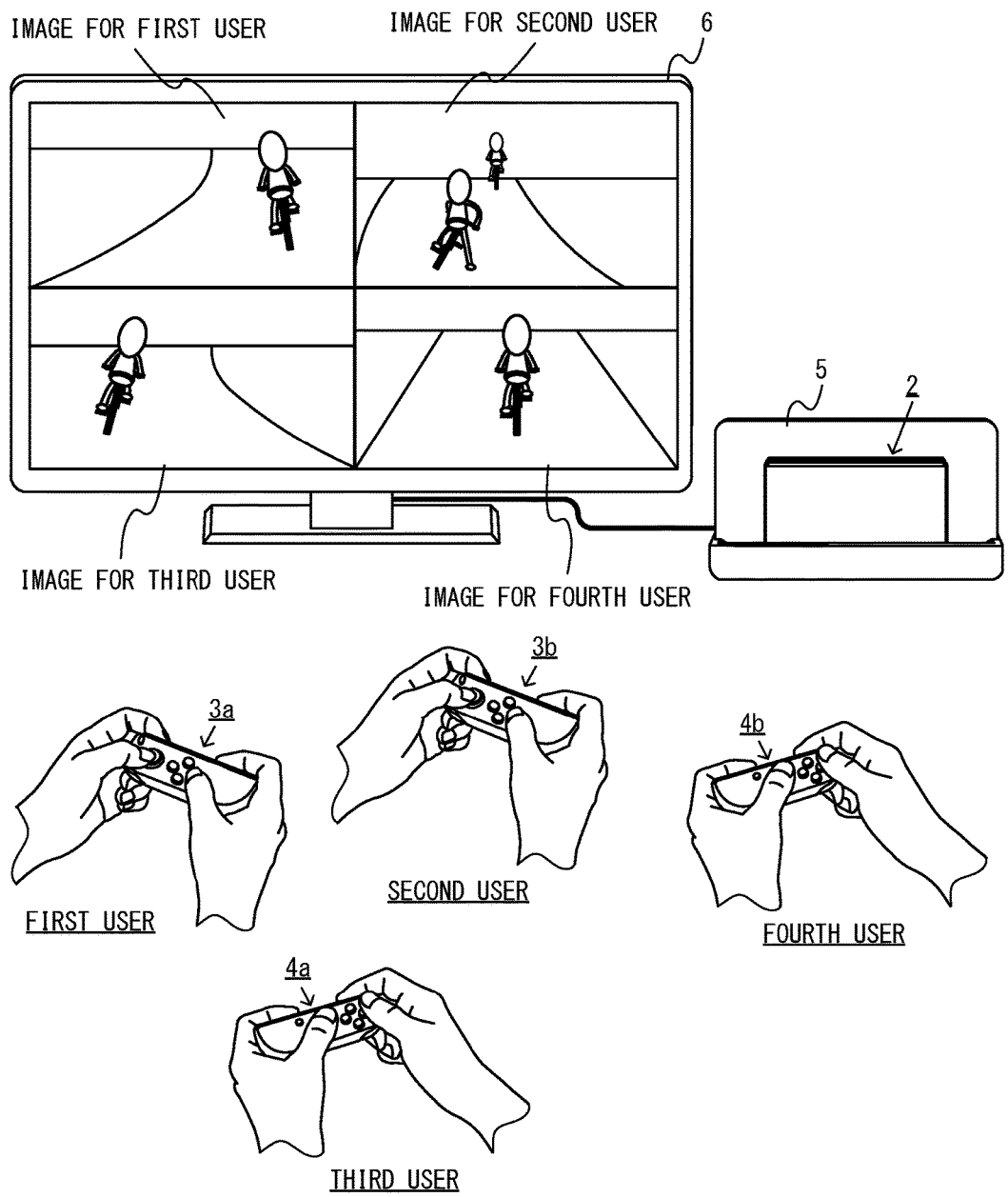
FIG. 13 is a diagram showing a non-limiting example of a use form in a case where images are displayed on a stationary monitor 6 using three or more controllers.

As described above, in the exemplary embodiment, the main body apparatus 2 can communicate with a plurality of left controllers 3. Further, the main body apparatus 2 can communicate with a plurality of right controllers 4. Thus, in the exemplary embodiment, it is possible to simultaneously use three or more controllers. Further, in the exemplary embodiment, the main body apparatus 2 is attached to the cradle 5 and thereby can output an image (and a sound) to the stationary monitor 6 via the cradle 5. FIG. 13 is a diagram showing an example of a use form in a case where images are displayed on the stationary monitor 6 using three or more controllers. As shown in FIG. 13, the information processing system according to the exemplary embodiment can use the stationary monitor 6 as a display apparatus (and a sound output apparatus).

FIG. 13 illustrates an example of a case where a total of four controllers, namely two left controllers 3a and 3b and two right controllers 4a and 4b, are used. It should be noted that here, the controllers are detached from main body apparatuses 2, and a main body apparatus 2 alone is mounted on the cradle 5. In a case where four controllers are thus used, at least the form in which four users each view an image displayed on the stationary monitor 6 using a single controller is possible.

In the exemplary embodiment, in a case where the four controllers are prepared, four users, namely a first user, a second user, a third user, and a fourth user, can perform operations using the controllers. Specifically, the first user performs operations using the left controller 3a, and based on the operations on the left controller 3*a*, information processing for controlling the action of a first object (e.g., a player character) in a virtual space is executed. The second user performs operations using the left controller 3*b*, and based on the operations on the left controller 3*b*, information processing for controlling the action of a second object (e.g., a player character) in the virtual space is executed. The third user performs operations using the right controller 4*a*, and based on the operations on the right controller 4*a*, information processing for controlling the action of a third object (e.g., a player character) in the virtual space is executed. Then, the fourth user performs operations using the right controller 4*b*, and based on the operations on the right controller 4*b*, information processing for controlling the operation of a fourth object (e.g., a player character) in the virtual space is executed. It should be noted that also in the use form shown in FIG. 13, similarly to the use forms shown in FIGS. 11 and 12, each user can perform operations on operation sections included in the controller and/or the operation of moving the controller itself.

In FIG. 13, the information processing system 1 splits the display area of the stationary monitor 6 into four display areas (referred to as a "first display area" to a "fourth display area"). Then, the information processing system 1 displays an image for the first user operating the left controller 3*a* (e.g., an image including the first object) in the split first display area, displays an image for the second user operating the left controller 3*b* (e.g., an image including the second object) in the split second display area, displays an image for the third user operating the right controller 4*a* (e.g., an image including the third object) in the split third display area, and displays an image for the fourth user operating the right controller 4*b* (e.g., an image including the fourth object) in the split fourth display area. As described above, in the exemplary embodiment, in a case where four operators perform operations (e.g., play by three or more players) using a single information processing system 1, the display area of the stationary monitor 6 is split in accordance with the number of the operators, and at least images for the respective operators are displayed. It should be noted that also in a case where three or more operators perform operations using a single information processing system 1, it is possible to split the display 12 of the main body apparatus 2 and display images. However, a display screen provided in a mobile device is relatively small. Thus, in a case where the display screen is split into three or more areas, and screens for respective users are displayed, it is possible that the screens for the respective users are difficult to view. Thus, in the exemplary embodiment, in a case where a display screen needs to be split into three or more areas, an operation using the stationary monitor 6, which has a relatively large display screen, is requested. That is, in the exemplary embodiment, the number of users allowed to perform operations is limited to two in an operation using the display 12 of the main body apparatus 2, while three or more users can perform operations in an operation using the stationary monitor 6 via the cradle 5. It should be noted that also in a case where the images for the plurality of operators are displayed, the display area itself of the stationary monitor 6 does not need to be physically separated. Further, it is not necessary to generate pieces of image data for the plurality of respective operators, either. A single image (e.g., a single game image) including images on which operations using a plurality of operation devices (the left controller 3*a*, the left controller 3*b*, the right controller 4*a*, and the right controller 4*b* in this case) are reflected may be generated by screen splitting, and the single image may be displayed in the display area of the stationary monitor 6. At this time, the process of generating a single piece of image data including a plurality of scenes by screen splitting, and displaying the single piece of image data in a single display section may be performed.

It should be noted that in the example shown in FIG. 13, an example is used where the display area of the stationary monitor 6 is split into four areas, and images for four users are displayed in the respective split display areas. However, in a case where three users use the stationary monitor 6, the display area of the stationary monitor 6 may be split into three areas, or may be split into four areas similarly to the example in FIG. 13. In the second case, images for three users may be displayed in three split display areas among the four split display areas, and any image may be displayed in the remaining split display area. The shapes of the areas before or after the splitting are optional. As an example, in a case where a rectangular display area is split into four areas, the shape of each area after the splitting can be a rectangle similarly to the area before the splitting. Thus, not only in the case of four users but also in the case of three users, the display area may be split into four areas. For five or more users, it is possible to split the area into six areas, eight areas, or nine areas as examples. As described above, even if the number of users differs, the same number of display areas can be set. However, even if the same number of split display areas is set for a different number of users in some cases, at least it can be said that images to be used by a plurality of users based on split display areas are generated in accordance with the number of users.

Further, the main body apparatus 2 wirelessly communicates with each of the four controllers, namely the left controllers 3*a* and 3*b* and the right controllers 4*a* and 4*b*. Here, in the exemplary embodiment, the main body apparatus 2 distinguishes the four controllers. That is, the main body apparatus 2 identifies which of the four controllers received operation data is transmitted from. It should be noted that the method for distinguishing the controllers will be described later.

Figure 14:
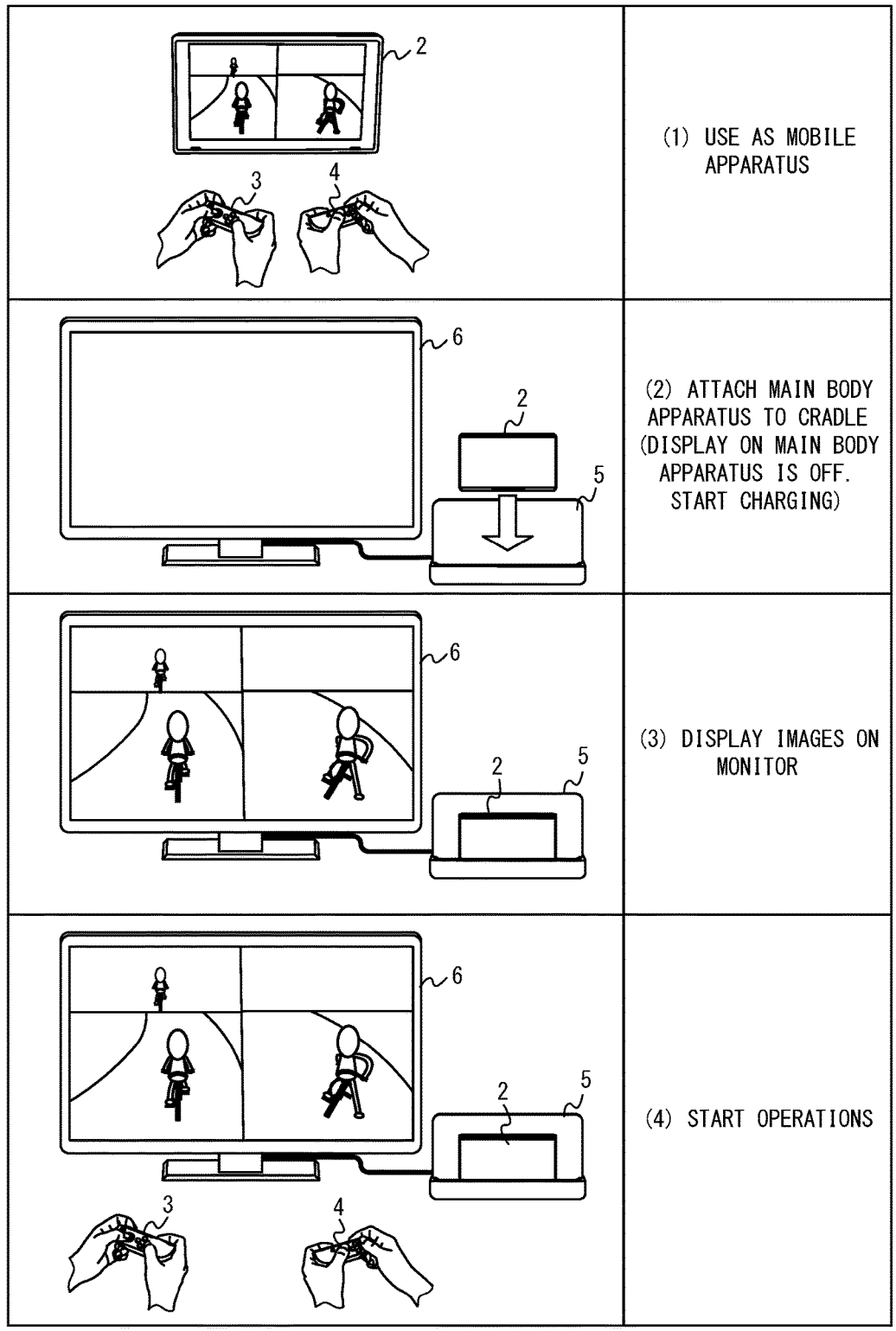
FIG. 14 is a diagram showing a non-limiting example of the flow of an operation in a case where a display 12 of the main body apparatus 2 is switched to a display screen of the stationary monitor 6, and images are displayed.

Next, a description is given of the flow of an operation in which the display 12 of the main body apparatus 2 is switched to the display screen of the stationary monitor 6, and images are displayed. FIG. 14 is a diagram showing an example of the flow of an operation in a case where the display 12 of the main body apparatus 2 is switched to the display screen of the stationary monitor 6, and images are displayed. It should be noted that the cradle 5 is connected to the stationary monitor 6 in advance. Further, a charging apparatus (e.g., an AC adapter) (not shown) is connected to the power supply terminal 134 of the cradle 5, and power is supplied to the cradle 5.

First, users use the information processing system 1 as a mobile device. That is, the users use the information processing system 1 in the state where the information processing system 1 is not attached to the cradle 5 ((1) shown in FIG. 14). In this state, to switch to the form in which the users use the information processing system 1 as a stationary device, the users attach the main body apparatus 2 to the cradle 5 ((2) shown in FIG. 14). Consequently, the lower terminal 27 of the main body apparatus 2 and the main body terminal 73 of the cradle 5 are connected together.

It should be noted that in the exemplary embodiment, if detecting that the main body apparatus 2 is attached to the cradle 5, the main body apparatus 2 stops display on the display 12. As described above, in the exemplary embodiment, in the state where the main body apparatus 2 is attached to the cradle 5, the display 12 of the main body apparatus 2 is not used. It should be noted that in another exemplary embodiment, even in the state where the main body apparatus 2 is attached to the cradle 5, the main body apparatus 2 may display an image on the display 12. In the exemplary embodiment, if detecting that the main body apparatus 2 is detached from the cradle 5, the main body apparatus 2 starts display on the display 12.

In the exemplary embodiment, if detecting that the main body apparatus 2 (or the integrated apparatus obtained by attaching the left controller 3 and the right controller 4 to the main body apparatus 2) is attached to the cradle 5, the cradle 5 starts charging the main body apparatus 2. That is, if the attachment of the main body apparatus 2 to the cradle 5 is detected, the power control section 133 performs the operation of supplying power from the power supply terminal 134 to the main body apparatus 2. The power control section 133 starts this operation, whereby the cradle 5 starts charging the main body apparatus 2. That is, in the main body apparatus 2, the battery 98 is charged with power supplied from the cradle 5 via the lower terminal 27. Further, in a case where the cradle 5 charges the main body apparatus 2, and in the state where controllers (specifically, the left controller 3 and/or the right controller 4) are attached to the main body apparatus 2, the main body apparatus 2 charges the controllers attached to the main body apparatus 2. That is, in the above case, the power control section 97 of the main body apparatus 2 supplies power supplied from the cradle 5 via the lower terminal 27 to the controllers via the terminals (specifically, the left terminal 17 and/or the right terminal 21) corresponding to the controllers attached to the main body apparatus 2. Consequently, the controllers are charged.

It should be noted that in another exemplary embodiment, the cradle 5 may charge the main body apparatus 2 under a predetermined condition. For example, under the condition that the remaining life of the battery 98 of the main body apparatus 2 attached to the cradle 5 is less than or equal to a predetermined amount, the power control section 133 of the cradle 5 may charge the main body apparatus 2. Similarly to this, the main body apparatus 2 may charge a controller under a predetermined condition. For example, under the condition that the remaining life of the battery of a controller attached to the main body apparatus 2 is less than or equal to a predetermined amount, the power control section 97 of the main body apparatus 2 may charge the controller. Further, the above operation regarding charging may be executed even in a case where the main body apparatus 2 is turned off.

If the main body apparatus 2 is attached to the cradle 5, the main body apparatus 2 outputs images (and sounds) to the stationary monitor 6 and causes the stationary monitor 6 to output the images (and the sounds) ((3) shown in FIG. 14). That is, under a predetermined condition, the main body apparatus 2 transmits, to the cradle 5, data of images and sounds to be output. It should be noted that in the exemplary embodiment, "images and sounds to be output" are images and sounds generated by a program (e.g., an OS program or an application program) executed when the main body apparatus 2 is attached to the cradle 5. For example, in a case where a game application is executed at this time, the main body apparatus 2 outputs data of images and sounds generated by the game application to the cradle 5.

If receiving the data of the images and the sounds from the main body apparatus 2, the cradle 5 transmits the data of the images and the sounds to the stationary monitor 6. Consequently, the above "images and sounds to be output" are output from the stationary monitor 6 ((3) shown in FIG. 14). In the state where the images and the sounds are output from the stationary monitor 6, the users can perform operations using controllers ((4) shown in FIG. 14).

As described above, in the exemplary embodiment, the main body apparatus 2 is attached to the cradle 5 in the state where images are displayed on the display 12 of the main body apparatus 2, whereby the display destination of the images can be switched from the display 12 to the stationary monitor 6. Further, in the exemplary embodiment, the main body apparatus 2 is detached from the cradle 5 in the state where images are displayed on the stationary monitor 6, whereby the display destination of the image can be switched from the stationary monitor 6 to the display 12 of the main body apparatus 2. That is, in the exemplary embodiment, the user can easily switch the display destination only by detaching or attaching the main body apparatus 2 from or to the cradle 5. Further, the user can seamlessly switch the display destination only by detaching or attaching the main body apparatus 2 from or to the cradle 5.

Further, as described above, in the exemplary embodiment, it is possible to use the information processing system 1 in the use form in which images are displayed on the display 12, and the use form in which images are displayed on the stationary monitor 6. Here, in the exemplary embodiment, the information processing system 1 changes its operation mode in accordance with these two types of use forms. That is, the information processing system 1 can operate at least in two types of modes, namely a mobile mode for displaying images on the display 12 and a stationary mode for displaying images on the stationary monitor 6.

The mobile mode is a mode when the information processing system 1 is used as a mobile device. In the mobile mode, images generated by the information processing system 1 are displayed on the display 12. Further, sounds generated by the information processing system 1 are output from the loudspeakers 88. Further, in the mobile mode, the settings of the information processing system 1 are changed as in the following (a) and (b).

(a) Setting for Limiting the Processing Capability of the Main Body Apparatus 2

In the exemplary embodiment, the clock frequency at which the CPU 81 can operate can be specified in a predetermined range based on a program executed by the main body apparatus 2. In the exemplary embodiment, the range of the clock frequency that can be specified by a program in the mobile mode is more limited than the range of the clock frequency that can be specified in the stationary mode. For example, the range that can be specified in the stationary mode is a range equal to or greater than X1 Hz, whereas the range that can be specified in the mobile mode is limited to X2 (<X1) Hz. It should be noted that in a case where the main body apparatus 2 includes a GPU (Graphics Processing Unit) in addition to the CPU 81, the ranges of the processing capabilities (i.e., the clock frequencies) of the CPU 81 and/or the GPU may be limited. Further, in the exemplary embodiment, in the mobile mode, the ability to draw (or the ability to generate) an image is limited. Specifically, the resolution (in other words, the number of pixels) of an image generated by the main body apparatus 2 in the mobile mode is lower than the resolution of an image generated in the stationary mode. By the limitations in the above (a), the amount of processing performed by the main body apparatus 2 is limited in the mobile mode. Thus, it is possible to reduce the power consumption in the main body apparatus 2.

(b) Setting for Limiting the Operation of the Cooling Fan 96

In the exemplary embodiment, in the mobile mode, the operation of the cooling fan 96 is limited. Specifically, in the mobile mode, the number of rotations (in other words, the rotation speed) at which the cooling fan 96 can be driven is limited so as to be lower than the maximum number of rotations at which the cooling fan 96 can be driven in the stationary mode. For example, in the mobile mode, the cooling fan 96 is restricted so as to operate at a predetermined number of rotations smaller than the maximum number of rotations. By the limitation in the above (b), it is possible to reduce the operating sound of the cooling fan 96. Here, in the mobile mode, it is assumed that the user uses the main body apparatus 2 near themselves. Regarding this, in the exemplary embodiment, in the mobile mode, it is possible to reduce the operating sound of the cooling fan 96. Thus, it is possible to reduce the possibility that the user feels the operating sound loud.

On the other hand, the stationary mode is the mode when the information processing system 1 is used as a stationary device. In the stationary mode, an image acquired or generated by the main body apparatus 2 is displayed on the stationary monitor 6. Further, a sound acquired or generated by the main body apparatus 2 is output from a loudspeaker included in the stationary monitor 6. Further, in the stationary mode, the restrictions on the functions in the mobile mode are cancelled. That is, in the stationary mode, the limitations in the above (a) and (b) are cancelled. Thus, in the stationary mode, a program in the main body apparatus 2 can use the processing capability of the CPU 81 in a higher range. Further, the main body apparatus 2 can display an image having a higher resolution than in the mobile mode on the stationary monitor 6. Further, the main body apparatus 2 can perform cooling using the cooling fan 96 more effectively than in the mobile mode.

In the exemplary embodiment, regarding switching between the mobile mode and the stationary mode, in a case where the main body apparatus 2 is attached to the cradle 5, the main body apparatus 2 sets the operation mode to the stationary mode. On the other hand, in a case where the main body apparatus 2 is detached from the cradle 5, the main body apparatus 2 sets the operation mode to the mobile mode.

It should be noted that in another exemplary embodiment, the information processing system 1 may be able to directly (i.e., not via the cradle 5) communicate with the stationary monitor 6. At this time, the information processing system 1 may directly transmit an image and/or a sound to the stationary monitor 6. It should be noted that the communication method between the information processing system 1 and the stationary monitor 6 is optional. For example, wired communication via a cable (e.g., an HDMI cable) may be used. Alternatively, the communication method between the information processing system 1 and the stationary monitor 6 may be wireless communication. In a case where the information processing system 1 directly communicates with the stationary monitor 6, the cradle 5 may be used to charge the information processing system 1, for example.

Next, a description is given of the setting for the main body apparatus 2 to wirelessly communicate with the left controller 3 and the right controller 4. As described above, in the exemplary embodiment, there is a case where the main body apparatus 2 wirelessly communicates with the left controller 3 and the right controller 4. Thus, in the exemplary embodiment, the setting (or pairing) for the main body apparatus 2 to wirelessly communicate with the left controller 3 and the right controller 4 is made. It should be noted that in the controllers provided (specifically, sold) together with the main body apparatus 2, the setting for wireless communication may be completed when the controllers are provided.

In the exemplary embodiment, the main body apparatus 2 performs a wireless setting process for making the setting for wireless communication with the left controller 3 and the right controller 4. As an example, the wireless setting process is executed in accordance with the fact that the left controller 3 or the right controller 4 is detached from the main body apparatus 2. That is, the main body apparatus 2 detects that the left controller 3 or the right controller 4 is detached, and in accordance with the detection of the detachment (referred to as "separation"), starts executing the wireless setting process.

In the wireless setting process, if the setting for wireless communication is not completed for the controller of which the separation is detected, the CPU 81 executes a pairing process for enabling wireless communication with the controller. The pairing process in the exemplary embodiment may be similar to a pairing process in a communication technique compliant with the conventional Bluetooth (registered trademark) standard. Consequently, pairing is performed between the main body apparatus 2 and the controller, and wireless communication is established between the main body apparatus 2 and the controller.

Then, the CPU 81 updates registration information of the controller with which wireless communication is established. That is, the CPU 81 updates identification information allowing the unique identification of the controller (e.g., information indicating a value (e.g., an ID) uniquely assigned to the controller) of which the separation is detected, also updates wireless communication information to a content indicating "setting completion", and stores the registration information of the controller in a storage section (e.g., the flash memory 84) of the main body apparatus 2.

It should be noted that in the information processing system 1, the condition under which the wireless setting process is performed is optional, and is not limited to the detachment of the controller from the main body apparatus 2. Alternatively, for example, in another exemplary embodiment, in accordance with the fact that the controller is attached to the main body apparatus 2, the wireless setting process may be performed. Yet alternatively, in another exemplary embodiment, in accordance with the fact that the user gives a predetermined instruction, the setting process may be performed. Specifically, this predetermined instruction may be given by the user selecting a predetermined item displayed on the menu screen, or by the user pressing a predetermined button provided in the main body apparatus 2 or the controller.

Further, in the above use forms of the information processing system, a description has been given of the form in which one or more users perform operations using a single information processing system 1. In the exemplary embodiment, however, a plurality of information processing systems in the above use forms are used, whereby it is possible to achieve a use form in which a larger number of users can participate. As described above, the information processing system 1 can perform so-called "local communication", in which the information processing system 1 can wirelessly communicate with another information processing system 1 placed in a closed local network area, and the plurality of information processing systems 1 directly communicate with each other, thereby transmitting and receiving data to and from each other. Here, the "local communication" that can be performed between the information processing system 1 and another information processing system 1 is ad hoc communication, in which the information processing systems 1 are wirelessly connected to each other directly, not via the Internet. In a use form described below, an example is described where a plurality of information processing systems 1 perform information processing (e.g., a communication game) based on information transmitted and received through the local communication.

Figure 15:
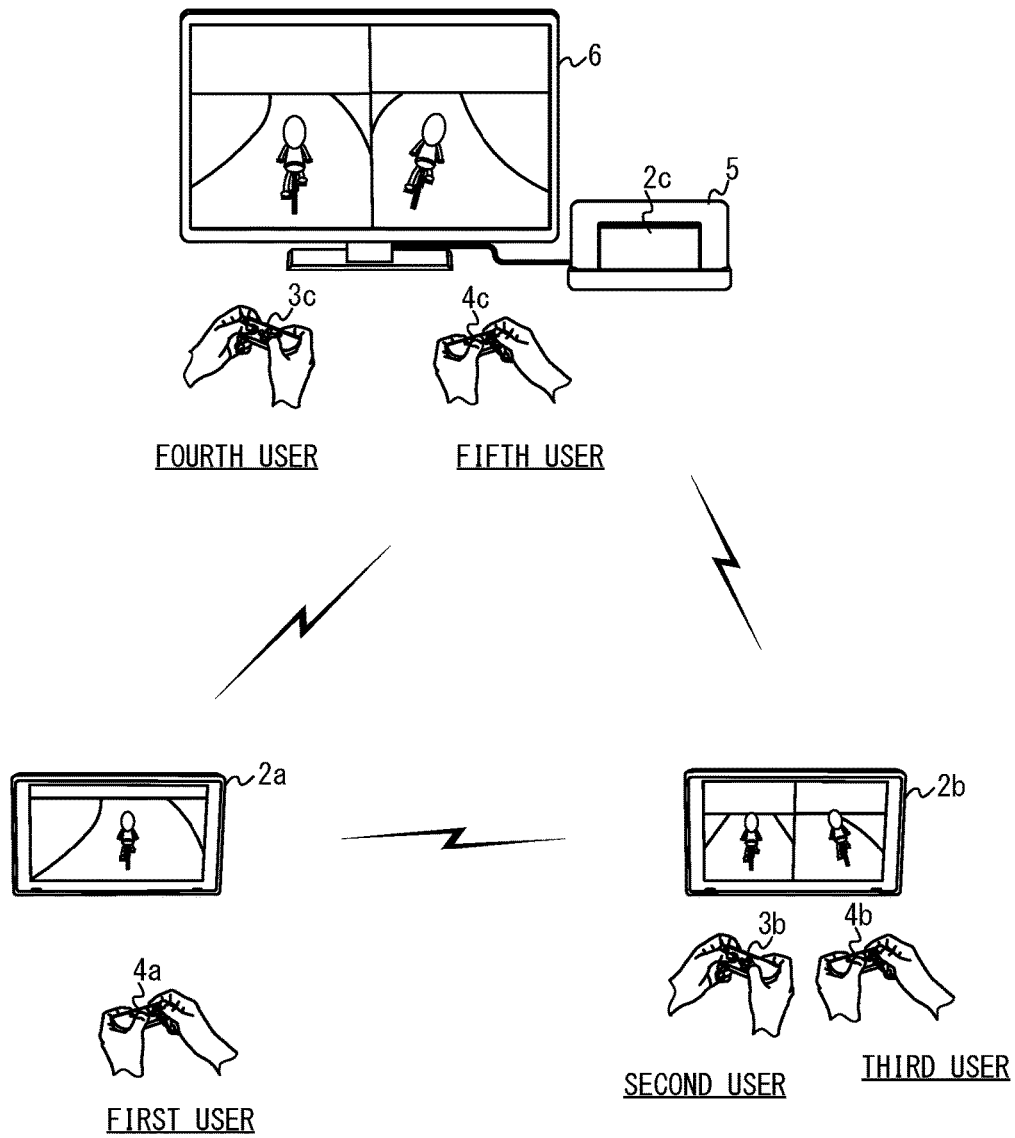
FIG. 15 is a diagram showing a non-limiting example of the state where a plurality of information processing systems 1 perform information processing based on information transmitted and received through local communication.

FIG. 15 is a diagram showing an example of the state where a plurality of information processing systems 1 perform information processing based on information transmitted and received through local communication. In the example of FIG. 15, main body apparatuses 2a, 2b, and 2c included in the respective information processing systems 1 transmit and receive information to and from each other through local communication, thereby performing a communication game in a predetermined virtual space.

In the exemplary embodiment, the main body apparatus 2a operates in the mobile mode, and based on operation data from a single controller (specifically, a right controller 4a) operated by a first user, controls a first virtual object placed in the virtual space in the communication game. Then, the main body apparatus 2a transmits information based on an operation using the right controller 4a to each of the other main body apparatuses 2b and 2c through local communication. Here, the information based on an operation using the controller may be operation information indicating an operation on the controller, or may be information regarding the virtual object or the virtual space on which an operation on the controller is reflected. The operation information may include at least any one of, for example, key data indicating an operation on each button, stick data indicating the tilt state of the stick, sensor data indicating the detection states of the sensors such as the acceleration sensor and the angular velocity sensor, and the like, or may be data indicating the results of making predetermined calculations on the above data. The information regarding the virtual object or the virtual space may be, for example, object data indicating the position, the direction, the action, the state, and the like of the virtual object in the virtual space. Further, in the exemplary embodiment, since the main body apparatus 2a is operated only by the first user, the controller may be in the state of being attached to the main body apparatus 2a.

The main body apparatus 2b operates in the mobile mode, and based on operation data from a single controller (specifically, a left controller 3b) operated by a second user, controls a second virtual object placed in the virtual space in the communication game. Further, based on operation data from a single controller (specifically, a right controller 4b) operated by a third user, the main body apparatus 2b controls a third virtual object placed in the virtual space in the communication game. Then, the main body apparatus 2b transmits information based on an operation using each of the left controller 3b and the right controller 4b to each of the other main body apparatuses 2a and 2c through local communication.

The main body apparatus 2c operates in the stationary mode, and based on operation data from a single controller (specifically, a left controller 3c) operated by a fourth user, controls a fourth virtual object placed in the virtual space in the communication game. Further, based on operation data from a single controller (specifically, a right controller 4c) operated by a fifth user, the main body apparatus 2c controls a fifth virtual object placed in the virtual space in the communication game. Then, the main body apparatus 2c transmits information based on an operation using each of the left controller 3c and the right controller 4c to each of the other main body apparatuses 2a and 2b through local communication.

Based on operation data from the right controller 4a operated by the first user and information received from each of the main body apparatuses 2b and 2c, the main body apparatus 2a sets the first to fifth virtual objects in the virtual space. Then, the main body apparatus 2a generates a virtual space image based on the first virtual object controlled by an operation using the right controller 4a (e.g., an image including the first virtual object or an image from the first-person viewpoint of the first virtual object). It should be noted that the main body apparatus 2a operates in the mobile mode and therefore displays the generated virtual space image on the display 12 of the main body apparatus 2a.

Based on operation data from the left controller 3b operated by the second user, operation data from the right controller 4b operated by the third user, and information received from each of the main body apparatuses 2a and 2c, the main body apparatus 2b sets the first to fifth virtual objects in the virtual space. Then, the main body apparatus 2b generates a virtual space image based on the second virtual object controlled by an operation using the left controller 3b (e.g., an image including the second virtual object or an image from the first-person viewpoint of the second virtual object), and a virtual space image based on the third virtual object controlled by an operation using the right controller 4b (e.g., an image including the third virtual object or an image from the first-person viewpoint of the third virtual object). It should be noted that the main body apparatus 2b operates in the mobile mode, and multiplayer (two-player) play is performed using the left controller 3b and the right controller 4b. Thus, the main body apparatus 2b displays a virtual space image of two scenes generated by screen splitting on the display screen of the display 12 of the main body apparatus 2b.

Based on operation data from the left controller 3c operated by the fourth user, operation data from the right controller 4c operated by the fifth user, and information received from each of the main body apparatuses 2a and 2b, the main body apparatus 2c sets the first to fifth virtual objects in the virtual space. Then, the main body apparatus 2c generates a virtual space image based on the fourth virtual object controlled by an operation using the left controller 3c (e.g., an image including the fourth virtual object or an image from the first-person viewpoint of the fourth virtual object), and a virtual space image based on the fifth virtual object controlled by an operation using the right controller 4c (e.g., an image including the fifth virtual object or an image from the first-person viewpoint of the fifth virtual object). It should be noted that the main body apparatus 2c operates in the stationary mode, and multiplayer (two-player) play is performed using the left controller 3c and the right controller 4c. Thus, the main body apparatus 2c displays a virtual space image of two scenes generated by screen splitting on the display screen of the stationary monitor 6 connected to the cradle 5 on which the main body apparatus 2c is mounted.

As described above, in the communication game performed using the plurality of information processing systems 1 shown in FIG. 15, mobile apparatuses operated by a plurality of users participate. Thus, for example, five users can participate using three main body apparatuses 2. That is, even in a communication game using local communication between information processing systems 1 (main body apparatuses 2) that are mobile apparatuses, multiplayer play including players more than or equal to the number of the information processing systems 1 (the main body apparatuses 2) can be performed. In the above exemplary embodiment, an example has been described where a communication game is performed using three main body apparatuses 2 such that each main body apparatus 2 is used in a different manner. In another example, the number of main body apparatuses 2 is optional. Further, the number of controllers connected to each main body apparatus 2 and the use form regarding which of the mobile mode and the stationary mode is used or the like may be optional. That is, although the number of participants is optional, users more than or equal to the number of main body apparatuses 2 can participate.

It should be noted that in the communication game performed using the plurality of information processing systems 1, limitations may be placed on the total number of game participants, the number of participants in each apparatus, the number of game participating apparatuses, and the like. These limitations can be appropriately set in accordance with the content of the game to be performed, the loads of game processing and a communication process, and the like. As a first example, the upper limit of the number of information processing systems 1 allowed to participate in the communication game may be the same as the upper limit of the total number of game participants allowed to participate in the communication game. For example, the upper limit of the total number of game participants may be eight, and the upper limit of the number of information processing systems 1 may be eight. As a second example, the upper limit of the total number of game participants allowed to participate in the communication game may be greater than the upper limit of the number of information processing systems 1 allowed to participate in the communication game. For example, the upper limit of the total number of game participants may be 12, and the upper limit of the number of information processing systems 1 may be eight. As a third example, the upper limit of the number of participants allowed to participate in each apparatus of the information processing systems 1 participating in the communication game may be smaller (e.g., two or four) than the upper limit of the total number of game participants allowed to participate in the communication game. For example, the upper limit of the total number of game participants may be eight, and the number of participants in each apparatus may be up to two or four.

Next, a description is given of an operation when a game in which multiplayer play can be performed using one or more information processing systems 1 is performed. FIGS. 16 to 19 are diagrams showing examples of the flow of an operation in each form in a case where a game in which multiplayer play is performed using one or more information processing systems 1 is performed. It should be noted that limitations on the number of players and the number of information processing systems 1 in the game described in the following examples are as follows. The upper limit of the total number of game participants allowed to participate in the communication game is eight. The upper limit of the number of information processing systems 1 allowed to participate in the communication game is eight (i.e., the upper limit of the total number of game participants is equal to the upper limit of the number of game participating apparatuses). The upper limit of the number of participants in each apparatus participating in the communication game is two. Further, the upper limit of the total number of game participants in a case where multiplayer play is performed using only a single information processing system 1 is two in the mobile mode and four in the stationary mode.

Figure 16:
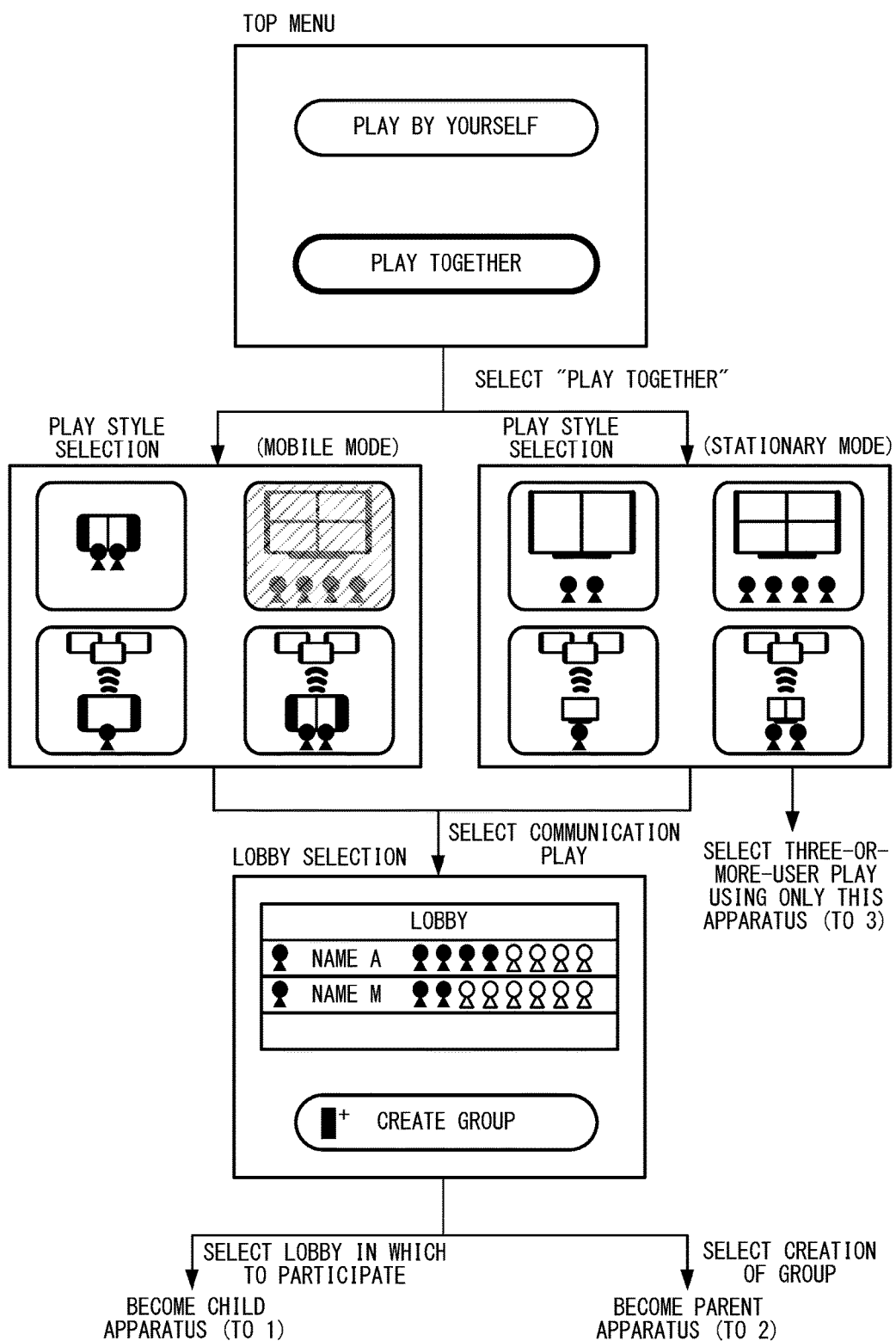
FIG. 16 is a diagram showing a non-limiting example of the flow of an operation in each form in a case where a game in which multiplayer play is performed using one or more information processing systems 1 is performed.

In FIG. 16, an information processing system 1 displays on a display screen (the display 12 of the main body apparatus 2 in the case of the mobile mode, or the display screen of the stationary monitor 6 in the case of the stationary mode) a top menu regarding a game in which multiplayer play can be performed. Here, the top menu is a screen on which a user of the information processing system 1 selects whether to play the above game by a single player or by a plurality of players. Here, a case is considered where multiplayer play ("play together" in FIG. 16) is selected in accordance with an operation of the user.

If the multiplayer play is selected, a play style selection screen is displayed on the display screen. Here, the play style selection screen is a screen for urging the user to perform the operation of selecting in which use form (play style) the multiplayer play is to be performed. On the play style selection screen, options different depending on the operation mode (i.e., the mobile mode or the stationary mode) of the information processing system 1 are displayed. For example, if the information processing system 1 operates in the stationary mode, four play styles are presented as options. Specifically, in the case of the stationary mode, an icon for selecting a play style in which two players play using only the information processing system 1 (an icon at the upper left in a play style selection (stationary mode) diagram in FIG. 16), an icon for selecting a play style in which three or more players play using only the information processing system 1 (an icon at the upper right in the play style selection (stationary mode) diagram in FIG. 16: an icon representing the state where four players are playing in this case), and an icon for selecting a play style in which the information processing system 1 is used by a single player while communicating with other information processing systems 1 (an icon at the lower left in the play style selection (stationary mode) diagram in FIG. 16), and an icon for selecting a play style in which the information processing system 1 is used by two players while communicating with other information processing systems 1 (an icon at the lower right in the play style selection (stationary mode) diagram in FIG. 16) are displayed. On the other hand, in the case of the mobile mode, an icon for selecting a play style in which two players play using only the information processing system 1 (an icon at the upper right in a play style selection (mobile mode) diagram in FIG. 16), an icon for selecting a play style in which the information processing system 1 is used by a single player while communicating with other information processing systems 1 (an icon at the lower left in the play style selection (mobile mode) diagram in FIG. 16), and an icon for selecting a play style in which the information processing system 1 is used by two players while communicating with other information processing systems 1 (an icon at the lower right in the play style selection (mobile mode) diagram in FIG. 16) are displayed. Here, in the case of the mobile mode, an icon for selecting a play style in which three or more players play using only the information processing system 1 (an icon at the upper right in the play style selection (mobile mode) diagram in FIG. 16) is displayed so as not to be selected. This is because in the case of the mobile mode, the upper limit of the total number of game participants in a case where multiplayer play is performed using only the information processing system 1 is two, and therefore, three or more players cannot play using only the information processing system 1. Thus, the above icon is set so as not to be selected by the user. It should be noted that although the form may be such that the above icon is not displayed, the above icon is displayed so as not to be selected, whereby it is easy for the user to understand that play by three or more players using only the information processing system 1 cannot be selected.

If communication play (i.e., a play style in which the information processing system 1 is used while communicating with other information processing systems 1) is selected in the mobile mode or the stationary mode, a lobby selection screen is displayed on the display screen. On the lobby selection screen, user groups set at this time to perform the game are indicated. As a specific example, the user names (a name A and a name M in FIG. 16) of users operating parent apparatuses for setting user groups, the number of users participating in the user group of each parent apparatus, and the number of users allowed to participate in the user group are indicated. In the example of FIG. 16, in the user group of the name A, four users participate, and four more users can participate. In the user group of the name M, two users participate, and six more users can participate. The information processing system 1 on which the lobby selection screen is displayed performs the operation of selecting a user group in which the user wishes to participate, and thereby can make a request to participate as a child apparatus in the selected user group. It should be noted that as shown in FIG. 16, even if the information processing system 1 is operated by a plurality of users, the lobby selection screen is displayed without splitting the display screen.

It should be noted that on the lobby selection screen, only a user group to which a participation request can be made may be displayed, or a user group in which the user cannot participate may also be displayed. Examples of an assumed user group in which the user cannot participate include (i) a user group in which the upper limit of the total number of game participants allowed to participate in the communication game is reached, (ii) a user group in which the upper limit of the total number of game participants allowed to participate in the communication game is exceeded if the participation request is accepted, (iii) a user group that has already started the communication game, and the like. In a case where a user group in which the user cannot participate is displayed, it may be indicated that the user cannot select the user group, or when the user group in which the user cannot participate is selected by the user, a notification is given that the user cannot participate. For example, in the cases of the above (i) and (ii), it is also possible that the information processing system 1 with which a participation request is made determines whether or not a participation request can be made, and the information processing system 1 gives a notification that the user cannot participate. Alternatively, it is possible that in accordance with the fact that after a participation request is made to the parent apparatus, the information processing system 1 receives from the parent apparatus a reply that the user cannot participate, the information processing system 1 gives a notification that the user cannot participate. Further in the case of (ii), it is possible that the result of the determination differs depending on the number of users operating the information processing system 1. Specifically, in a case where the number of participants in the user group reaches seven, and if a single user operates the information processing system 1 with which a participation request is made, the user can participate. If, however, two users operate the information processing system 1 with which a participation request is made, these users cannot participate. In such a case, based on the selected play style, the information processing system 1 with which a participation request is made may determine whether or not a participation request can be made. Alternatively, a participation request may be made to the parent apparatus by notifying the parent apparatus of the number of users making the participation request, and the parent apparatus may determine whether or not the users can participate.

Further, on the lobby selection screen shown in FIG. 16, an indicator (a filled pattern) indicating the number of participants and an indicator (an outlined pattern) indicating the number of users allowed to participate are displayed in parallel in accordance with the number of users, thereby indicating the number of participants and the number of users allowed to participate with respect to each user group. Alternatively, the number of participants and/or the number of users allowed to participate with respect to each user group may be indicated in another form. For example, the number of participants and the number of users allowed to participate with respect to each user group may be simply indicated by numerical values, or may be indicated by scales (graph display). Alternatively, only the number of participants with respect to each user group or only the number of users allowed to participate may be indicated by a numerical value or an image.

On the lobby selection screen, the option of creating a user group by the information processing system 1 to perform the above game ("create group") is also indicated. In the information processing system 1 on which the lobby selection screen is displayed, the user performs the operation of selecting the option of creating a user group, whereby the information processing system 1 as a parent apparatus can newly generate a user group.

Figure 17:
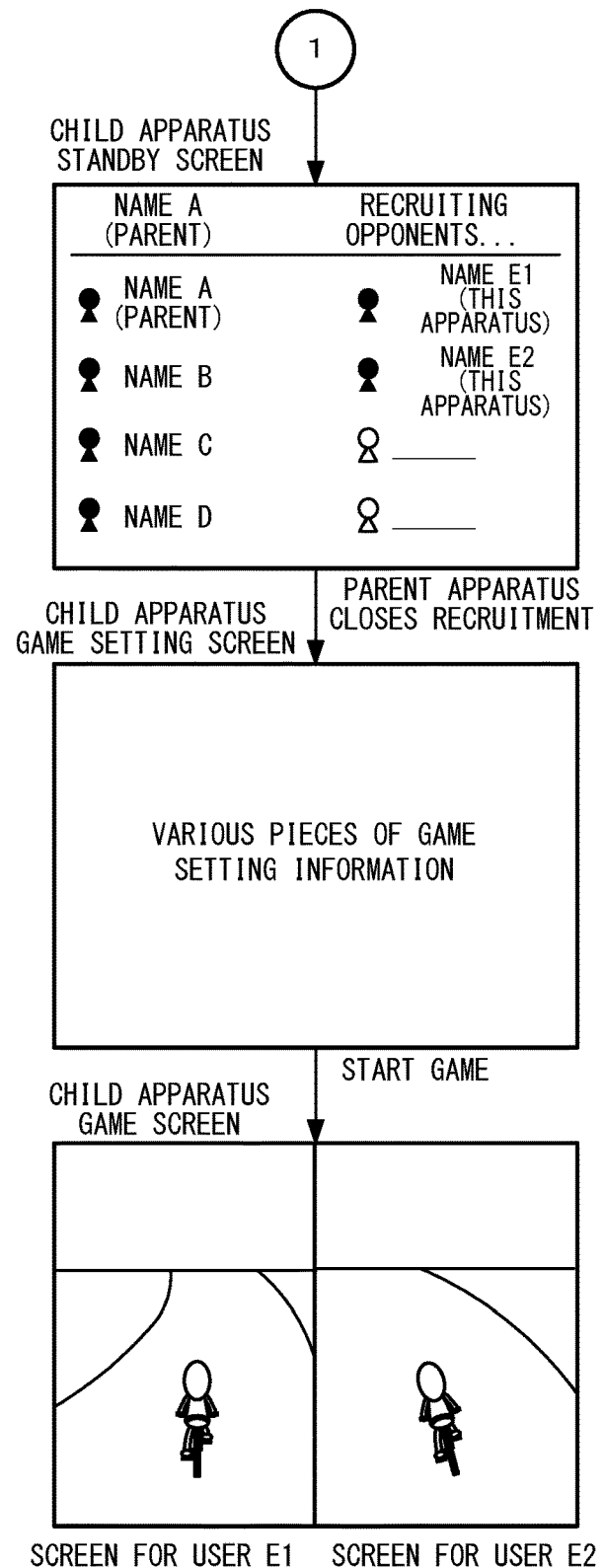
FIG. 17 is a diagram showing a non-limiting example of the flow of an operation in each form in a case where a game in which multiplayer play is performed using one or more information processing systems 1 is performed.

In a case where the user selects a user group in which the user wishes to participate, and the user is permitted to participate in the user group, the information processing system 1 with which the participation request is made becomes a child apparatus, and the subsequent game processing is advanced. In FIG. 17, on the display screen of the information processing system 1 permitted to participate in the user group, a child apparatus standby screen is displayed. On the child apparatus standby screen, the situation of the user group in which the information processing system 1 as a child apparatus participates is indicated. For example, on the child apparatus standby screen, the user name (a name A in FIG. 17) of a user operating a parent apparatus of the user group and the user names (names B to D, E1, and E2 in FIG. 17) of users operating child apparatuses of the user group are displayed. Here, the user name E1 and the user name E2 of child apparatuses displayed in FIG. 17 both indicate the user names of the information processing system 1 on which the child apparatus standby screen is displayed. A play style in which two players use the information processing system 1 while communicating with other information processing systems 1 is selected, and therefore, two user names are registered as the user names of the information processing system 1. As described above, in the exemplary embodiment, in a case where a child apparatus to participate is operated by a plurality of users, the child apparatus participates in a user group, whereby the plurality of users can simultaneously participate in the user group. It should be noted that the user names of child apparatuses displayed on the child apparatus standby screen may or may not include the user name of a user operating the information processing system 1. Further, on the child apparatus standby screen, it is indicated that the current state is the state where users are further recruited to participate in the user group. Thus, the user viewing the child apparatus standby screen can know the participants of the user group together with the progress state at the current moment. Further, in a case where a new child apparatus participates in the user group, a user name may be added, and display may be updated. Further, a single user operates the information processing system 1 in a scene where this screen is displayed, the process of receiving the addition of a user operating the information processing system 1 may be allowed. In this case, similarly to the case where a child apparatus is added, a user name may be added, and display may be updated.

In a case where the parent apparatus of the user group in which the information processing system 1 participates closes the recruitment of users to participate in the user group, a child apparatus game setting screen is displayed on the display screen of the information processing system 1. The child apparatus game setting screen is a screen indicating various setting contents of the game to be started from now. For example, on the child apparatus game setting screen, a selected game field, the description of a game rule, a constitution team situation, the ability of a game character to be used, and the like are displayed. It should be noted that the above various setting contents may be able to be changed by the user operating the parent apparatus. Alternatively, an item that can be changed by a user operating a child apparatus may be included. In either case, if the above various setting contents are changed, the apparatuses in the user group in which the information processing system 1 participates may transmit and receive information indicating the changed contents to and from each other, and the contents displayed on the child apparatus game setting screen may be appropriately updated in accordance with the information.

In a case where the communication game by the user group in which the information processing system 1 participates is started, a game screen for performing the communication game is displayed on the display screen of the information processing system 1, and the communication game is advanced. When this communication game is performed, each of information processing systems 1 participating in the communication game transmits and receives, through local communication, information based on an operation using each controller operating the information processing system 1. Here, the information based on an operation using the controller may be any information in accordance with the type of the game. For example, the information may be operation information of an operation itself using the controller (e.g., key data indicating an operation on each button, stick data indicating the tilt state of the stick, sensor data indicating the detection states of the sensors such as the acceleration sensor and the angular velocity sensor, or the like). Further, the information may be data of the results of making predetermined calculations on the operation information. Further, the information may be object information regarding a virtual object operated using the controller (object data indicating the position, the direction, the action, the state, and the like of the virtual object in a virtual space) and the like. Further, the information may be any two or more or all of these pieces of information.

It should be noted that in the exemplary embodiment shown in FIG. 17, not an image for each of all the users belonging to the user group (e.g., an image including a virtual object controlled by each of all the users) but an image for the users of the information processing system 1 operating the information processing system 1 is displayed by splitting the display screen of the information processing system 1, where necessary. For example, in a case where the user E1 and the user E2 operate the information processing system 1, the display screen of the information processing system 1 is split into two display areas, an image including a virtual object controlled by an operation of the user E1 or a game image representing the first-person viewpoint of the virtual object is displayed in one of the split display areas, and an image including a virtual object controlled by an operation of the user E2 or a game image representing the first-person viewpoint of the virtual object is displayed in the other split display area. Thus, the exemplary embodiment is suitable for a game in which a display target is different for each user. Alternatively, in a game according to another exemplary embodiment, a common screen for all the members of the user group may be displayed. Yet alternatively, the form may be such that even in a case where a common screen for all the members of the user group is not used, but if two users use the information processing system 1, a common screen is displayed for these two users.

Figure 18:
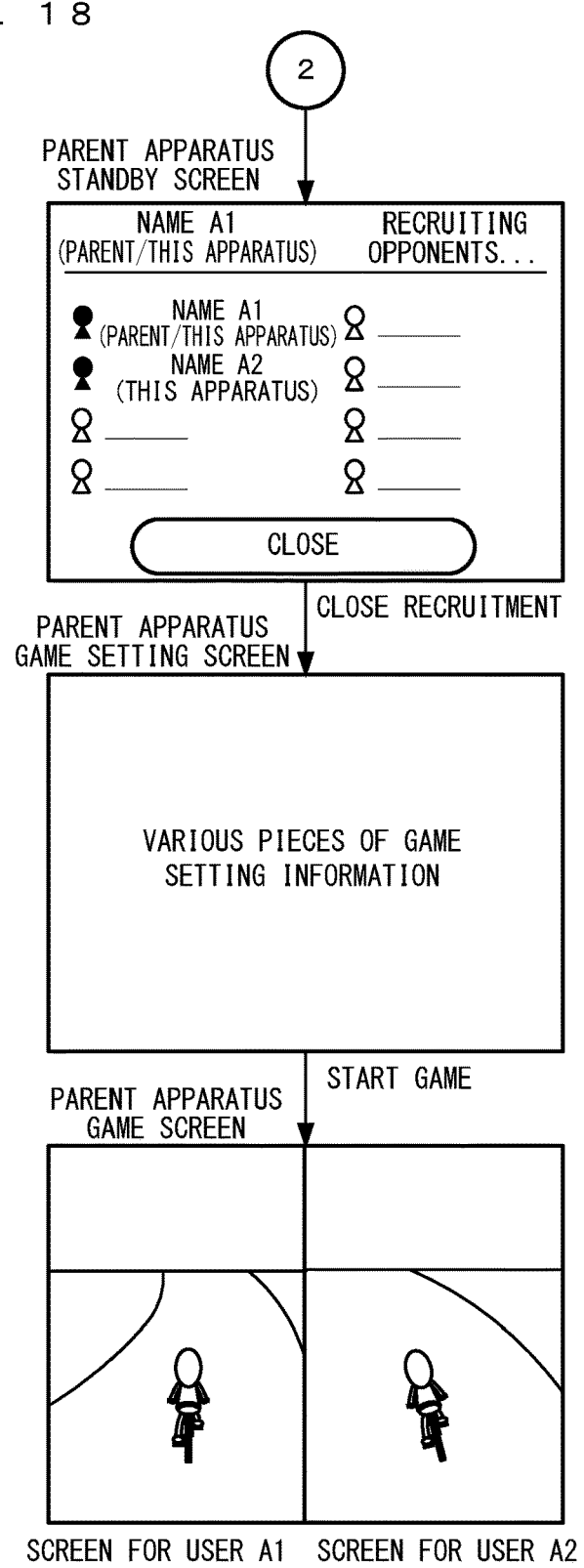
FIG. 18 is a diagram showing a non-limiting example of the flow of an operation in each form in a case where a game in which multiplayer play is performed using one or more information processing systems 1 is performed.

In a case where the user selects the option of newly creating a user group to perform a game on the lobby selection screen in FIG. 16, the information processing system 1 in which the creation of a group is selected becomes a parent apparatus, and the subsequent game processing is advanced. In FIG. 18, on the display screen of the information processing system 1 in which a new user group is created, a parent apparatus standby screen is displayed. On the parent apparatus standby screen, the situation of the user group created by the information processing system 1 as a parent apparatus is indicated. For example, on the parent apparatus standby screen, the user name (the information processing system 1; a name A1 in FIG. 18) of the user operating the parent apparatus of the user group and another user name (a name A2 in FIG. 18) in the user group are displayed. Here, the user name A1 and the user name A2 displayed in FIG. 18 both indicate the user names of the information processing system 1 on which the parent apparatus standby screen is displayed. A play style in which two players use the information processing system 1 while communicating with other information processing systems 1 is selected, and therefore, two user names are registered as the user names of the information processing system 1. As described above, in the exemplary embodiment, in a case where the information processing system 1 as a parent apparatus is operated by a plurality of users, the parent apparatus creates a user group, whereby the plurality of users can simultaneously participate in the user group such that any one of the users is a user of the parent apparatus. It should be noted that user names displayed on the parent apparatus standby screen may or may not include the user name of a user operating the information processing system 1. Further, on the parent apparatus standby screen, it is indicated that the current state is the state where users are further recruited to participate in the user group. Thus, the user viewing the parent apparatus standby screen can know the user names of users participating in the user group at this current moment and the progress state at the current moment. Further, in a case where a single user operates the information processing system 1, the process of receiving the addition of a user operating the information processing system 1 may be allowed.

On the parent apparatus standby screen, the option of closing the recruitment of users to participate in the newly generated user group ("close") is also indicated. The user performs the operation of selecting the option of closing the recruitment, whereby the information processing system 1 as the parent apparatus can proceed to the start of the game without increasing any more participants.

In a case where the user of the parent apparatus of the user group performs the operation of closing the recruitment of users to participate in the user group, a parent apparatus game setting screen is displayed on the display screen of the information processing system 1. The parent apparatus game setting screen is a screen indicating various setting contents of the game to be started from now. For example, on the parent apparatus game setting screen, a selected game field, the description of a game rule, a constitution team situation, the ability of a game character to be used, and the like are displayed. It should be noted that at least one of the above various setting contents may be able to be changed by the user operating the parent apparatus. Alternatively, an item that can be changed by a user operating a child apparatus may be included. In either case, if the above various setting contents are changed, the apparatuses in the user group in which the information processing system 1 participates may transmit and receive information indicating the changed contents to and from each other, and the contents displayed on the parent apparatus game setting screen may be appropriately updated in accordance with the information.

In a case where the communication game by the newly created user group is started, a game screen for performing the communication game is displayed on the display screen of the information processing system 1, and the communication game is advanced. It should be noted that the communication game may be started in accordance with the fact that the user of the parent apparatus of the user group performs the operation of starting the game (e.g., the operation of selecting the option of giving an instruction to start the game displayed on the parent apparatus game setting screen), or may be automatically started in accordance with the lapse of a predetermined time after the recruitment of participants is closed, or in accordance with the satisfaction of a predetermined condition. Further, as described above, when this communication game is performed, each of information processing systems 1 participating in the communication game transmits and receives, through local communication, information based on an operation using each controller operating the information processing system 1.

It should be noted that as shown in FIG. 18, in the exemplary embodiment, also on the information processing system 1 as the parent apparatus, not an image for each of all the users belonging to the user group but an image for the users of the information processing system 1 operating the information processing system 1 is displayed by splitting the display screen of the information processing system 1, where necessary. For example, in a case where the user A1 and the user A2 operate the information processing system 1 as the parent apparatus, the display screen of the information processing system 1 is split into two display areas, an image including a virtual object controlled by an operation of the user A1 or a game image from the first-person viewpoint of the virtual object is displayed in one of the split display areas, and an image including a virtual object controlled by an operation of the user A2 or a game image from the first-person viewpoint of the virtual object is displayed in the other split display areas. Alternatively, in a game according to another exemplary embodiment, a common screen for all the members of the user group may be displayed. Yet alternatively, the form may be such that even in a case where a common screen for all the members of the user group is not used, but if two users use the information processing system 1, a common screen may be displayed for these two users.

Figure 19:
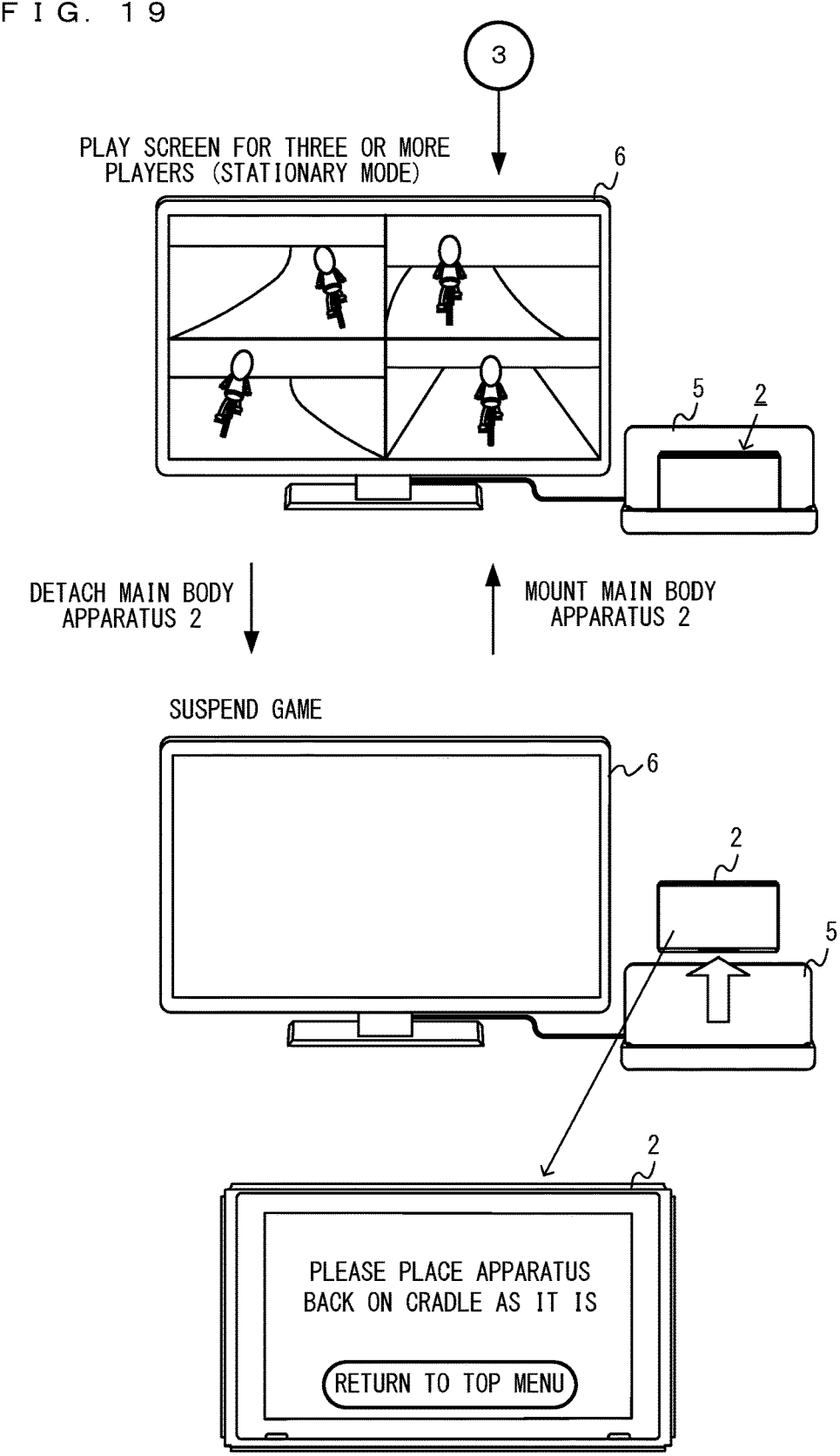
FIG. 19 is a diagram showing a non-limiting example of the flow of an operation in each form in a case where a game in which multiplayer play is performed using one or more information processing systems 1 is performed.

In a case where a play style in which three or more players play using only the information processing system 1 is selected on the play style selection screen in the stationary mode shown in FIG. 16, various game settings are made, and then, a game screen for performing a game is displayed on the stationary monitor 6 connected to the information processing system 1 as shown in FIG. 19. Here, as described with reference to FIG. 13, a display screen displayed on the stationary monitor 6 is split in accordance with the number of users operating the information processing system 1. For example, the information processing system 1 is used by splitting the display area of the stationary monitor 6 into four display areas, and an image for a user (e.g., an image including a virtual object controlled by an operation of the user or a game image from the first-person viewpoint of the virtual object) is displayed in each of the split display areas.

A case is considered where the main body apparatus 2 is detached from the cradle 5 in the state where the display screen displayed on the stationary monitor 6 is split into four display areas as described above, and three or more users perform multiplayer play. In this case, as described above, the information processing system 1 switches from the stationary mode to the mobile mode and enters the state where the game played by the three or more players in the stationary mode is played in the mobile mode. Meanwhile, in the exemplary embodiment, the upper limit of the total number of game participants in a case where multiplayer play is performed using only the information processing system 1 is two in the mobile mode and four in the stationary mode. Thus, in a case where the stationary mode switches to the mobile mode during the game as described above, the total number of game participants in the mobile mode is exceeded. Thus, in a case where the stationary mode switches to the mobile mode during the game, whereby the total number of game participants is exceeded, the information processing system 1 once suspends this game and then displays, on the display 12 of the main body apparatus 2, information urging the user to change back the information processing system 1 to the stationary mode.

Then, in a case where the main body apparatus 2 is mounted on the cradle 5 again in the above game suspension state, the information processing system 1 changes back from the mobile mode to the stationary mode and resumes the suspended game. That is, in accordance with the fact that the information processing system 1 changes back to the stationary mode, the information processing system 1 hides the display 12 of the main body apparatus 2, also splits the display area of the stationary monitor 6 into four display areas, displays an image for a user in each of the split display areas, and resumes the game (e.g., from the suspended state).

It should be noted that in the examples, shown in FIGS. 16 to 19, of an operation when a game in which multiplayer play can be performed using one or more information processing systems 1 is performed, even in a case where a communication game is performed using a plurality of information processing systems 1, a game image for a user of each information processing system 1 is displayed on the display screen of the information processing system 1. Alternatively, a game image for a user of another information processing system 1 may also be displayed on the display screen of the information processing system 1. In this case, the display screen of the information processing system 1 may be split in accordance with the number of users obtained by adding the number of users of the other information processing system 1 to the number of users of the information processing system 1, and an image for a user of the information processing system 1 and an image for a user of the other information processing system 1 may be displayed in each of the split display areas.

Further, the above process of suspending the game due to the switching from the stationary mode to the mobile mode during the game may be performed during the above communication game. In the examples, shown in FIGS. 16 to 19, of an operation when a game in which multiplayer play can be performed using one or more information processing systems 1 is performed, the upper limit of the number of participants in each apparatus participating in the communication game is set to two. Thus, the number of users operating each information processing system 1 participating in the communication game is limited to two before the communication game is started, regardless of whether the mobile mode or the stationary mode. That is, in the above examples of an operation, even if the stationary mode switches to the mobile mode during the communication game, the limitation on the number of users as described above is not exceeded. However, if the upper limit of the number of participants in each apparatus participating in the communication game is four, and the upper limit of the number of game participants in each apparatus is two in the mobile mode and four in the stationary mode in a case where multiplayer play is performed in each apparatus, and if the stationary mode switches to the mobile mode as described above during the communication game in any of the information processing systems 1 participating in the communication game in the stationary mode for three or more players, the limitation on the number of users in the mobile mode is exceeded in a similar manner. In such a case, the game may be suspended in all the information processing systems 1 participating in the communication game, or the communication game may be suspended or ended only in the information processing system 1 in which the limitation on the number of users during the communication game is exceeded.

Figure 20:
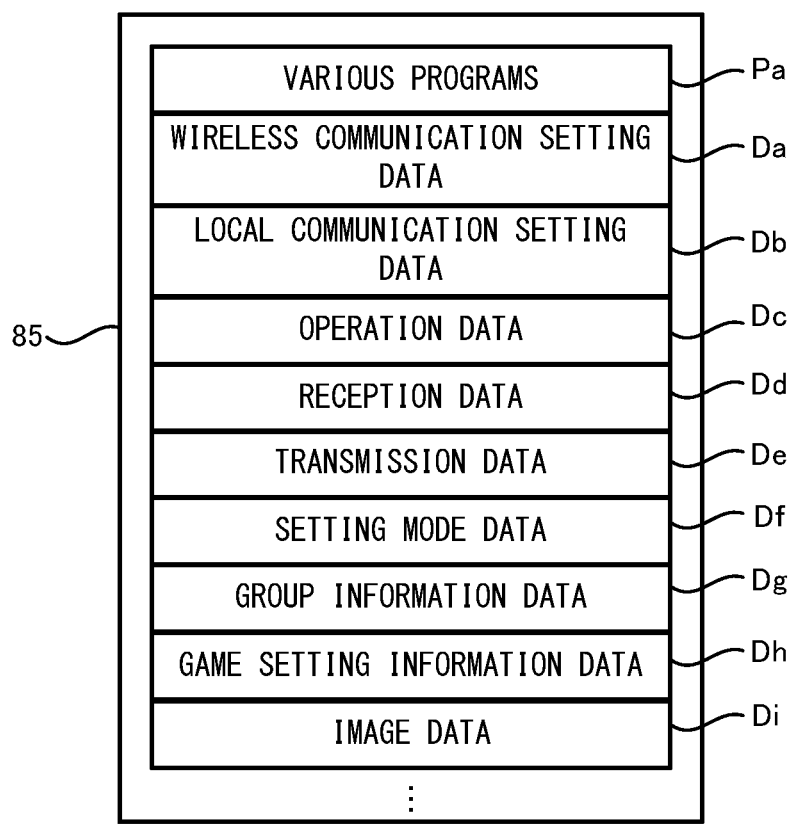
FIG. 20 is a diagram showing a non-limiting example of a data area set in a DRAM 85 of the main body apparatus 2 according to the exemplary embodiment.

Next, with reference to FIGS. 20 to 24, a description is given of an example of specific processing executed by the information processing system 1 according to the exemplary embodiment. FIG. 20 is a diagram showing an example of a data area set in the DRAM 85 of the main body apparatus 2 according to the exemplary embodiment. It should be noted that in the DRAM 85, in addition to data shown in FIG. 20, data used for other processes is also stored, but is not described in detail here.

In a program storage area of the DRAM 85, various programs Pa, which are executed by the information processing system 1, are stored. In the exemplary embodiment, as the various programs Pa, a communication program for performing the above local communication with another information processing system 1, a communication program for wirelessly communicating with the left controller 3 and the right controller 4, an application program for performing information processing (e.g., game processing) based on data acquired from the left controller 3 and/or the right controller 4 and another information processing system 1, a mode setting program for switching the operation mode in accordance with the attachment and detachment of the main body apparatus 2 to and from the cradle 5, and the like are stored. It should be noted that the various programs Pa may be stored in advance in the flash memory 84, or may be acquired from a storage medium attachable to and detachable from the information processing system 1 (e.g., the first type storage medium attached to the first slot 23 or the second type storage medium attached to the second slot 24) and stored in the DRAM 85, or may be acquired from another apparatus via a network such as the Internet and stored in the DRAM 85. The CPU 81 executes the various programs Pa stored in the DRAM 85.

In a data storage area of the DRAM 85, various pieces of data used for processes such as a communication process, information processing, and the like executed by the information processing system 1 are stored. In the exemplary embodiment, in the DRAM 85, wireless communication setting data Da, local communication setting data Db, operation data Dc, reception data Dd, transmission data De, setting mode data Df, group information data Dg, game setting information data Dh, image data Di, and the like are stored.

The wireless communication setting data Da is data for wirelessly communicating with the left controller 3 and the right controller 4. For example, the wireless communication setting data Da includes data representing information indicating a value (e.g., an ID) uniquely assigned to each controller, information indicating whether the controller is a left controller or a right controller, wireless communication information regarding a connection setting (pairing) regarding wireless communication with the left controller 3 and the right controller 4, and information indicating whether or not the left controller 3 and the right controller 4 are attached to the main body apparatus 2, and the like. It should be noted that the wireless communication setting data Da is set by performing the above wireless setting process. The wireless setting process may be performed before the processing described later performed by the information processing system 1 is performed, or may be appropriately performed during this processing.

The local communication setting data Db is data for directly wirelessly communicating with another information processing system 1 and is data for performing so-called "local communication" with another information processing system 1. For example, the local communication setting data Db includes data for causing information processing systems 1 to wirelessly communicate with each other through ad hoc communication and includes data of information indicating a value uniquely assigned to another information processing system 1 capable of performing local communication with the information processing system 1, and the like. It should be noted that the local communication setting data Db may be set in a case where a search is performed for another information processing system 1 capable of connecting to the information processing system 1 through ad hoc communication, and the information processing systems 1 are permitted to perform "local communication" with each other by an input operation of the user, before the processing described later performed by the information processing system 1 is performed, or may be set during this processing.

The operation data Dc is operation data appropriately acquired from the left controller 3 and/or the right controller 4. In the exemplary embodiment, operation data is transmitted from the left controller 3 and/or the right controller 4 in a predetermined cycle through wireless communication, and the operation data Dc is appropriately updated using the received operation data. It should be noted that the update cycle of the operation data Dc may be such that the operation data Dc is updated every frame, which is the cycle of the processing described later performed by the information processing system 1, or is updated every cycle in which operation data is transmitted through the above wireless communication.

The reception data Dd is data received from another information processing system 1 through "local communication". The transmission data De is data to be transmitted to another information processing system 1 through "local communication".

The setting mode data Df is data indicating whether the operation mode of the information processing system 1 is the mobile mode or the stationary mode. In the exemplary embodiment, before or during the processing described later performed by the information processing system 1, the operation mode of the information processing system 1 is appropriately determined (e.g., determined in the background of the above processing) based on whether or not the main body apparatus 2 is attached to the cradle 5, and in accordance with the result of the determination, the setting mode data Df is updated.

The group information data Dg is data indicating information regarding a user group set when a communication game is performed using information processing systems 1. For example, the group information data Dg includes data of information indicating a parent apparatus of the user group and a user of the parent apparatus, information indicating a child apparatus participating in the user group and a user of the child apparatus, information indicating whether or not a user can participate in the user group (including information indicating that the user cannot participate in the user group because the game is being performed), information indicating the number of participants in the user group and the number of users allowed to participate in the user group, information regarding a game application to be played by the generated user group, and the like.

The game setting information data Dh is data indicating various setting contents when a game is performed. The image data Di is data for displaying an image on the display 12 of the main body apparatus 2 or the display screen of the stationary monitor 6 when a game is performed.

Figure 21:
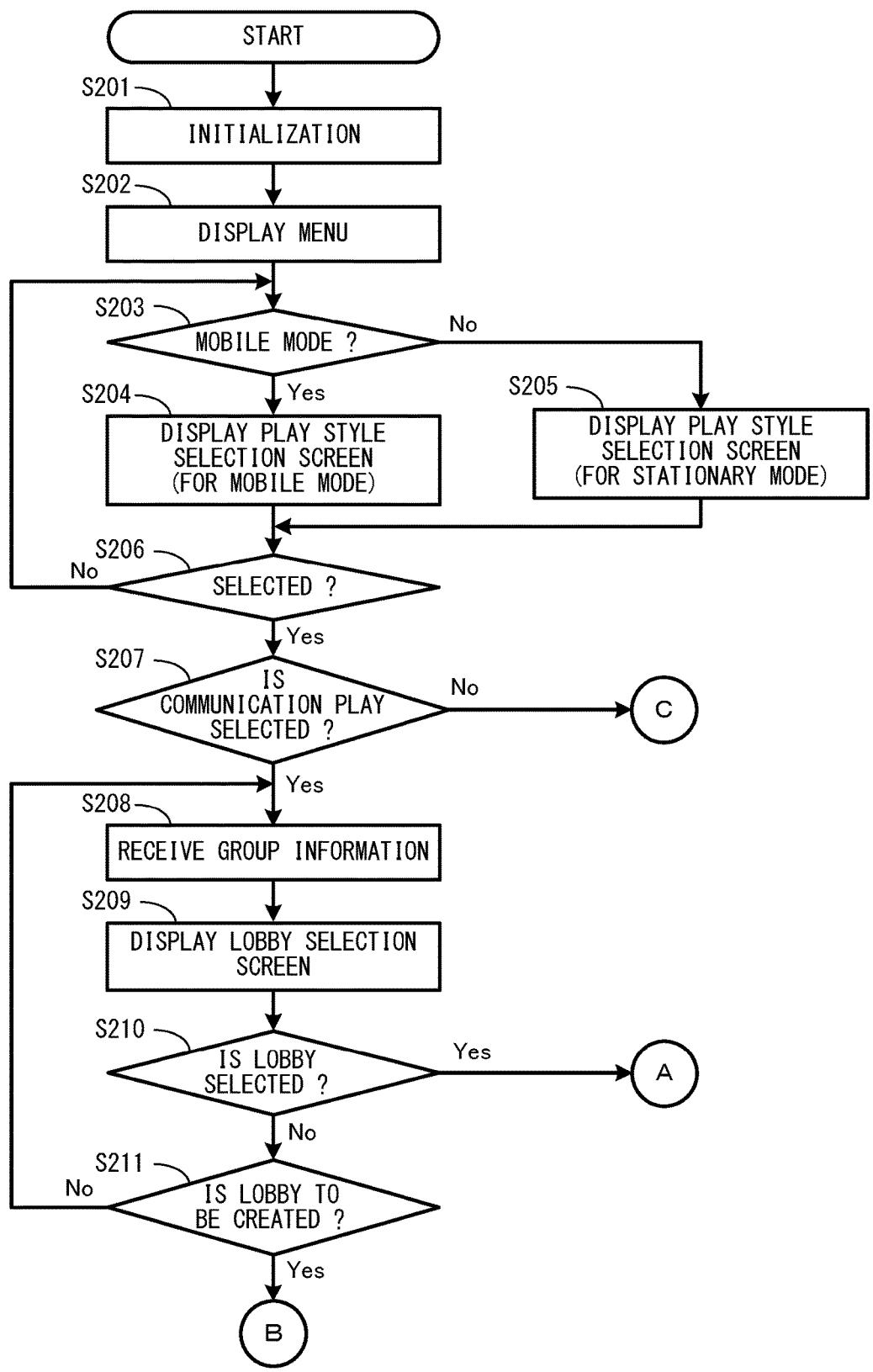
FIG. 21 is a flow chart showing a non-limiting example of processing up to the setting of a lobby in the information processing executed by the information processing system 1.
Figure 22:
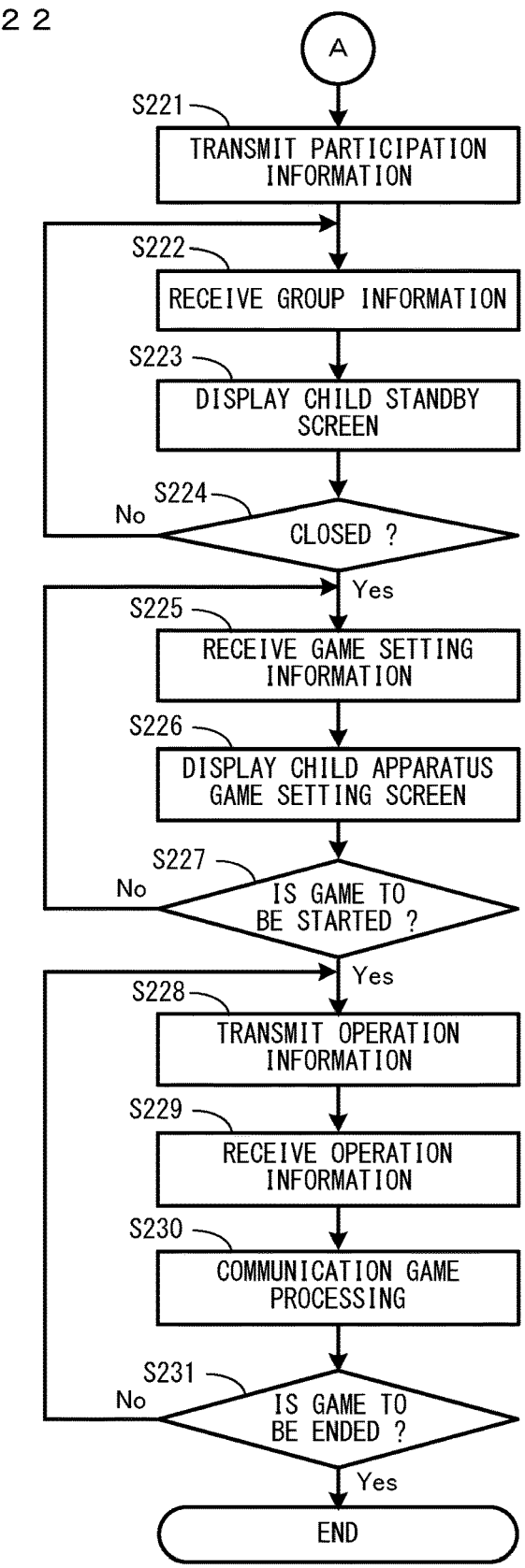
FIG. 22 is a flow chart showing a non-limiting example of processing in a case where the information processing system 1 becomes a child apparatus in a communication game in the information processing executed by the information processing system 1.
Figure 23:
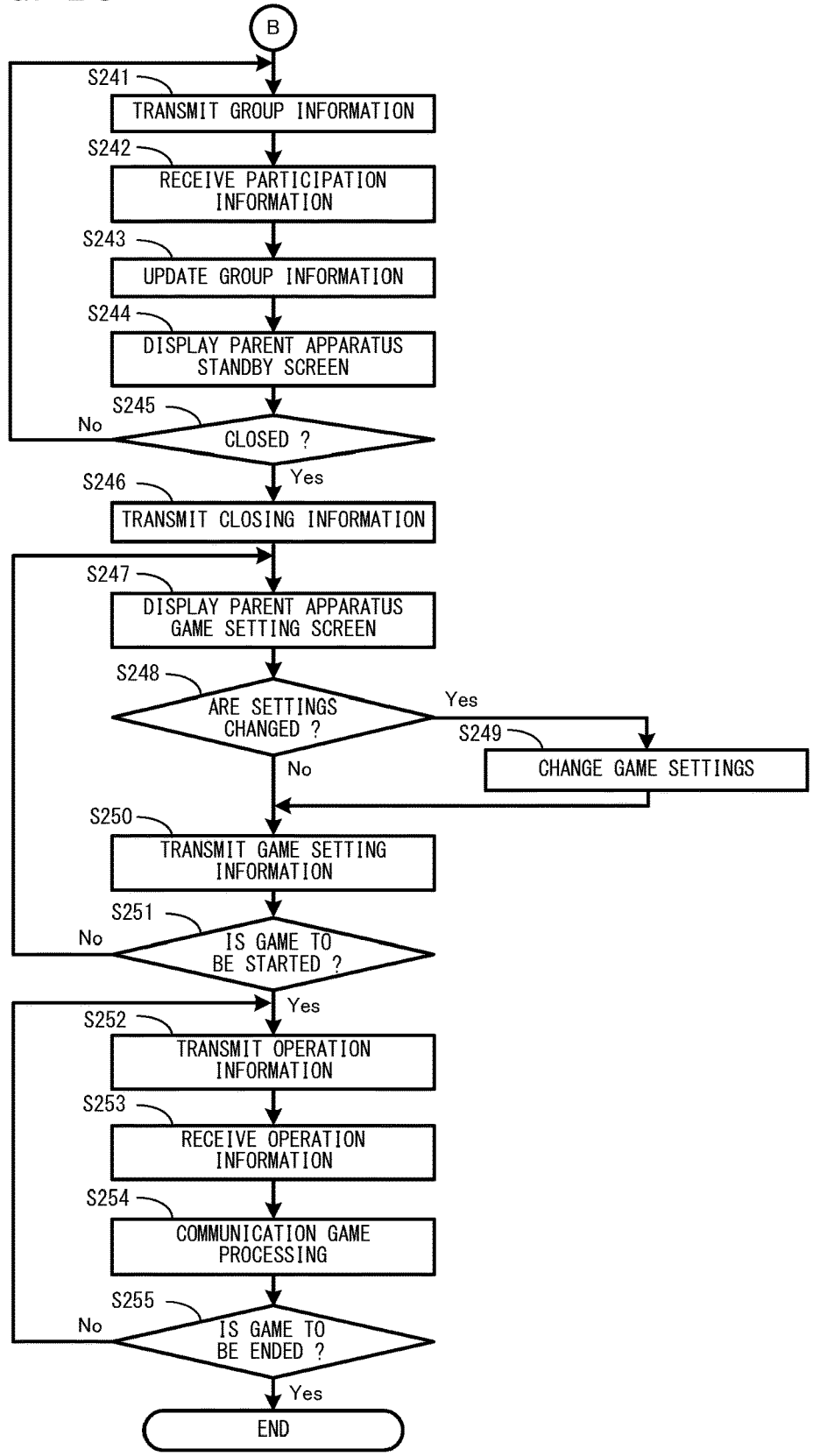
FIG. 23 is a flow chart showing a non-limiting example of processing in a case where the information processing system 1 becomes a parent apparatus in a communication game in the information processing executed by the information processing system 1.
Figure 24:
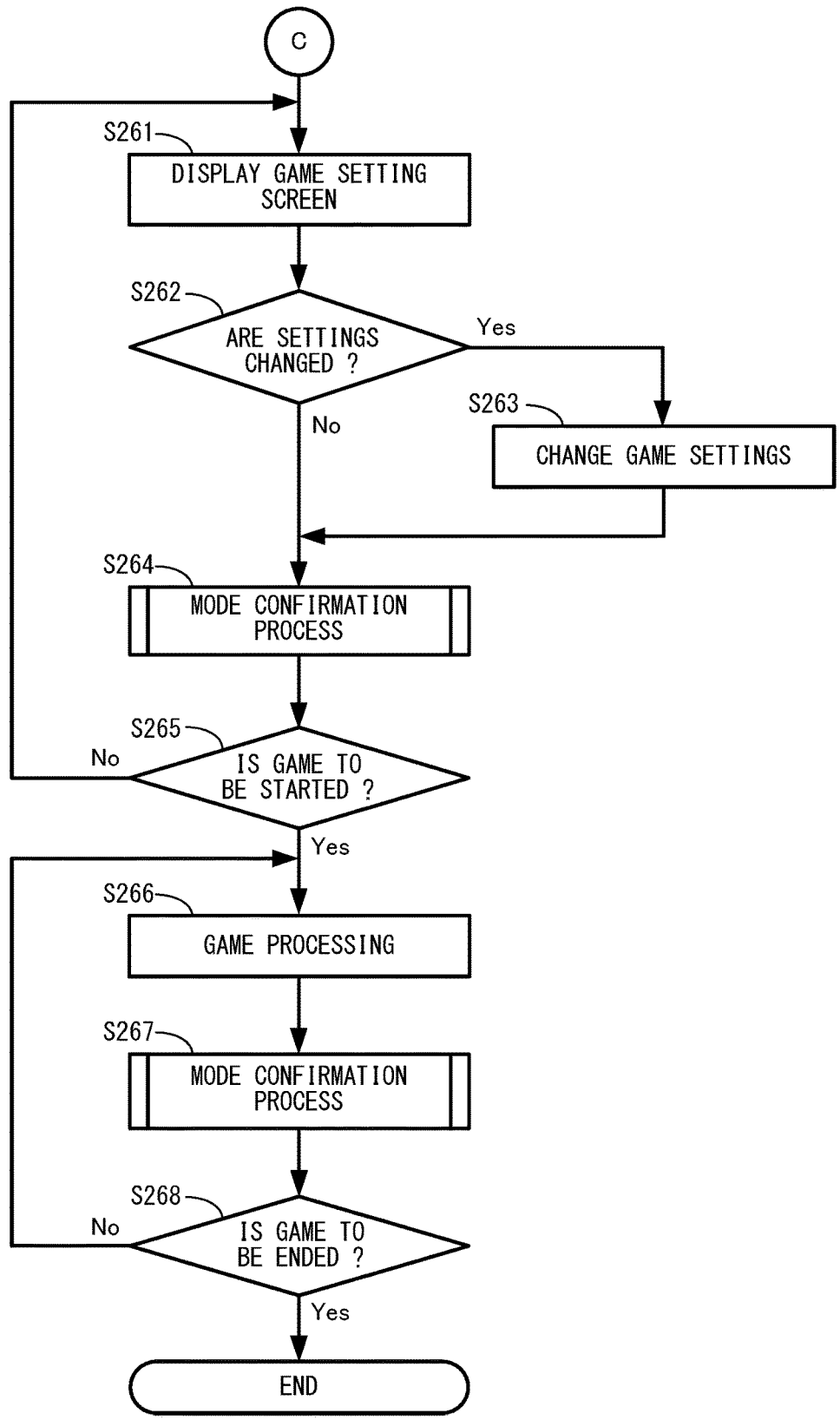
FIG. 24 is a flow chart showing a non-limiting example of processing performed without locally communicating with another information processing system in the information processing executed by the information processing system 1.
Figure 25:
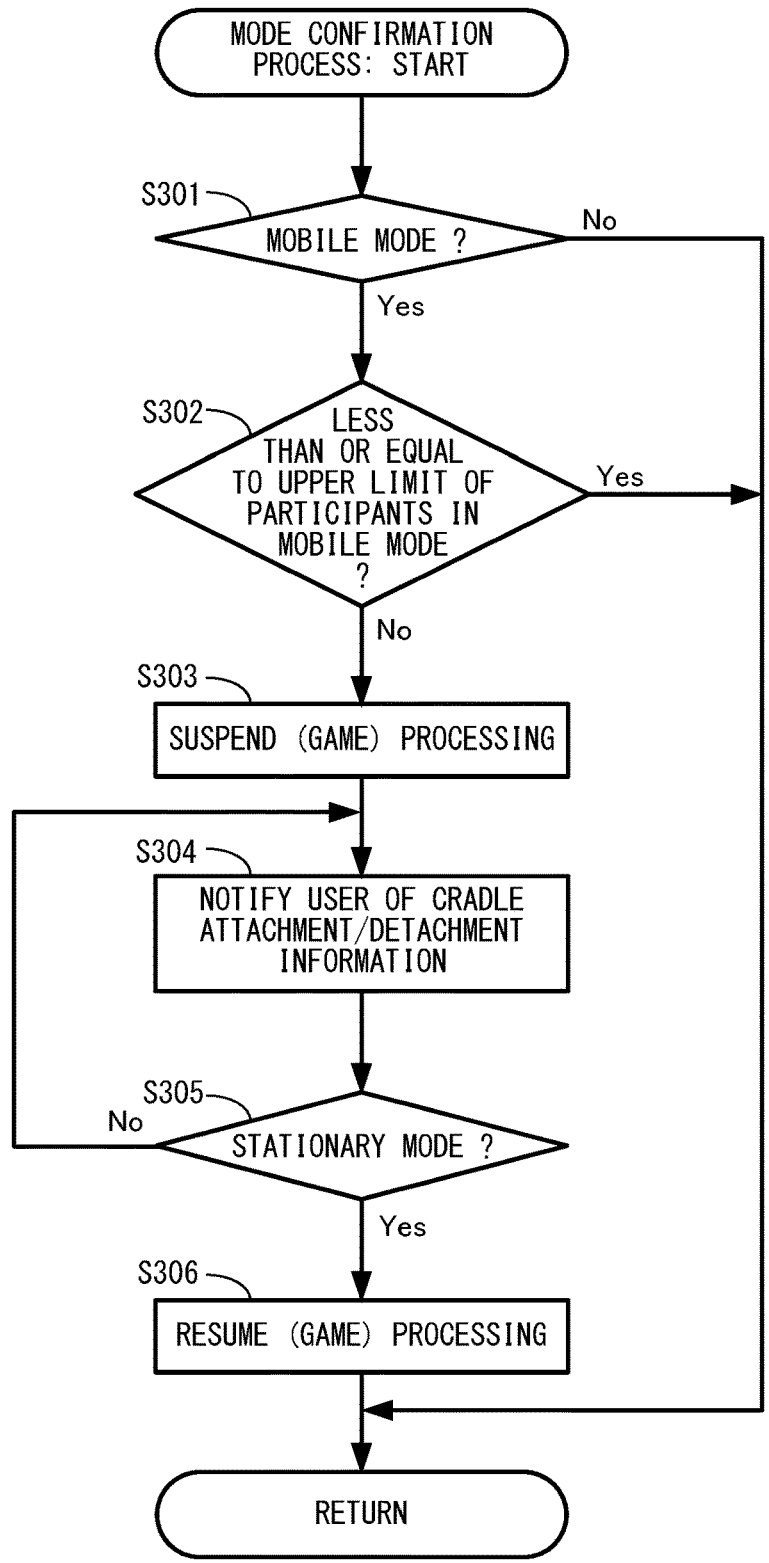
FIG. 25 is a subroutine flow chart showing a non-limiting example of the details of a mode confirmation process performed in steps 264 and 267 in FIG. 24.

Next, a detailed example of information processing (game processing) according to the exemplary embodiment is described. FIG. 21 is a flow chart showing an example of processing up to the setting of a lobby (a group) in the information processing executed by the information processing system 1. FIG. 22 is a flow chart showing an example of processing in a case where the information processing system 1 becomes a child apparatus in a communication game in the information processing executed by the information processing system 1. FIG. 23 is a flow chart showing an example of processing in a case where the information processing system 1 becomes a parent apparatus in a communication game in the information processing executed by an information processing system 1. FIG. 24 is a flow chart showing an example of processing performed without locally communicating with another information processing system in the information processing executed by an information processing system 1. FIG. 25 is a subroutine flow chart showing an example of the details of a mode confirmation process performed in steps 264 and 267 in FIG. 24. In the exemplary embodiment, a series of processes shown in FIGS. 21 to 25 is performed by the CPU 81 executing the communication program, the mode setting program, and a predetermined application program (a game program) included in the various programs Pa. Further, the information processing shown in FIGS. 21 to 25 is started at any timing. Further, in FIGS. 21 to 25, each step executed by the CPU 81 is abbreviated as "S".

It should be noted that the processes of all of the steps in the flow charts shown in FIGS. 21 to 25 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow charts. Alternatively, a processor or a dedicated circuit other than the CPU 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, each of the processes shown in FIGS. 21 to 25 may be executed by the cooperation of a plurality of information processing apparatuses including the main body apparatus 2.

Further, in the exemplary embodiment, the processes of setting the wireless communication setting data Da, the local communication setting data Db, and the setting mode data Df may be performed before the processing in the flow charts shown in FIGS. 21 to 25. Here, these processes are performed in parallel with (in the background of) the processing in the flow charts. Further, the process of updating the operation data Dc is also performed in parallel with (in the background of) the processing in the flow charts shown in FIGS. 21 to 25. That is, even when there is no processing step in the flow charts shown in FIGS. 21 to 25, the operation data Dc and the setting mode data Df are appropriately updated by performing the setting processes in parallel with the processing in the flow charts. It should be noted that as described above, in a case where the setting mode is changed (i.e., changed from the mobile mode to the stationary mode or changed from the stationary mode to the mobile mode) before or during the processing in the flow charts shown in FIGS. 21 to 25, a display screen on which an image based on the processing is displayed is also switched in accordance with the change in the setting mode.

In FIG. 21, the CPU 81 performs initialization in information processing (e.g., game processing) (step 201), and the processing proceeds to the next step. For example, in the initialization, the CPU 81 initializes parameters for performing the processing described below. Further, in the initialization, in a case where the processes of setting the wireless communication setting data Da, the local communication setting data Db, and the setting mode data Df have already been performed, the CPU 81 sets the wireless communication setting data Da, the local communication setting data Db, and the setting mode data Df based on the results of the processes.

Next, the CPU 81 displays the top menu (see FIG. 16) for selecting the number of players playing a game and urges the user to make a selection (step 202). In the exemplary embodiment, the description is given only of multiplayer play. Thus, here, the processing proceeds to the next step on the assumption that multiplayer play ("play together") is selected.

Next, the CPU 81 determines whether or not the operation mode of the information processing system 1 is the mobile mode (step 203). For example, the CPU 81 references the setting mode data Df and determines whether or not the operation mode of the information processing system 1 is the mobile mode. Then, if the operation mode of the information processing system 1 is the mobile mode, the processing proceeds to step 204. If, on the other hand, the operation mode of the information processing system 1 is the stationary mode, the processing proceeds to step 205.

In step 204, the CPU 81 displays the play style selection screen for the mobile mode (see FIG. 16) on the display 12 of the main body apparatus 2 and urges the user to select in which use form (play style) the multiplayer play is to be performed. On the other hand, in step 205, the CPU 81 displays the play style selection screen for the stationary mode (see FIG. 16) on the display 12 of the main body apparatus 2 and urges the user to select in which use form (play style) the multiplayer play is to be performed. Next, the CPU 81 references the operation data Dc and determines whether or not the user performs the operation of selecting any play style (step 206). Then, if the user performs the operation of selecting any play style, the processing proceeds to step 207. If, on the other hand, the user does not perform the operation of selecting any play style, the processing returns to the above step 203, and the process of step 203 is repeated.

In step 207, the CPU 81 determines whether or not the user selects a play style in which communication play is performed (i.e., a play style in which the information processing system 1 is used while communicating with other information processing systems 1). Then, if the user selects the play style in which communication play is performed, the processing proceeds to step 208. If, on the other hand, the user selects a play style in which multiplayer play is performed using only the information processing system 1 without performing communication play, the processing proceeds to step 261 (see FIG. 24).

In step 208, based on the local communication setting data Db, the CPU 81 receives group information from another information processing system 1 capable of locally communicating with the information processing system 1, and the processing proceeds to the next step. For example, as will be apparent later, a parent apparatus having created a user group periodically and wirelessly transmits group information indicating the content of the user group (e.g., the number of users, user information, and the like). In the above step 208, the CPU 81 receives the group information wirelessly transmitted from the parent apparatus, stores the group information in the reception data Dd, and also updates the group information data Dg.

Next, based on the group information received in the above step 208, the CPU 81 displays the lobby selection screen (see FIG. 16) on a display screen (the display 12 of the main body apparatus 2 in the case of the mobile mode, or the display screen of the stationary monitor 6 in the case of the stationary mode) (step 209), and the processing proceeds to the next step. For example, based on the group information data Dg, the CPU 81 displays, without using the display screen in a splitting manner, the user names of users operating parent apparatuses setting user groups, the number of participants and the number of users allowed to participate with respect to each user group of the parent apparatuses, an image identifying whether or not the user can participate with respect to each user group, the option of newly creating a user group, and the like. Here, based on the group information data Dg, the CPU 81 may determine whether or not the user can participate with respect to each user group, and based on the result of the determination, additionally display on the display screen an image identifying whether or not the user can participate. Further, based on the group information data Dg, if there is a user group for which closing information is transmitted, the CPU 81 may additionally display on the display screen an image identifying that the user cannot participate in the user group.

Next, the CPU 81 references the operation data Dc and determines whether or not the user performs the operation of choosing to participate in an already set user group in which the user can participate (step 210). Then, if the operation of choosing to participate in a user group in which the user can participate is performed, the processing proceeds to step 221 (see FIG. 22). If, on the other hand, the operation of choosing to participate in a user group in which the user can participate is not performed, the processing proceeds to step 211.

In step 211, the CPU 81 references the operation data Dc and determines whether or not the user performs the operation of choosing to newly create a user group. Then, if the operation of choosing to newly create a user group is performed, the processing proceeds to step 241 (see FIG. 23). If, on the other hand, the operation of choosing to newly create a user group is not performed, the processing returns to the above step 208, and the process of step 208 is repeated.

In FIG. 22, if the operation of choosing to participate in a user group in which the user can participate is performed, the information processing system 1 on which this operation is performed becomes a child apparatus of the user group. Based on the local communication setting data Db, the CPU 81 of the information processing system 1 having become a child apparatus transmits participation information of the participation in the user group to the parent apparatus of the user group to which a participation request is made (step 221), and the processing proceeds to the next step. Here, the participation information includes information indicating that the user wishes to participate in the user group, identification information of the apparatus with which the participation request is made, the number of users operating the apparatus with which the participation request is made, user information of each user operating the apparatus with which the participation request is made, and the like. The participation information is once stored in the transmission data De, and then in accordance with the fact that a transmission cycle arrives, data stored in the transmission data De is wirelessly transmitted to the parent apparatus of the user group to which the participation request is made. It should be noted that as will be apparent later, if a participation request is transmitted to another information processing system 1 (a parent apparatus), the other information processing system 1 may transmit a reply that the user cannot participate. In this case, the processing returns to the above step 208, and the CPU 81 performs the lobby selection process again.

Next, based on the local communication setting data Db, the CPU 81 receives group information from the parent apparatus of the user group in which the user participates (step 222), and the processing proceeds to the next step. For example, as will be apparent later, a parent apparatus having created a user group periodically and wirelessly transmits group information indicating the content of the user group. In the above step 222, the CPU 81 receives the group information wirelessly transmitted from the parent apparatus of the user group in which the user participates. Then, the CPU 81 stores the group information in the reception data Dd and also updates the group information data Dg.

Next, based on the group information received in the above step 222, the CPU 81 displays the child apparatus standby screen (see FIG. 17) on a display screen (the display 12 of the main body apparatus 2 in the case of the mobile mode, or the display screen of the stationary monitor 6 in the case of the stationary mode) (step 223), and the processing proceeds to the next step. For example, based on the group information data Dg, the CPU 81 displays, without using the display screen in a splitting manner, the user name of a user operating the parent apparatus setting the user group in which the user participates, the number of users operating child apparatuses of the user group and the user names of these users, and the like, and also indicates that the current state is the state where users are further recruited to participate in the user group.

Next, the CPU 81 determines whether or not the recruitment of participants in the user group in which the user participates is closed (step 224). For example, as will be apparent later, if the recruitment of participants is closed, a parent apparatus having created a user group wirelessly transmits group information including closing information indicating that the recruitment is closed. If the CPU 81 receives the closing information from the parent apparatus of the user group in which the user participates, the processing proceeds to step 225. If, on the other hand, the CPU 81 does not receive the closing information from the parent apparatus of the user group in which the user participates, the processing returns to the above step 222, and the process of step 222 is repeated.

In step 225, based on the local communication setting data Db, the CPU 81 receives game setting information from the parent apparatus of the user group in which the user participates, and the processing proceeds to the next step. For example, as will be apparent later, a parent apparatus having created a user group periodically and wirelessly transmits game setting information indicating the setting contents of the game to be performed by the user group. In the above step 225, the CPU 81 receives the game setting information wirelessly transmitted from from the parent apparatus of the user group in which the user participates. Then, the CPU 81 stores the game setting information in the reception data Dd and also updates the game setting information data Dh.

Next, based on the game setting information received in the above step 225, the CPU 81 displays the child apparatus game setting screen (see FIG. 17) on the display screen (the display 12 of the main body apparatus 2 in the case of the mobile mode, or the display screen of the stationary monitor 6 in the case of the stationary mode) (step 226), and the processing proceeds to the next step. For example, based on the game setting information data Dh, the CPU 81 displays, without using the display screen in a splitting manner, the child apparatus game setting screen indicating various setting contents of the game to be started from now. It should be noted that the various setting contents displayed on the child apparatus game setting screen may include an item that can be changed by a user operating a child apparatus. Even in this case, if the operation of changing the various setting contents is performed, game setting information indicating the changed contents is transmitted to the parent apparatus of the user group in which the user participates, and the contents displayed on the child apparatus game setting screen are appropriately updated in accordance with the information.

Next, the CPU 81 determines whether or not the game is to be started by the user group in which the user participates (step 227). For example, as will be apparent later, if a parent apparatus having created a user group starts a game, the parent apparatus wirelessly transmits game start information indicating the start of the game. If the CPU 81 receives the game start information from the parent apparatus of the user group in which the user participates, the processing proceeds to step 228. If, on the other hand, the CPU 81 does not receive the game start information from the parent apparatus of the user group in which the user participates, the processing returns to the above step 225, and the process of step 225 is repeated.

In step 228, if the game is started, then based on the local communication setting data Db, the information processing system 1 transmits operation information for playing the game to each of information processing systems 1 of the user group in which the user participates, and the processing proceeds to the next step. The operation information is generated based on the operation content stored in the operation data Dc. Here, as described above, the operation information is information indicating the content of an operation itself using a controller operating the information processing system 1, and/or object information regarding a virtual object operated using the controller. The operation information is once stored in the transmission data De, and then in accordance with the fact that a transmission cycle arrives, data stored in the transmission data De is wirelessly transmitted to each apparatus of the user group in which the user participates.

Next, based on the local communication setting data Db, the CPU 81 receives operation information from each apparatus of the user group in which the user participates (step 229), and the processing proceeds to the next step. For example, similarly to the information processing system 1, each apparatus belonging to the user group periodically and wirelessly transmits, as operation information, information indicating the content of an operation itself using a controller operating the apparatus, and/or object information regarding a virtual object operated using the controller. In the above step 229, the CPU 81 receives the operation information wirelessly transmitted from each apparatus of the user group in which the user participates. Then, the CPU 81 stores the operation information in the reception data Dd.

Next, the CPU 81 performs communication game processing (step 230), and the processing proceeds to the next step. For example, based on the operation data Dc and the operation information received from each apparatus of the user group, the CPU 81 places in a virtual space a virtual object operated by each user of the user group in which the user participates, thereby constructing a virtual space in the game played by the user group. Then, the CPU 81 generates a game image related to a virtual object operated by the user of the information processing system 1 (an image including a virtual object controlled by an operation of the user, or an image from the first-person viewpoint of the virtual object) and displays the game image on the display screen (the display 12 of the main body apparatus 2 in the case of the mobile mode, or the display screen of the stationary monitor 6 in the case of the stationary mode) (see FIG. 17). It should be noted that if a plurality of virtual objects are operated by a plurality of users using the information processing system 1, the CPU 81 displays by screen splitting an image including the virtual object controlled by an operation of each user, or an image from the first-person viewpoint of the virtual object, using the display screen in a splitting manner.

Next, the CPU 81 determines whether or not the game is to be ended (step 231). In the above step 231, examples of conditions for ending the game include: the fact that the result of the above game is settled; and the fact that the user of the information processing system 1 or the user of the parent apparatus of the user group in which the user participates performs the operation of ending the game. If the game is not to be ended, the processing returns to the above step 228, and the process of step 228 is repeated. If the game is to be ended, the processing of the flow chart ends.

In FIG. 23, if the operation of creating a new user group is performed, the information processing system 1 on which this operation is performed becomes a parent apparatus of the user group. Based on the local communication setting data Db, the CPU 81 of the information processing system 1 having become a parent apparatus transmits group information to another information processing system 1 capable of locally communicating with the information processing system 1 (step 241), and the processing proceeds to the next step. Here, the group information is information indicating the content of the user group created by the information processing system 1 and includes the user name of a user operating the information processing system 1 (i.e., the parent apparatus), the number of users operating child apparatuses participating in the user group created by the information processing system 1 and the user names of these users, information indicating whether or not the user group is recruiting users, and the like. Data indicating the information is stored in the group information data Dg. The CPU 81 once stores the group information in the transmission data De, and then in accordance with the fact that a transmission cycle arrives, wirelessly transmits the data stored in the transmission data De to another information processing system 1 capable of locally communicating with the information processing system 1.

Next, based on the local communication setting data Db, the CPU 81 receives participation information from another information processing system 1 capable of locally communicating with the information processing system 1 (step 242), and the processing proceeds to the next step. For example, as described in the above step 221, another information processing system 1 with which a participation request to participate in the user group created by the information processing system 1 is made transmits participation information of the participation in the user group. In the above step 242, the CPU 81 receives the participation information wirelessly transmitted from another information processing system 1 with which the participation request is made. Then, the CPU 81 stores the participation information in the reception data Dd. Then, the CPU 81 determines whether or not all users of other information processing systems 1 having transmitted the participation information can participate in the user group of the information processing system 1. For example, if the upper limit of the total number of game participants allowed to participate in the user group created by the information processing system 1 has already been reached, or the total number of game participants allowed to participate in the user group is exceeded if all the users having made the participation requests are permitted to participate in the user group, the CPU 81 makes a negative determination regarding the participation request. Then, if the above negative determination is made, the CPU 81 transmits, to another information processing system 1 with which the participation request is made, a reply that the user of the other information processing system 1 cannot participate.

Next, the CPU 81 updates the group information (step 243), and the processing proceeds to the next step. For example, based on the content of the user group in which the information processing system 1 is the parent apparatus and which is indicated by the group information data Dg, and the participation information of the participation permitted in response to the participation request received in the above step 242, the CPU 81 changes the content of the user group and updates the group information data Dg, where necessary.

Next, based on the group information updated in the above step 243, the CPU 81 displays the parent apparatus standby screen (see FIG. 18) on a display screen (the display 12 of the main body apparatus 2 in the case of the mobile mode, or the display screen of the stationary monitor 6 in the case of the stationary mode) (step 244), and the processing proceeds to the next step. For example, based on the group information data Dg, the CPU 81 displays, without using the display screen in a splitting manner, the number of users operating the parent apparatus (i.e., the information processing system 1) setting the user group in which the user participates and the user names of these users, the user names of users operating child apparatuses of the user group, and the like, and also indicates that the current state is the state where users are further recruited to participate in the user group.

Next, the CPU 81 determines whether or not the recruitment of participants in the created user group is to be closed (step 245). For example, in accordance with a user operation on the parent apparatus (e.g., the operation of selecting the option "close" on the parent apparatus standby screen), or if a predetermined condition is satisfied (e.g., if the upper limit of the total number of game participants allowed to participate in the user group is reached, or if a predetermined time elapses after the user group is created, or the like), the parent apparatus having created the user group determines that the recruitment of participants in the created user group is to be closed. Then, if the recruitment of participants in the created user group is to be closed, the processing proceeds to step 245. If, on the other hand, the recruitment of participants in the created user group is to be continued, the processing returns to the above step 241, and the process of step 241 is repeated.

In step 246, based on the local communication setting data Db, the CPU 81 transmits closing information to another information processing system 1 capable of locally communicating with the information processing system 1, and the processing proceeds to the next step. Here, the closing information is information indicating that the recruitment of participants in the user group is closed. The closing information is information included in the group information. The CPU 81 once stores the group information including the closing information in the transmission data De, and then in accordance with the fact that a transmission cycle arrives, wirelessly transmits data stored in the transmission data De to another information processing system 1 capable of locally communicating with the information processing system 1.

Next, based on the game setting information data Dh, the CPU 81 displays the parent apparatus game setting screen (see FIG. 18) on the display screen (the display 12 of the main body apparatus 2 in the case of the mobile mode, or the display screen of the stationary monitor 6 in the case of the stationary mode) (step 247), and the processing proceeds to the next step. For example, based on the game setting information data Dh, the CPU 81 displays, without using the display screen in a splitting manner, the parent apparatus game setting screen indicating various setting contents of the game to be started from now.

Next, based on the operation data Dc, the CPU 81 determines whether or not the operation of changing the settings of the various setting contents displayed on the parent apparatus game setting screen is performed (step 248). Then, if the operation of changing the settings is performed, the processing proceeds to step 249. If, on the other hand, the operation of changing the settings is not performed, the processing proceeds to step 250.

In step 249, in accordance with the operation data Dc, the CPU 81 changes the various setting contents displayed on the parent apparatus game setting screen, and the processing proceeds to step 250. For example, using the various setting contents changed in accordance with the operation data Dc, the CPU 81 updates the game setting information data Dh.

In step 250, based on the local communication setting data Db, the CPU 81 transmits game setting information to a child apparatus belonging to the user group created by the information processing system 1, and the processing proceeds to the next step. The CPU 81 once stores, in the transmission data De, game setting information indicated by the game setting information data Dh and regarding the game to be performed by the user group created by the information processing system 1, and then in accordance with the fact that a transmission cycle arrives, wirelessly transmits data stored in the transmission data De to a child apparatus belonging to the user group created by the information processing system 1.

Next, the CPU 81 determines whether or not the game is to be started by the user group created by the information processing system 1 (step 251). For example, in accordance with a user operation on the parent apparatus (e.g., the operation of selecting the option "start game" on the parent apparatus game setting screen), or if a predetermined condition is satisfied (e.g., if a predetermined time elapses after the recruitment of participants is closed, or the like), the parent apparatus having created the user group determines that the game is to be started by the created user group. Then, if the game is to be started, the CPU 81 wirelessly transmits game start information indicating the start of the game to a child apparatus belonging to the user group created by the information processing system 1. If the CPU 81 starts the game and transmits the game start information to the child apparatus, the processing proceeds to step 252. If, on the other hand, the game is not to be started, the processing returns to the above step 247, and the process of step 247 is repeated.

In step 252, if the game is started, then based on the local communication setting data Db, the CPU 81 transmits operation information for playing the game to each of information processing systems 1 of the user group in which the user participates, and the processing proceeds to the next step. Similarly to the above step 228, the operation information is generated based on the operation content stored in the operation data Dc and is wirelessly transmitted to each apparatus of the same user group.

Next, based on the local communication setting data Db, the CPU 81 receives operation information from each apparatus of the user group in which the user participates (step 253), and the processing proceeds to the next step. Similarly to the above step 229, the CPU 81 receives operation information wirelessly transmitted from each apparatus belonging to the same user group and stores the operation information in the reception data Dd.

Next, the CPU 81 performs communication game processing (step 254), and the processing proceeds to the next step. For example, based on the operation data Dc and the operation information received from each apparatus of the user group, the CPU 81 places in a virtual space a virtual object operated by each user of the user group in which the user participates, thereby constructing a virtual space in the game played by the user group. Then, the CPU 81 generates a game image related to a virtual object operated by the user of the information processing system 1 (an image including a virtual object controlled by an operation of the user, or an image from the first-person viewpoint of the virtual object) and displays the game image on the display screen (the display 12 of the main body apparatus 2 in the case of the mobile mode, or the display screen of the stationary monitor 6 in the case of the stationary mode) (see FIG. 18). It should be noted that if a plurality of virtual objects are operated by a plurality of users using the information processing system 1, the CPU 81 displays by screen splitting an image including the virtual object controlled by an operation of each user, or an image from the first-person viewpoint of the virtual object, using the display screen in a splitting manner, depending on the content of the game.

Next, the CPU 81 determines whether or not the game is to be ended (step 255). In the above step 255, examples of conditions for ending the game include: the fact that the result of the above game is settled; and the fact that the user of the information processing system 1 performs the operation of ending the game. If the game is not to be ended, the processing returns to the above step 252, and the process of step 252 is repeated. If the game is to be ended, the processing of the flow chart ends.

In FIG. 24, if a play style in which multiplayer play is performed using only the information processing system 1 without performing communication play is selected, then based on the game setting information data Dh, the information processing system 1 with which the play style is selected displays a game setting screen on a display screen (the display 12 of the main body apparatus 2 in the case of the mobile mode, or the display screen of the stationary monitor 6 in the case of the stationary mode) (step 261), and the processing proceeds to the next step. For example, based on the game setting information data Dh, the CPU 81 displays, without using the display screen in a splitting manner, a game setting screen indicating various setting contents of the game to be started from now.

Next, based on the operation data Dc, the CPU 81 determines whether or not the operation of changing the settings of the various setting contents displayed on the game setting screen of the information processing system 1 is performed (step 262). Then, if the operation of changing the settings is performed, the processing proceeds to step 263. If, on the other hand, the operation of changing the settings is not performed, the processing proceeds to step 264.

In step 263, in accordance with the operation data Dc, the CPU 81 changes the various setting contents displayed on the game setting screen of the information processing system 1, and the processing proceeds to step 264. For example, using the various setting contents changed in accordance with the operation data Dc, the CPU 81 updates the game setting information data Dh.

In step 264, the CPU 81 performs a mode confirmation process, and the processing proceeds to the next step. With reference to FIG. 25, a description is given below of the mode setting process performed in the above step 264.

In FIG. 25, the CPU 81 references the setting mode data Df and determines whether or not the operation mode of the information processing system 1 is set to the mobile mode (step 301). Then, if the information processing system 1 is set to the mobile mode, the processing proceeds to step 302. If, on the other hand, the information processing system 1 is set to the stationary mode, the processing of the subroutine ends.

In step 302, the CPU 81 determines whether or not the number of users performing the game is less than or equal to the upper limit (e.g., two users) of the total number of game participants in a case where multiplayer play is performed in the mobile mode. Then, if the number of users performing the game exceeds the upper limit of the total number of game participants in a case where multiplayer play is performed in the mobile mode, the processing proceeds to step 303. If, on the other hand, the number of users performing the game is less than or equal to the upper limit of the total number of game participants in a case where multiplayer play is performed in the mobile mode, the processing of the subroutine ends.

In step 303, the CPU 81 suspends the processes performed before the mode confirmation process is performed (e.g., the process of making game settings and the process of advancing the game) (see FIG. 19), and the processing proceeds to the next step.

Next, the CPU 81 notifies the user of cradle attachment/detachment information (step 304), and the processing proceeds to the next step. For example, the CPU 81 displays, on the display 12 of the main body apparatus 2, information urging the user to change back the information processing system 1 to the stationary mode (see FIG. 19) or outputs, from the loudspeakers 88 of the main body apparatus 2, sounds urging the user to change back the information processing system 1 to the stationary mode, thereby notifying the user of cradle attachment/detachment information.

Next, the CPU 81 references the setting mode data Df and determines whether or not the operation mode of the information processing system 1 is changed back to the stationary mode (step 305). Then, if the information processing system 1 is set to the stationary mode, the processing proceeds to step 306. If, on the other hand, the information processing system 1 is set to the mobile mode, the process of step 304 is repeated.

In step 306, the CPU 81 resumes the processes suspended in the above step 303, and the processing of the subroutine ends. By the process of step 306, the processes performed and suspended before the mode confirmation process are performed (e.g., the process of making game settings and the process of advancing the game) are resumed (see FIG. 19).

Referring back to FIG. 24, after the mode confirmation process in the above step 264, the CPU 81 determines whether or not the game is to be started (step 265). For example, in accordance with a user operation on the information processing system 1 (e.g., the operation of selecting the option "start game" on the game setting screen), or if a predetermined condition is satisfied (e.g., if a predetermined time elapses after the game setting screen is displayed, or the like), the CPU 81 determines that the game is to be started. Then, if the game is to be started, the processing proceeds to step 266. If, on the other hand, the game is not to be started, the processing returns to the above step 261, and the process of step 261 is repeated.

In step 266, the CPU 81 performs game processing only by the information processing system 1, and the processing proceeds to the next step. For example, based on the operation data Dc, the CPU 81 places in a virtual space a virtual object operated by each user of the information processing system 1, thereby constructing a virtual space in the game played by the user. Then, the CPU 81 generates by screen splitting a game image related to the virtual object operated by each user of the information processing system 1 (an image including the virtual object controlled by an operation of the user, or an image from the first-person viewpoint of the virtual object) and displays the game image on the display screen (the display 12 of the main body apparatus 2 in the case of the mobile mode, or the display screen of the stationary monitor 6 in the case of the stationary mode) using the display screen in a splitting manner (see FIG. 19).

Next, the CPU 81 performs a mode confirmation process (step 267), and the processing proceeds to the next step. It should be noted that the mode confirmation process performed in the above step 267 is similar to the mode confirmation process in the above step 264, which has been described with reference to FIG. 25, and therefore is not described in detail here.

Next, the CPU 81 determines whether or not the game is to be ended (step 268). In the above step 268, examples of conditions for ending the game include: the fact that the result of the above game is settled; and the fact that the user of the information processing system 1 performs the operation of ending the game. If the game is not to be ended, the processing returns to the above step 266, and the process of step 266 is repeated. If the game is to be ended, the processing of the flow chart ends.

As described above, in the exemplary embodiment, in a case where a communication game is performed using a plurality of information processing systems 1, a larger number of users than the number of the information processing systems 1 can participate in the communication game. Further, in the mobile mode, it is possible to carry a display screen to a place desired by a user. On the other hand, in a case where information processing (e.g., game processing) in which a display screen is used in a splitting manner by a plurality of users is performed, then in the stationary mode, it is possible to use a relatively large display screen in a splitting manner. Thus, even if the display screen is used by relatively many users, it is possible to sufficiently secure the sizes of the split display areas. As described above, the mobile mode and the stationary mode are appropriately used, whereby it is possible to improve the convenience of a mobile apparatus and a stationary apparatus.

It should be noted that in the exemplary embodiment, in a case where a communication game is performed using a user group to which a plurality of information processing systems 1 belong, then on the display screen of each information processing system 1, not an image for each of all users belonging to the user group (e.g., an image including a virtual object controlled by each of all the users) but an image for a user of the information processing system 1 operating the information processing system 1 is displayed. Alternatively, in another exemplary embodiment, in a case where a communication game is performed using a user group to which a plurality of information processing systems 1 belong, then on the display screen of at least one of the plurality of information processing systems 1, images for users other than the users of the information processing system 1 belonging to the user group may be displayed. In this case, the display screen of the information processing system 1 is used by being split into the number obtained by adding the number of the users other than the users of the information processing system 1 to the number of the users of the information processing system 1, and an image for each user is displayed by screen splitting. Further, in another exemplary embodiment, a common image for all the users may be displayed.

Further, in the exemplary embodiment, after the recruitment for participation in a user group is closed, a game is started through the processes of confirming and changing game setting information. Alternatively, the processes of confirming and changing game setting information may not be performed. In this case, in accordance with the fact that an information processing system 1 as a parent apparatus performs the process of starting the game, the recruitment for participation in the user group may be closed, and the game may be started.

Further, an example has been shown where operation information exchanged in a case where a communication game is performed using a user group to which a plurality of information processing systems 1 belong is information indicating the content of an operation itself using a controller operating the information processing system 1, and object information regarding a virtual object operated using the controller. Alternatively, the operation information may be another piece of information so long as the information allows users to understand the progression of the game of each other. For example, the operation information may be information of a virtual camera operated in the information processing system 1, or information of an image itself created for a user of the information processing system 1.

Further, in a case where the information processing system 1 is operated by a plurality of users in the mobile mode according to the exemplary embodiment, and if the number of users operating the information processing system 1 increases, the amount of processing performed by the main body apparatus 2 increases. Thus, it is possible that the power consumption of the main body apparatus 2 increases. In the mobile mode according to the exemplary embodiment, however, the number of operating users is limited to a small number of users relative to the stationary mode, and the processing capability of the main body apparatus 2 is also limited. Thus, it is possible to reduce the power consumption in the mobile mode. Further, in the exemplary embodiment, in a case where the main body apparatus 2 is desired to be used by users exceeding the limitation on the number of operating users in the mobile mode, the main body apparatus 2 is switched to the stationary mode, whereby it is possible to charge the main body apparatus 2 via the cradle 5. Thus, a larger number of users than the limitation can use the main body apparatus 2, and the limitation on the processing capability of the main body apparatus 2 is also eliminated. Thus, it is also possible to use a relatively large stationary display screen in a splitting manner. That is, in the stationary mode according to the exemplary embodiment, a larger number of users can use the main body apparatus 2, which is highly convenient, by eliminating various limitations in the mobile mode.

Further, in the exemplary embodiment, a single user uses a single controller (i.e., one of the left controller 3 and the right controller 4). In this case, the use form is such that a single user uses a single controller as a single operation device. Alternatively, in the exemplary embodiment, the use form may be such that a single user uses a pair of controllers (i.e., both the left controller 3 and the right controller 4), holds one of the controllers (i.e., the left controller 3) with the left hand, holds the other controller (i.e., the right controller 4) with the right hand, and operates the controllers. In this case, the use form is such that a single user uses a pair of controllers as a single operation device. That is, in the exemplary embodiment, an operation device operated by a user may be a single controller or a plurality of controllers. The concept of the operation device according to the exemplary embodiment is that the operation device can be configured with one or more controllers.

Further, in the exemplary embodiment, information indicating the number of all users participating in a user group of a communication game (in other words, the number of all operation devices used in the communication game) may be managed by a parent apparatus of the user group, or managed by each apparatus of the user group. In the second case, each apparatus may acquire the number of users participating in the user group from another apparatus (in other words, the number of operation devices operating another apparatus) and tally up the number of users, thereby managing the number of all the users.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image and switch the operation mode.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the information processing system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the information processing system 1 performs information processing (game processing) and a communication process. Alternatively, another apparatus may perform at least some of the processing steps. For example, if the information processing system 1 is further configured to communicate with another apparatus (e.g., another server, another image display apparatus, another game apparatus, or another mobile terminal), the other apparatus may cooperate to perform the processing steps. Another apparatus may thus perform at least some of the processing steps, thereby enabling processing similar to that described above. Further, the information processing and the communication process described above can be performed by a processor or the cooperation of a plurality of processors, the processor or the plurality of processors included in an information processing system including at least one information processing apparatus. Further, in the above exemplary embodiment, information processing and a communication process can be performed by the CPU 81 of the information processing system 1 executing a predetermined program. Alternatively, part or all of the processing of the flow charts may be performed by a dedicated circuit included in the information processing system 1.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the information processing system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as, for example, an information processing apparatus, an information processing system, an information processing method, an information processing program, and the like in order, for example, to allow a larger number of users to participate in a communication game with a small number of apparatuses.

What is claimed is:

1. An information processing apparatus comprising:
   a first display;
   communication circuitry configured for wireless communication; and
   a computer processor configured to:
      receive operation input data from a plurality of operation devices;
      generate game images for a communication game based on the operation input data and information received via the communication circuitry from at least one other information processing apparatus playing the communication game; and
      control output of the game images to the first display when the information processing apparatus is operated in a first mode and control output of the game images to an external second display when the information processing apparatus is operated in a second mode,
   wherein the computer processor is configured to generate split-screen game images up to a first number of split-screen game images when the information processing apparatus is configured in the first mode and up to a second number of split-screen game images when the information processing apparatus is configured in the second mode, the second number of split-screen game images being greater than the first number of split-screen game images,
   wherein the computer processor is configured to suspend the generating of game images based on the mode in which the information processing apparatus is operated switching from the second mode to the first mode and a number of players exceeding a maximum number of allowable players for playing the communication game in the first mode.

2. The information processing apparatus according to claim 1, wherein
   the computer processor is configured to control the communication circuitry to transmit, to the at least one other information processing apparatus, number of operation devices information indicating a number of operation devices used with the information processing apparatus.

3. The information processing apparatus according to claim 1, wherein
   the communication circuitry is configured to receive, from the at least one other information processing apparatus, number of operation devices information indicating a number of operation devices used with the at least one other information processing apparatus, and
   the computer processor is further configured to, based on number of operation devices information indicating a number of operation devices used with the information processing apparatus and the received number of operations devices information, determine total number of operation devices information indicating a total number of operation devices used for the communication game and store the total number of operation devices information in a memory.

4. The information processing apparatus according to claim 3, wherein
   the computer processor is configured to control the communication circuitry to transmit the total number of operation devices information to the at least one other information processing apparatus.

5. The information processing apparatus according to claim 3, wherein
   the communication circuitry is configured to receive from a first information processing apparatus other than the at least one other information processing apparatus a participation request to participate in the communication game, together with number of operation devices information of the first information processing apparatus, and
   in response to the received participation request, in a case in which a number obtained by adding the number of operation devices indicated by the number of operation devices information received together with the participation request to the total number of operation devices indicated by the total number of operation devices information at a current moment exceeds an upper limit, the computer processor is configured to reject the participation request, and control the communication circuitry to transmit, to the first information processing apparatus, a notification indicating that the first information processing apparatus is not permitted to participate in the communication game.

6. The information processing apparatus according to claim 1, wherein
   the communication circuitry is configured to receive, from one of the at least one other information processing apparatus, total number of operation devices information indicating a total number of operation devices participating in the communication game.

7. The information processing apparatus according to claim 1, wherein
the communication circuitry is configured to receive, from each of the at least one other information processing apparatus participating in the communication game, number of operation devices information indicating a number of operation devices used with each other information processing apparatus, and
the computer processor is further configured to total the number of operation devices indicated by the respective received number of operation devices information, and store the received number of operation devices information in a memory.

8. The information processing apparatus according to claim 1, wherein
the information received via the communication circuitry is operation data indicating operation on an operation device or position data of a position, in a virtual space, of an object that appears in the communication game.

9. The information processing apparatus according to claim 1, wherein
each of the plurality of operation devices is wirelessly connected to the information processing apparatus through wireless communication, and
the operation input data is received using the wireless connection.

10. The information processing apparatus according to claim 2, wherein
the computer processor is further configured to, based on information selected by a user using the information processing apparatus from a plurality of use forms, determine the number of the operation devices in wireless communication with the information processing apparatus.

11. The information processing apparatus according to claim 1, wherein
each of the respective game images of the split-screen game images includes images including a controllable virtual object, or images viewed from a controllable virtual camera.

12. An information processing system including a plurality of information processing apparatuses
each respective information processing apparatus comprising:
a first display;
communication circuitry configured for wireless communication; and
a computer processor configured to:
receive operation input data from a plurality of operation devices;
generate game images for a communication game based on the operation input data and information received via the communication circuitry from at least one other one of the information processing apparatuses; and
control output of the game images to the first display when the respective information processing apparatus is operated in a first mode and control output of the game images to an external second display when the respective information processing apparatus is operated in a second mode,
wherein the computer processor of the respective information processing apparatus is configured to generate split-screen game images up to a first number of split-screen game images when the respective information processing apparatus is configured in the first mode and up to a second number of split-screen game images when the respective information processing apparatus is configured in the second mode, the second number of split-screen game images being greater than the first number of split-screen game images, and
wherein the computer processor is configured to suspend the generating of game images based on the mode in which the information processing apparatus is operated switching from the second mode to the first mode and a number of players exceeding a maximum number of allowable players for playing the communication game in the first mode.

13. The information processing system according to claim 12, wherein
the computer processor of the respective information processing apparatus is configured to control the communication apparatus of the respective information processing apparatus to transmit, to the at least one other one of the information processing apparatuses, number of operating devices information indicating the number of operation devices used with the respective information processing apparatus.

14. The information processing system according to claim 12, wherein
the communication circuitry of the respective information processing apparatus is configured to receive, from the at least one other one of the information processing apparatuses, number of operation devices information indicating the number of operation devices used with the at least one other one of the information processing apparatuses, and
the computer processor of the respective information processing apparatus is configured to, based on number of operation devices information indicating a number of operation devices used with the respective information processing apparatus and the received number of operation devices information, determine total number of operation devices information indicating a total number of operation devices used for the communication game and store the total number of operation devices information in a memory.

15. The information processing system according to claim 14, wherein
the computer processor of the respective information processing apparatus is configured to control the communication circuitry of the respective information processing apparatus to transmit the total number of operation devices information to the at least one other one of the information processing apparatuses.

16. The information processing system according to claim 14, wherein
the communication circuitry of the respective information processing apparatus is configured to receive from a first information processing apparatus other than the at least one other one of the information processing apparatuses a participation request to participate in the communication game, together with number of operation devices information of the first information processing apparatus, and
in response to the received participation request, in a case in which a number obtained by adding the number of operation devices indicated by the number of operation devices information received together with the participation request to the total number of operation devices indicated by the total number of operation devices information at a current moment exceeds an upper limit, the computer processor of the respective information processing apparatus is configured to reject the participation request, and control the communication circuitry of the respective information processing apparatus to transmit, to the first information processing apparatus, a notification indicating that the first information processing apparatus is not permitted to participate in the communication game.

17. The information processing system according to claim 12, wherein
the communication circuitry of the respective information processing apparatus is configured to receive, from a first one of the at least one other one of the information processing apparatuses, total number of operation devices information indicating a total number of operation devices participating in the communication game.

18. The information processing system according to claim 12, wherein
the communication circuitry of the respective information processing apparatus is configured to receive, from each of the at least one other one of the information processing apparatuses participating in the communication game, number of operation devices information indicating a number of operation devices used with each other information processing apparatus, and
the computer processor of the respective information processing apparatus is configured to total the number of operation devices indicated by the respective received number of operation devices information, and store the received number of operation devices information in a memory.

19. An information processing method executed by a processor or cooperation of a plurality of processors for an information processing apparatus, the method comprising:
receiving operation input data from one or more operation devices of the information processing apparatus;
generate game images for a communication game based on the operation input data and information received from at least one other information processing apparatus playing the communication game;
controlling output of the game images to a first display of the information processing apparatus when the information processing apparatus is operated in a first mode and control output of the game images to an external second display when the information processing apparatus is operated in a second mode;
generating split-screen game images up to a first number of split-screen game images when the information processing apparatus is configured in the first mode and up to a second number of split-screen game images when the information processing apparatus is configured in the second mode, the second number of split-screen game images being greater than the first number of split-screen game images; and
suspending the generating of game images based on the mode in which the information processing apparatus is operated switching from the second mode to the first mode and a number of players exceeding a maximum number of allowable players for playing the communication game in the first mode.

20. The information processing method according to claim 19, further comprising:
transmitting, to the at least one other information processing apparatus, number of operation devices information indicating the number of the operation devices connected to the information processing apparatus.

21. The information processing method according to claim 19, further comprising:
receiving, from the at least one other information processing apparatus, number of operation devices information indicating a number of operation devices used with the at least one other information processing apparatus, and
based on number of operation devices information indicating a number of operation devices used with the information processing apparatus and the received number of operation devices information, determining total number of operating devices information indicating a total number of operation devices used for the communication game.

22. A non-transitory computer-readable storage medium having stored therein an information processing program which, when executed by a computer processor of an information processing apparatus including a first display and communication circuitry, causes the information processing apparatus to perform operations comprising:
receiving operation input data from one or more operation devices;
generate game images for a communication game based on the operation input data and information received from at least one other information processing apparatus playing the communication game;
controlling output of the game images to a first display of the information processing apparatus when the information processing apparatus is operated in a first mode and control output of the game images to an external second display when the information processing apparatus is operated in a second mode;
generating split-screen game images up to a first number of split-screen game images when the information processing apparatus is configured in the first mode and up to a second number of split-screen game images when the information processing apparatus is configured in the second mode, the second number of split-screen game images being greater than the first number of split-screen game images; and
suspending the generating of game images based on the mode in which the information processing apparatus is operated switching from the second mode to the first mode and a number of players exceeding a maximum number of allowable players for playing the communication game in the first mode.

23. The information processing apparatus according to claim 1, wherein each split-screen game image respectively corresponds to a player using one or more operation devices to play the communication game.

24. The information processing apparatus according to claim 1, wherein first and second operation devices of the plurality of operation devices are detachably attachable to first and second sides of the information processing apparatus.

25. The information processing apparatus according to claim 1, wherein the computer processor is configured to generate a play selection screen and content of the play selection screen is determined at least in part based on the mode in which the information processing apparatus is operated.

26. The information processing apparatus according to claim 1, wherein the computer processor is configured to resume the generating of game images based on the mode in which the information processing apparatus is operated switching from the first mode back to the second mode.

27. The information processing apparatus according to claim 1, wherein the computer processor is configured to control the information processing apparatus to be a parent apparatus for playing the communication game.

28. The information processing apparatus according to claim 1, wherein the computer processor is configured to control the information processing apparatus to be a child apparatus for playing the communication game.

29. An information processing apparatus comprising:
a first display;
communication circuitry configured for wireless communication; and
a computer processor configured to:
receive operation input data from a plurality of operation devices;
generate game images for a communication game based on the operation input data and information received via the communication circuitry from at least one other information processing apparatus playing the communication game; and
control output of the game images to the first display when the information processing apparatus is operated in a first mode and control output of the game images to an external second display when the information processing apparatus is operated in a second mode,
wherein the computer processor is configured to generate split-screen game images up to a first number of split-screen game images when the information processing apparatus is configured in the first mode and up to a second number of split-screen game images when the information processing apparatus is configured in the second mode, the second number of split-screen game images being greater than the first number of split-screen game images, and
wherein first and second operation devices of the plurality of operation devices are detachably attachable to first and second sides of the information processing apparatus.

30. An information processing system including a plurality of information processing apparatuses,
each respective information processing apparatus comprising:
a first display;
communication circuitry configured for wireless communication; and
a computer processor configured to:
receive operation input data from a plurality of operation devices;
generate game images for a communication game based on the operation input data and information received via the communication circuitry from at least one other one of the information processing apparatuses; and
control output of the game images to the first display when the respective information processing apparatus is operated in a first mode and control output of the game images to an external second display when the respective information processing apparatus is operated in a second mode,
wherein the computer processor of the respective information processing apparatus is configured to generate split-screen game images up to a first number of split-screen game images when the respective information processing apparatus is configured in the first mode and up to a second number of split-screen game images when the respective information processing apparatus is configured in the second mode, the second number of split-screen game images being greater than the first number of split-screen game images, and
wherein first and second operation devices of the plurality of operation devices are detachably attachable to first and second sides of a first one of the plurality of information processing apparatuses.

31. An information processing method executed by a processor or cooperation of a plurality of processors for an information processing apparatus, the method comprising:
receiving operation input data from one or more operation devices of the information processing apparatus;
generate game images for a communication game based on the operation input data and information received from at least one other information processing apparatus playing the communication game;
controlling output of the game images to a first display of the information processing apparatus when the information processing apparatus is operated in a first mode and control output of the game images to an external second display when the information processing apparatus is operated in a second mode; and
generating split-screen game images up to a first number of split-screen game images when the information processing apparatus is configured in the first mode and up to a second number of split-screen game images when the information processing apparatus is configured in the second mode, the second number of split-screen game images being greater than the first number of split-screen game images,
wherein first and second operation devices of the plurality of operation devices are detachably attachable to first and second sides of the information processing apparatus.

32. A non-transitory computer-readable storage medium having stored therein an information processing program which, when executed by a computer processor of an information processing apparatus including a first display and communication circuitry, causes the information processing apparatus to perform operations comprising:
receiving operation input data from one or more operation devices;
generate game images for a communication game based on the operation input data and information received from at least one other information processing apparatus playing the communication game;
controlling output of the game images to a first display of the information processing apparatus when the information processing apparatus is operated in a first mode and control output of the game images to an external second display when the information processing apparatus is operated in a second mode; and
generating split-screen game images up to a first number of split-screen game images when the information processing apparatus is configured in the first mode and up to a second number of split-screen game images when the information processing apparatus is configured in the second mode, the second number of split-screen game images being greater than the first number of split-screen game images,
wherein first and second operation devices of the plurality of operation devices are detachably attachable to first and second sides of the information processing apparatus.

* * * * *